US006181823B1

(12) United States Patent
Takahashi

(10) Patent No.: US 6,181,823 B1
(45) Date of Patent: *Jan. 30, 2001

(54) IMAGE PROCESSING APPARATUS, IMAGE PROCESSING METHOD AND NETWORK SYSTEM

(75) Inventor: Hiroyuki Takahashi, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/992,670

(22) Filed: Dec. 17, 1997

Related U.S. Application Data

(62) Division of application No. 08/579,768, filed on Dec. 28, 1995, now Pat. No. 5,805,933.

(30) Foreign Application Priority Data

Dec. 28, 1994 (JP) .................................................. 6-327014
Dec. 28, 1994 (JP) .................................................. 6-327015

(51) Int. Cl.[7] ........................................................ G06K 9/36
(52) U.S. Cl. ........................................................ 382/232
(58) Field of Search .................................... 382/180, 197, 382/199, 203, 232, 235, 236, 239, 240, 243, 248, 242

(56) References Cited

U.S. PATENT DOCUMENTS 4,189,711 * 2/1980 Frank .................................. 382/242
4,908,872 * 3/1990 Toriv et al. .......................... 382/242
4,974,071 11/1990 Maeda .................................. 358/80
5,369,505 11/1994 Wantanabe et al. ................. 358/444
5,461,681 10/1995 Sato .................................... 382/234
5,461,682 10/1995 Nomura ............................... 382/232
5,513,279 4/1996 Yoshinari et al. ................... 382/232
5,519,499 5/1996 Saito ................................... 358/256
5,598,215 * 1/1997 Watanabe ........................... 382/242
5,644,366 7/1997 Ushida et al. ....................... 343/625
5,650,861 7/1997 Nakajima et al. ................... 358/433
5,793,371 * 8/1998 Deering .............................. 382/232

FOREIGN PATENT DOCUMENTS 6-125464 5/1994 (JP) .
6-332998 12/1994 (JP) .

* cited by examiner

*Primary Examiner*—Jose L. Couso
(74) *Attorney, Agent, or Firm*—Fitzpatrick, Cella, Harper & Scinto

(57) ABSTRACT

A series of arrangements from a CCD sensor to an input masking unit output image data obtained by reading an original image. A JPEG-I/F receives JPEG or MPEG image data from an ATM network. The input JPEG or MPEG data is temporarily stored in a page memory, and is read out from the page memory in synchronism with the image formation timings. The readout data is decoded by a JPEG (or MPEG) expansion unit. A bus selector selects the image data output from the input masking unit or the JPEG (or MPEG) expansion unit, and the selected image data is supplied to a compression unit via a color space conversion unit and a zooming unit. The memory size can be reduced using a common coding unit and high-quality image data can be output independently of whether or not input image data is coded.

20 Claims, 53 Drawing Sheets

| | | | |
|---|---|---|---|
| X11 | X12 | X13 | X14 |
| X21 | X22 | X23 | X24 |
| X31 | X32 | X33 | X34 |
| X41 | X42 | X43 | X44 |

MAIN SCAN SPATIAL FREQUENCY (LOW ↔ HIGH)

SUB-SCAN SPATIAL FREQUENCY (LOW ↔ HIGH)

| | | | |
|---|---|---|---|
| Y11 | Y12 | Y13 | Y14 |
| Y21 | Y22 | Y23 | Y24 |
| Y31 | Y32 | Y33 | Y34 |
| Y41 | Y42 | Y43 | Y44 |

| | | | |
|---|---|---|---|
| Z11 | Z12 | Z13 | Z14 |
| Z21 | Z22 | Z23 | Z24 |
| Z31 | Z32 | Z33 | Z34 |
| Z41 | Z42 | Z43 | Z44 |

ROT = 0 0 0

ROT = 0 0 1

ROT = 0 1 0

ROT = 0 1 1

ROT = 1 0 0

ROT = 1 0 1

ROT = 1 1 0

ROT = 1 1 1

FIG. 33A

| RAM ADDRESS | 517 DATA | 518 DATA | 519 DATA | 520 DATA |
|---|---|---|---|---|
| 000H | 00H | 01H | 02H | 03H |
| 001H | 05H | 06H | 07H | 04H |
| 002H | 0AH | 0BH | 08H | 09H |
| 003H | 0FH | 0CH | 0DH | 0EH |
| 004H | 10H | 11H | 12H | 13H |
| 005H | 15H | 16H | 17H | 14H |
| 006H | 1AH | 1BH | 18H | 19H |
| 007H | 1FH | 1CH | 1DH | 1EH |
| 008H | 20H | 21H | 22H | 23H |
| 009H | 25H | 26H | 27H | 24H |
| 00AH | 2AH | 2BH | 28H | 29H |
| 00BH | 2FH | 2CH | 2DH | 2EH |
| 00CH | 30H | 31H | 32H | 33H |
| 00DH | 35H | 36H | 37H | 34H |
| 00EH | 3AH | 3BH | 38H | 39H |
| 00FH | 3FH | 3CH | 3DH | 3EH |
| 010H | 40H | 41H | 42H | 43H |
| 011H | 45H | 46H | 47H | 44H |
| 012H | 4AH | 4BH | 48H | 49H |
| 013H | 4FH | 4CH | 4DH | 4EH |
| 014H | 50H | 51H | 52H | 53H |
| 015H | 55H | 56H | 57H | 54H |
| 016H | 5AH | 5BH | 58H | 59H |
| 017H | 5FH | 5CH | 5DH | 5EH |
| 018H | 60H | 61H | 62H | 63H |
| 019H | 65H | 66H | 67H | 64H |
| 01AH | 6AH | 6BH | 68H | 69H |
| 01BH | 6FH | 6CH | 6DH | 6EH |
| 01CH | 70H | 71H | 72H | 73H |
| 01DH | 75H | 76H | 77H | 74H |
| 01EH | 7AH | 7BH | 78H | 79H |
| 01FH | 7FH | 7CH | 7DH | 7EH |
| 020H | 80H | 81H | 82H | 83H |
| 021H | 85H | 86H | 87H | 84H |

FIG. 33B

| RAM ADDRESS | 517 DATA | 518 DATA | 519 DATA | 520 DATA |
|---|---|---|---|---|
| 022H | 8AH | 8BH | 88H | 89H |
| 023H | 8FH | 8CH | 8DH | 8EH |
| 024H | 90H | 91H | 92H | 93H |
| 025H | 95H | 96H | 97H | 94H |
| 026H | 9AH | 9BH | 98H | 99H |
| 027H | 9FH | 9CH | 9DH | 9EH |
| 028H | A0H | A1H | A2H | A3H |
| 029H | A5H | A6H | A7H | A4H |
| 02AH | AAH | ABH | A8H | A9H |
| 02BH | AFH | ACH | ADH | AEH |
| 02CH | B0H | B1H | B2H | B3H |
| 02DH | B5H | B6H | B7H | B4H |
| 02EH | BAH | BBH | B8H | B9H |
| 02FH | BFH | BCH | BDH | BEH |
| 030H | C0H | C1H | C2H | C3H |
| 031H | C5H | C6H | C7H | C4H |
| 032H | CAH | CBH | C8H | C9H |
| 033H | CFH | CCH | CDH | CEH |
| 034H | D0H | D1H | D2H | D3H |
| 035H | D5H | D6H | D7H | D4H |
| 036H | DAH | DBH | D8H | D9H |
| 037H | DFH | DCH | DDH | DEH |
| 038H | E0H | E1H | E2H | E3H |
| 039H | E5H | E6H | E7H | E4H |
| 03AH | EAH | EBH | E8H | E9H |
| 03BH | EFH | ECH | EDH | EEH |
| 03CH | F0H | F1H | F2H | F3H |
| 03DH | F5H | F6H | F7H | F4H |
| 03EH | FAH | FBH | F8H | F9H |
| 03FH | FFH | FCH | FDH | FEH |
| | | | | |
| 040H | 00H | 00H | 00H | 00H |
| ~ | 00H | 00H | 00H | 00H |
| 07FFH | 00H | 00H | 00H | 00H |

FIG. 40

ROT-0

| | | | |
|---|---|---|---|
| 0 | 1 | 2 | 3 |
| 4 | 5 | 6 | 7 |
| 8 | 9 | A | B |
| C | D | E | F |

ROT-1

| | | | |
|---|---|---|---|
| 0 | 4 | 8 | C |
| 1 | 5 | 9 | D |
| 2 | 6 | A | E |
| 3 | 7 | B | F |

ROT-2

| | | | |
|---|---|---|---|
| 3 | 2 | 1 | 0 |
| 7 | 6 | 5 | 4 |
| B | A | 9 | 8 |
| F | E | D | C |

ROT-3

| | | | |
|---|---|---|---|
| 3 | 7 | B | F |
| 2 | 6 | A | E |
| 1 | 5 | 9 | D |
| 0 | 4 | 8 | C |

ROT-4

| | | | |
|---|---|---|---|
| C | D | E | F |
| 8 | 9 | A | B |
| 4 | 5 | 6 | 7 |
| 0 | 1 | 2 | 3 |

ROT-5

| | | | |
|---|---|---|---|
| C | 8 | 4 | 0 |
| D | 9 | 5 | 1 |
| E | A | 6 | 2 |
| F | B | 7 | 3 |

ROT-6

| | | | |
|---|---|---|---|
| F | E | D | C |
| B | A | 9 | 8 |
| 7 | 6 | 5 | 4 |
| 3 | 2 | 1 | 0 |

ROT-7

| | | | |
|---|---|---|---|
| F | B | 7 | 3 |
| E | A | 6 | 2 |
| D | 9 | 5 | 1 |
| C | 8 | 4 | 0 |

| ROT | RTB0 | RTB1 | RTB2 | RTB3 | RTB4 | RTB5 | RTB6 | RTB7 |
|---|---|---|---|---|---|---|---|---|
| 0 | 1 | 0 | 0 | 0 | 0 | 0 | 0 | 0 |
| 1 | 0 | 1 | 0 | 0 | 0 | 0 | 0 | 0 |
| 2 | 0 | 0 | 1 | 0 | 0 | 0 | 0 | 0 |
| 3 | 0 | 0 | 0 | 1 | 0 | 0 | 0 | 0 |
| 4 | 0 | 0 | 0 | 0 | 1 | 0 | 0 | 0 |
| 5 | 0 | 0 | 0 | 0 | 0 | 1 | 0 | 0 |
| 6 | 0 | 0 | 0 | 0 | 0 | 0 | 1 | 0 |
| 7 | 0 | 0 | 0 | 0 | 0 | 0 | 0 | 1 |

IMAGE PROCESSING APPARATUS, IMAGE PROCESSING METHOD AND NETWORK SYSTEM

This application is a divisional of prior application Ser. No. 08/579,768 filed Dec. 28, 1995 now U.S. Pat. No. 5,805,933 issued Sep. 8, 1998.

BACKGROUND OF THE INVENTION

The present invention relates to an image processing apparatus, an image processing method, and a network system and, more particularly, to an image processing apparatus and an image processing method, which process input image data and output the processed image data, and a network system to which the image processing apparatus is connected.

An interface of an image processing apparatus is connected to an ATM network that processes color-separated image data and transfers the data in ATM (Asynchronous Transfer Mode) or a local area network (to be referred to as a "LAN" hereinafter) using, e.g., Ethernet for transferring data in a mode other than ATM, and transfers and outputs image data coded by coding methods such as JPEG, MPEG, and the like. The interface does not selectively output color-separated image data themselves and data obtained by coding these data.

However, the above-mentioned technique suffers the following problems.

The image processing apparatus must output image data at a constant rate. In particular, an apparatus having a plurality of image forming means cannot form an image unless image data is output from image processing means at a constant rate.

More specifically, if there are two different types of data, i.e., image data which is obtained by reading an original image and is synchronously input, and image data which has been subjected to variable-length coding such as JPEG, MPEG, and the like, and is input via the ATM network, the image processing apparatus must output these two types of image data at a constant rate.

Furthermore, an image processing apparatus comprising an image memory adopts a method of compressing an image to be stored in the image memory so as to reduce its memory size.

However, the image processing apparatus that performs image compression is not designed in consideration of applications in combination with the above-mentioned network system.

Furthermore, when image data compressed by a lossy compression method such as JPEG, MPEG, or the like is expanded, the decoded image is distorted. In this case, if the compression/expansion is performed only once, deterioration of the image quality falls within an allowable range.

However, since the image processing apparatus comprising the image memory adopts the method of compressing an image to be stored in the image memory so as to reduce its memory size, an input compressed image is expanded, is compressed again by the lossy compression method, and is expanded, thus considerably deteriorating the image quality.

Image compression basically assigns a long code to data with a low input frequency, in variable-length coding, and assigns quantization data with a large step width to such data in fixed-length coding. However, in an image which is temporarily compressed by the lossy compression method and is expanded, it is difficult discriminate whether or not each data is data with a low input frequency, and this difficultly becomes a factor that deteriorates the image quality.

If different compression methods are used, it becomes more difficult to predict the frequency distribution of input image data.

SUMMARY OF THE INVENTION

The present invention has been made to solve the above-mentioned problems, and has as its object to provide an image processing apparatus, an image processing method, and a network system, which can reduce the memory size of an image memory using common coding means independently of input image data.

In order to achieve the above object, a preferred embodiment of the present invention discloses an image processing apparatus comprising:

- first input means for inputting coded image data;
- decoding means for decoding the coded image data input by said first input means;
- second input means for inputting non-coded image data;
- selection means for selecting one of the image data decoded by said decoding means and the image data input by said second input means;
- storage means for coding and storing the image data selected by said selection means; and
- output means for decoding and outputting the coded image data stored in said storage means.

Also, the present invention discloses a network system to which an image processing apparatus is connected, said apparatus comprising:

- first input means for inputting coded image data;
- decoding means for decoding the coded image data input by said first input means;
- second input means for inputting non-coded image data;
- selection means for selecting one of the image data decoded by said decoding means and the image data input by said second input means;
- storage means for coding and storing the image data selected by said selection means; and
- output means for decoding and outputting the coded image data stored in said storage means.

Furthermore, the present invention discloses an image processing method comprising:

- a first input step of inputting coded image data;
- a decoding step of decoding the coded image data input in the first input step;
- a second input step of inputting non-coded image data;
- a selection step of selecting one of the image data decoded in the decoding step and the image data input in the second input step;
- a coding step of coding and storing, in a memory, the image data selected in the selection step; and
- an output step of decoding and outputting the coded image data stored in the memory.

It is another object of the present invention to provide an image processing apparatus, an image processing method, and a network system which can output high-quality image data independently of input image data.

In order to achieve the above object, a preferred embodiment of the present invention discloses the method according to claim 26, wherein the first input step inputs coded image data which is transferred in a network.

Also, the present invention discloses the apparatus according to claim 45, wherein said output means inhibits the input from said first input means while receiving image data from said second input means.

Furthermore, the present invention discloses a network system to which an image processing apparatus is connected, said apparatus comprising:

first input means for inputting coded image data;

first decoding means for decoding the image data input by said first input means;

first storage means for storing some or all components of the image data decoded by said first decoding means;

second input means for inputting non-coded image data;

second storage means for coding and storing the image data input by said second input means;

second decoding means for decoding the coded image data stored in said second storage means; and output means for selectively outputting one of the image data stored in said first storage means and the image data decoded by said second decoding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 33A and 33B are views showing an example of a table set in a RAM shown in FIG. 32;

FIG. 40 is a view showing the pixel layouts in rotation processing and mirror image processing;

DESCRIPTION OF THE PREFERRED EMBODIMENTS

An image processing apparatus according to an embodiment of the present invention will be described in detail hereinafter.

In the following description, the present invention is applied to an image processing apparatus of a color copying machine. However, the present invention is not limited to this, and may be applied to any other image processing apparatuses which receive variable-length coded image data in ATM. The output destination of image data is not limited to a color copying machine, but may be output to any other apparatuses as long as they form images.

FIRST EMBODIMENT

System Arrangement

Figure 1:
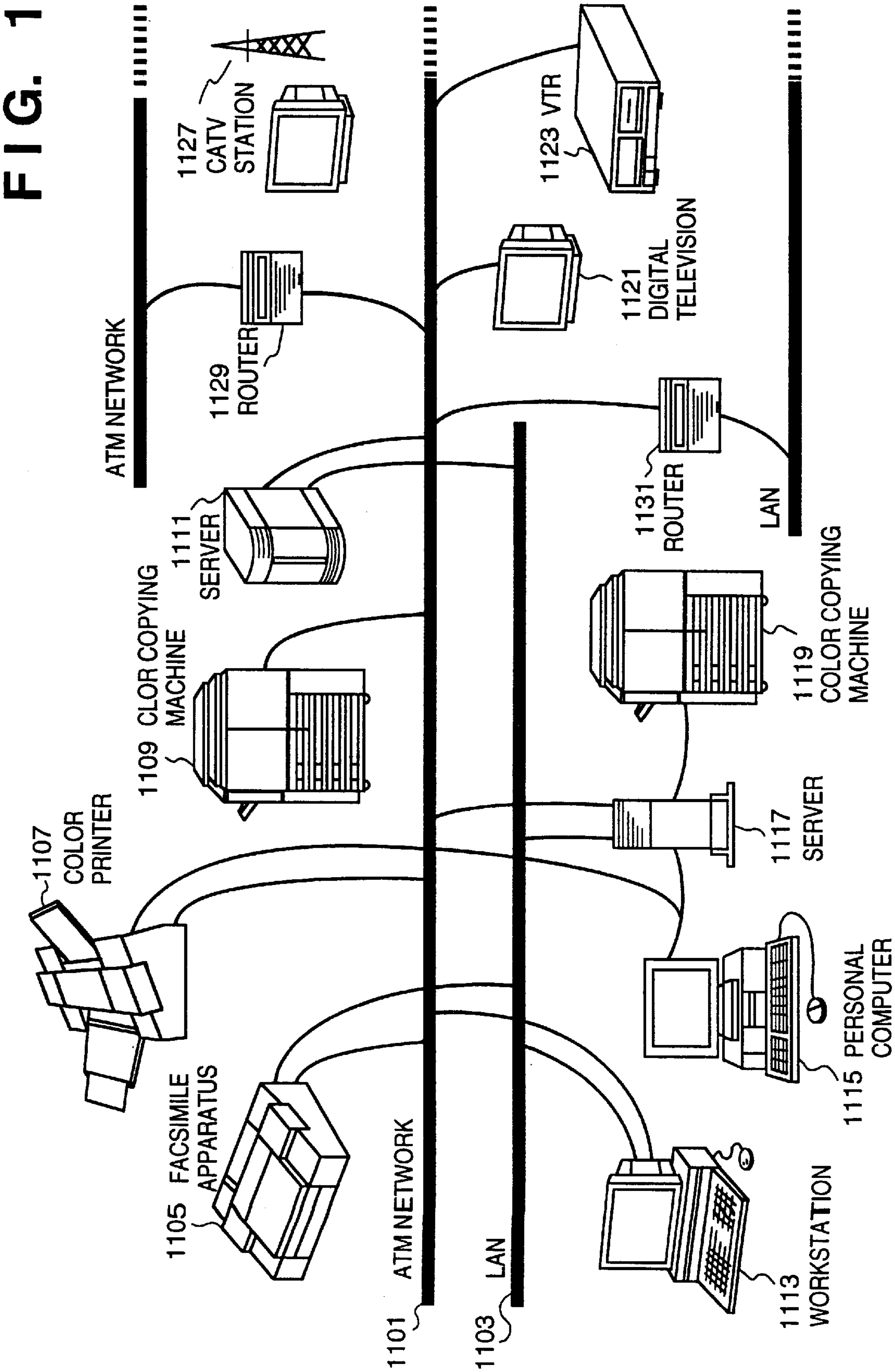
FIG. 1 is a block diagram showing the arrangement of a network system according to an embodiment of the present invention.

FIG. 1 is a block diagram showing the arrangement of a network system according to an embodiment of the present invention.

Referring to FIG. 1, reference numeral 1101 denotes an ATM network, which transfers various coded data such as image data coded by coding methods such as JPEG, MPEG, and the like in ATM. Reference numeral 1103 denotes a LAN which transfers data in a mode other than ATM using, e.g., Ethernet.

Reference numeral 1105 denotes a facsimile apparatus, which is connected to the ATM network 1101 and has a compression/expansion function of image data. Reference numeral 1107 denotes a color printer, which is connected to the ATM network 1101, has an internal page memory, and forms a color image on the basis of image data obtained by expanding received coded data.

Reference numerals 1109 and 1119 denote color copying machines, each comprising a reader and a printer. Each of these color copying machines includes a compression circuit for compressing image data of an original read by the reader by, e.g., the JPEG method, a page memory in which compressed image data is written, an expansion circuit for expanding the compressed image data written in the page memory and supplying the expanded image data to the printer, and the like. Note that the color copying machine 1109 is connected to the ATM network 1101, and the color copying machine 1119 is connected to a server 1117 (to be described later).

Reference numerals 1111 and 1117 denote servers. The server 1111 temporarily stores image data input via the ATM network 1101. The server 1117 is connected to the color copying machine 1119.

Reference numeral 1113 denotes a workstation, which inputs/outputs image data to/from the server 1111. Reference numeral 1115 denotes a personal computer, which is connected to the ATM network 1101 and the LAN 1103, codes/decodes data by transmitting/receiving coded data such as MPEG data, JPEG data, and the like between these two networks, and performs various kinds of processing including edit processing of various image data. The personal computer 1115 is connected to the printer 1107 via the ATM network 1101 or a dedicated line.

Reference numeral 1121 denotes a digital television, which receives coded data such as MPEG data, JPEG data, and the like via the ATM network 1101, decodes the coded data, and displays the decoded data on a CRT display as a visible image. Note that the CRT display may be replaced by a display using a ferroelectric liquid crystal called FLC. Reference numeral 1123 denotes a VTR which receives coded data such as MPEG data, JPEG data, and the like via the ATM network 1101, and records the received coded data on a magnetic tape directly or after predetermined signal processing such as decoding. The VTR 1123 has an image data compressor for compressing externally received non-compressed image data by the MPEG or JPEG method, and thereafter, recording the compressed data on a magnetic tape.

Reference numeral 1127 denotes a CATV station, which sends image data compressed by the MPEG or JPEG method onto the ATM network 1101. More specifically, the CATV station 1127 broadcasts images via the ATM network 1101. Reference numerals 1129 and 1131 denote routers. The router 1129 connects the ATM network 1101 and another ATM network, and the router 1131 connects the ATM network 1101 and another LAN.

ATM network switches (not shown) are arranged between the ATM network 1101, and the facsimile apparatus 1105, the color printer 1107, and the color copying machine 1109.

JPEG Coding

Of various data transmitted in the above-mentioned system, JPEG data will be explained below. The JPEG coding method is an international standard method which aims at compressing a color still image by utilizing the frequency characteristics of image data and the visual characteristics of a person.

Figure 2A:
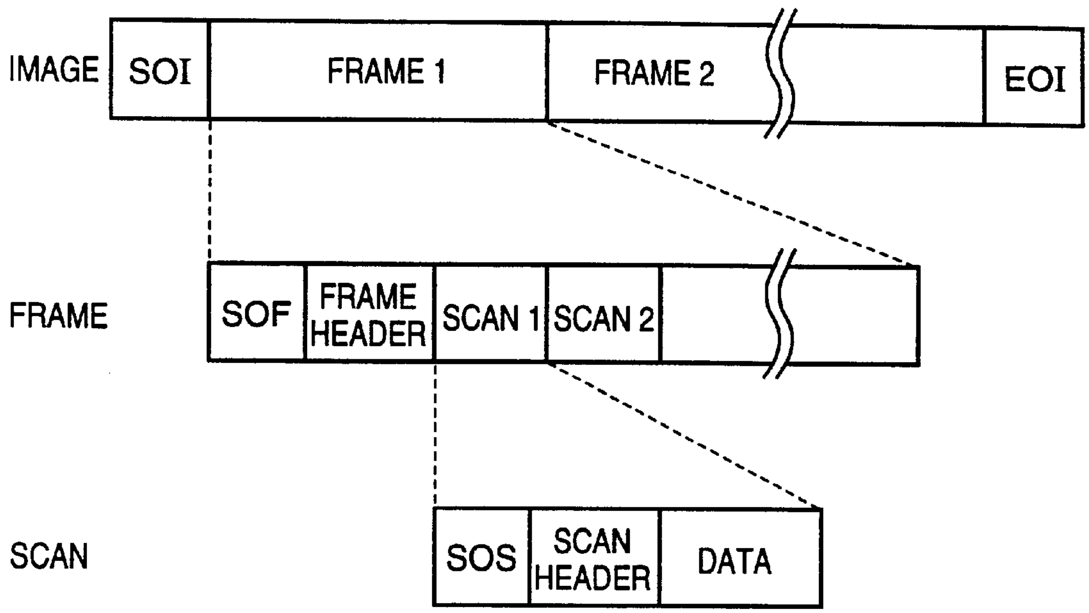
FIG. 2A is a view showing the format of JPEG data.

FIG. 2A shows the format of JPEG data. In JPEG data, coded data and various marker codes constitute an image/frame/scan hierarchical structure. More specifically, the JPEG data is constituted by an SOI (Start Of Image) code, a frame, and an EOI (End Of Image) code. In the case of hierarchically coded data, the frame includes a plurality of frames in units of layers; otherwise, the frame consists of a single frame. Furthermore, the frame is constituted by an SOF (Start Of Frame) code, a frame header, and scans, and each scan is constituted by an SOS (Start of Scan) code, a scan header, and coded data. Note that the scan includes a plurality of scans when luminance data (Y) and two color difference data (Cr, Cb) are separately coded (non-interleave), or consists of a single scan when data is coded without separating data (interleave).

Figure 3:
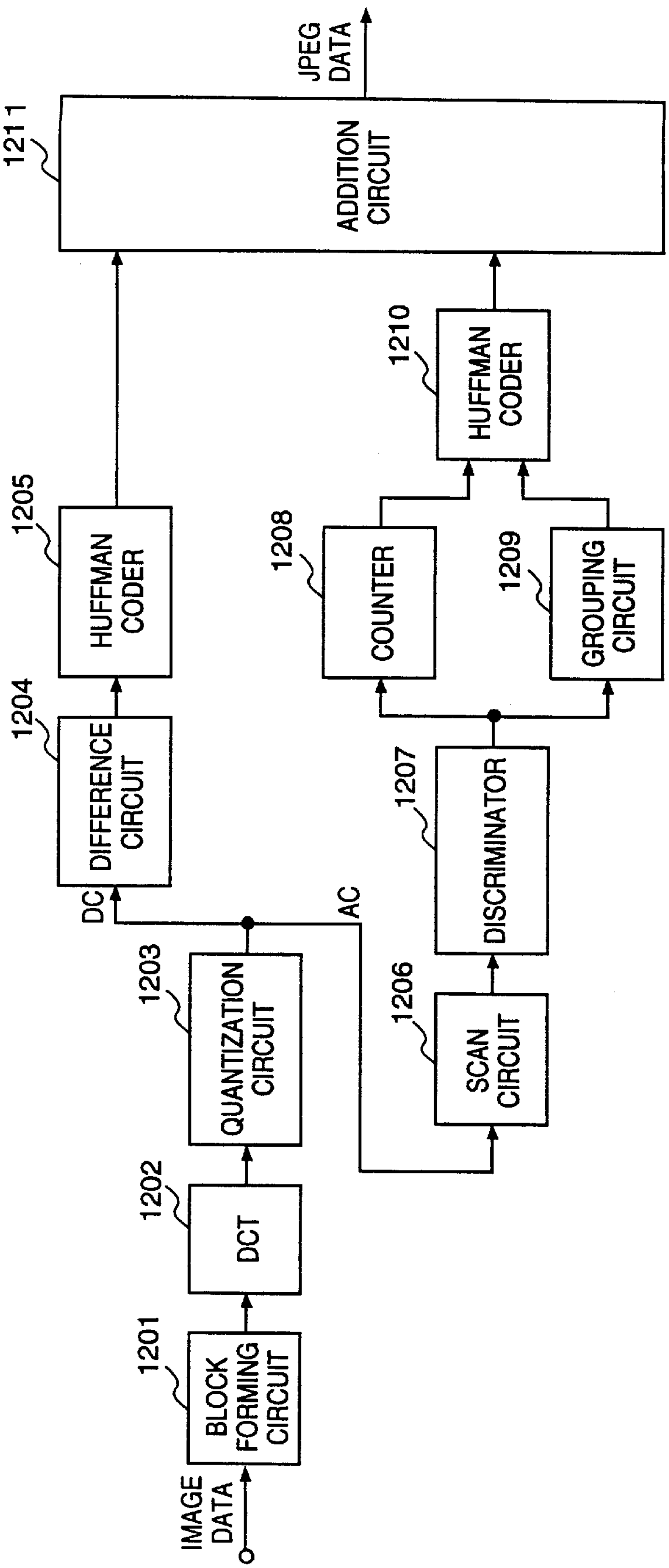
FIG. 3 is a diagram for explaining the coding algorithm in a JPEG baseline system.
Figure 4:
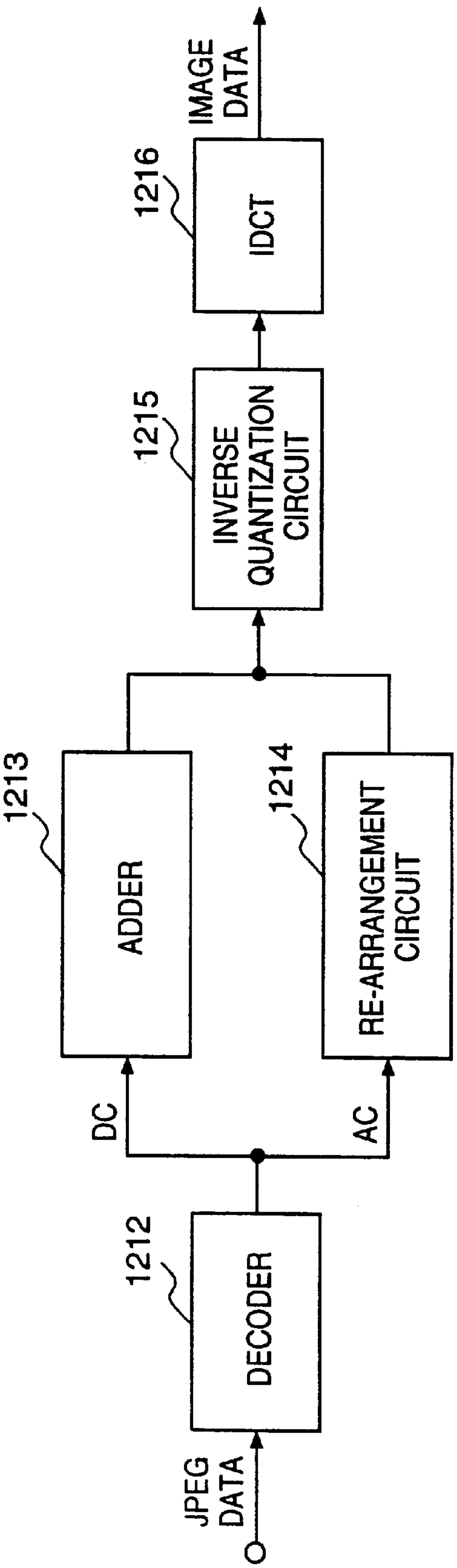
FIG. 4 is a diagram for explaining the decoding algorithm in the JPEG baseline system.

FIG. 3 is a view for explaining the coding algorithm in a JPEG baseline system, and FIG. 4 is a view for explaining the decoding algorithm in the system.

Referring to FIG. 3, input image data is divided into blocks each consisting of 8×8 pixels by a block forming circuit 1201. Each of these blocks is subjected to two-dimensional DCT (discrete cosine transform) calculation in a DCT circuit 1202 to be converted into a spatial frequency component (DCT coefficient) consisting of one DC component (DC) and 63 AC components (AC). A quantization circuit 1203 quantizes the obtained frequency components by dividing them with predetermined quantization coefficients. The quantized frequency components are separated into DC and AC components, and are then coded by different algorithms. Note that different quantization coefficients are normally used in units of frequency components. In this case, a quantization coefficient for a low-frequency component which is visually important is set to be smaller than one for a high-frequency component. With this quantization, high-frequency components which have a low visual importance are cut, and the data size can be reduced.

Each of the separated DC components is input to a difference circuit 1204, and is converted into a difference from the DC component of the immediately preceding block by utilizing high correlation with adjacent blocks. The obtained differences are input to a Huffman coder 1205, and are subjected to one-dimensional Huffman coding, thus obtaining coded data of the DC components.

On the other hand, the AC components are input to a scan circuit 1206. The 63 AC components are sequentially zigzag-scanned in the order from low-frequency components which are visually important to obtain a one-dimensional array. The one-dimensional array of AC components is input to a discriminator 1207, and it is discriminated if the value of each component is zero or a value (effective coefficient) other than zero. A counter 1208 counts the run length of zeros, and a grouping circuit 1209 groups the effective coefficients using their values. A combination of the run length and the group values is input to a Huffman coder 1210, and is subjected to two-dimensional Huffman coding, thus obtaining coded data of the AC components.

Note that the Huffman coders 1205 and 1210 reduce the data size by assigning shorter code lengths to a difference value with a high probability of occurrence for the DC component, and to a combination of a run length and effective coefficients, with a high probability of occurrence for the AC components. Components with a low probability of occurrence are combined with predetermined codes (ZRL codes), thus expressing all patterns by a finite number of codes.

When the above-mentioned processing is performed in units of blocks, coding of a single color still image is completed. Thereafter, the above-mentioned marker codes and the like are added to the coded data in an addition circuit 1211, thus obtaining JPEG data shown in FIG. 2A. Since quantization coefficients and Huffman codes can be arbitrarily set, a quantization coefficient table and a Huffman table used in coding are added after the SOI code.

The JPEG decoding algorithm will be described below.

Input JPEG data is decoded by a decoder 1212 on the basis of a Huffman table added to the JPEG data. The decoded DC component is added to the immediately preceding block by an adder 1213, and the decoded AC components are re-arranged by a re-arrangement circuit 1214 to be restored to an original two-dimensional array. Thereafter, the respective frequency components are dequantized by an inverse quantization circuit 1215 on the basis of a quantization coefficient table added to the JPEG data, and are then subjected to inverse DCT in an IDCT circuit 1216. In this manner, the JPEG data is restored to image data (decoded data).

When the above-mentioned processing is performed in units of blocks, decoding of a single color still image is completed.

The above-mentioned algorithms are basic ones of the JPEG method. Furthermore, extended systems adopting various kinds of hierarchical coding have been approved, and when hierarchical coding is performed, the SOF code represents the type of coding.

MPEG Coding

Of various data transmitted in the above-mentioned system, MPEG data will be explained below. The MPEG coding method is an international standard method which aims at high-efficiency coding of a dynamic image, and utilizes the frequency characteristics of image data and the visual characteristics of a person as in the JPEG method. Furthermore, the MPEG method attains high-efficiency coding by utilizing the redundancy in the time-axis direction, which is unique to a dynamic image.

The MPEG method includes an MPEG1 method which sets a maximum transfer rate of 1.5 Mbps for digital recording media, and an MPEG2 method which removes the upper limit of the transfer rate, and aims at using in bi-directional digital multimedia equipments such as a digital VTR, ATV (Advanced Television), and the like, and in all transmission systems such as an optical fiber network. However, since the basic algorithms of these two methods are roughly the same, the data structure and coding/decoding algorithms will be described below based on the MPEG1 method. In the MPEG2 method, coding methods that can be used are defined by a plurality of profiles (Simple, Main, SNR (Signal to Noise Ratio) Scalable, Spatial Scalable, High), but the representative main profiles are basically the same as those of the MPEG1 method.

The principle of the high-efficiency coding method in the MPEG method will be described below. This coding method lowers the redundancy in the time-axis direction by calculating the difference between adjacent frames, and lowers the redundancy in the spatial direction by performing DCT and variable-length coding of the obtained difference data, thus realizing high-efficiency coding. More specifically, in the case of a dynamic image, since successive frames have a high correlation therebetween, the difference between a frame to be coded or the current frame and a frame which precedes or succeeds the frame along the time axis is calculated, thus lowering the redundancy in the time-axis direction.

Figure 5:
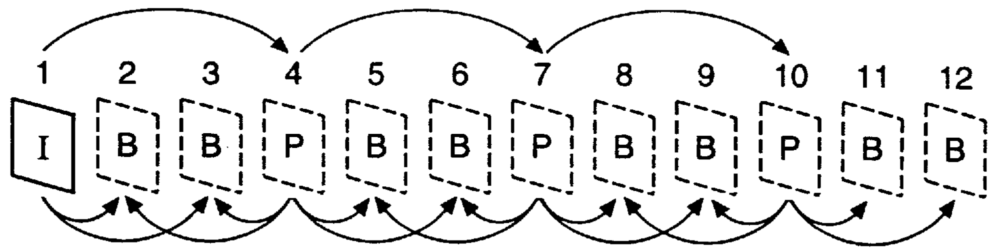
FIG. 5 is a view showing the frame format of the MPG method.

The frame format of the MPEG method consists of I-, P-, and B-pictures, which are combined in a predetermined order, as shown in FIG. 5. Note that the I-picture is an intra-coded image coded in an intra-coded mode, the P-picture is a predictive coded image obtained by coding the difference from the previous frame (to be referred to as a "past frame" hereinafter), and the B-picture is a bi-directionally predictive coded image obtained by coding a minimum one of the differences between the frame of interest, and the past frame and the subsequent frame (to be referred to as the "future frame" hereinafter), and the differences between the frame of interest and interpolated images obtained based on the past and future frames. In some cases, e.g., when a new object appears in a frame, the difference calculated based on the future frame becomes smaller than that calculated based on the past frame, and the bi-directionally predictive coding takes this into consideration.

MPEG recommends a combination in which one I-picture, four P-pictures, and ten B-pictures form one unit (GOP: Group of Picture), the I-picture is arranged at the beginning of the group, and sets each including two B-pictures and one P-picture repeat themselves. The reason why the I-picture are arranged at a predetermined period is to allow special reproduction such as reverse reproduction, and partial reproduction in units of GOPs, and to prevent error propagation.

Motion compensation of MPEG will be explained below.

Coding is performed in units of macroblocks each consisting of four 8×8 pixel blocks of luminance data and two 8×8 pixel blocks of color difference data. The difference between the macroblock of interest and each neighboring block of the corresponding block in the past or future frame is calculated, a macroblock with a minimum difference is searched for to detect a motion vector, and the motion vector is coded as data. Upon decoding, corresponding macroblock data in the past or future frame is extracted using the motion vector, thereby decoding coded data, which is coded using the motion compensation. In such motion compensation, the past frame is temporarily coded and thereafter, is decoded again to obtain the past frame, and a macroblock in this past block and a corresponding macroblock in a frame to be coded are used. Note that the MPEG1 method performs motion compensation between frames, but the MPEG2 method performs motion compensation between fields. Difference data and motion vector data obtained by the motion compensation are coded by DCT and Huffman coding described above.

The data structure of the MPEG method will be described below.

Figure 6:
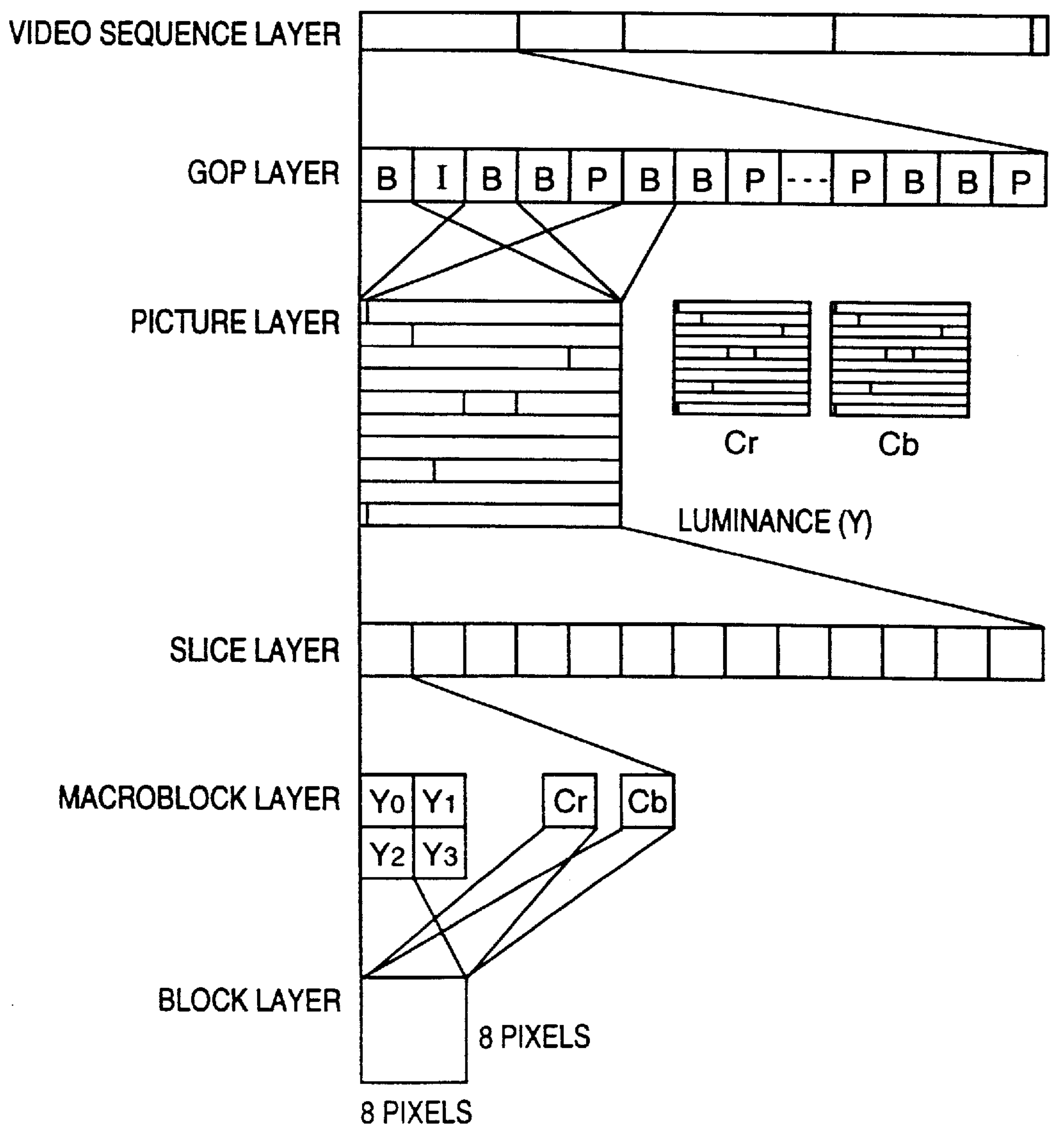
FIG. 6 is a view showing the MPEG data structure.

FIG. 6 shows the MPEG data structure. The MPEG data has a hierarchical structure consisting of a video sequence layer, a GOP layer, a picture layer, a slice layer, a macroblock layer, and a block layer. The respective layers will be described below in the order from lower layers.

The block layer consists of an 8×8 pixel block and is prepared in correspondence with luminance data and color difference data as in the JPEG method. DCT computation is performed in units of block layers.

The macroblock layer consists of four 8×8 blocks of luminance data and two 8×8 blocks of color difference data, and is appended with a macroblock header. As described above, the motion compensation and coding are performed in units of macroblocks. The macroblock header includes data of the motion compensation and the quantization step of the macroblock, and data indicating whether or not six DCT blocks (Y0, Y1, Y2, Y3, Cr, and Cb) in the macroblock have data.

The slice layer consists of a sequence of one or more macroblocks in the scan order of an image, and a slice header. The slice header has data associated with the quantization step in the slice layer. When each macroblock does not have any inherent quantization step data, since the quantization step of the slice header is used, the quantization step in the sequence of macroblocks in the slice layer can be made constant. Note that the macroblock at the beginning of the slice layer resets the difference value of the DC component.

The picture layer includes slice layers in units of frames, and consists of a header including a picture start code and the like, and one or a plurality of slice layers that follow the header. Note that the header of the picture layer includes a code indicating the coding mode of an image, a code indicating the accuracy (in units of pixels or half pixels) of the motion detection, and the like.

The GOP layer consists of a header including a group start code, a time code indicating the time from the beginning of the sequence, and the like, and a plurality of I, B, and P frames that follow the header.

The video sequence layer starts with a sequence start code and ends with a sequence end code, and control data such as an image size, aspect ratio, and the like required for decoding, and a plurality of GOPs are inserted between these codes.

The bitstream of the MPEG data with the above-mentioned structure is regulated.

Basic coding and decoding devices that process MPEG data will be explained below.

Figure 7:
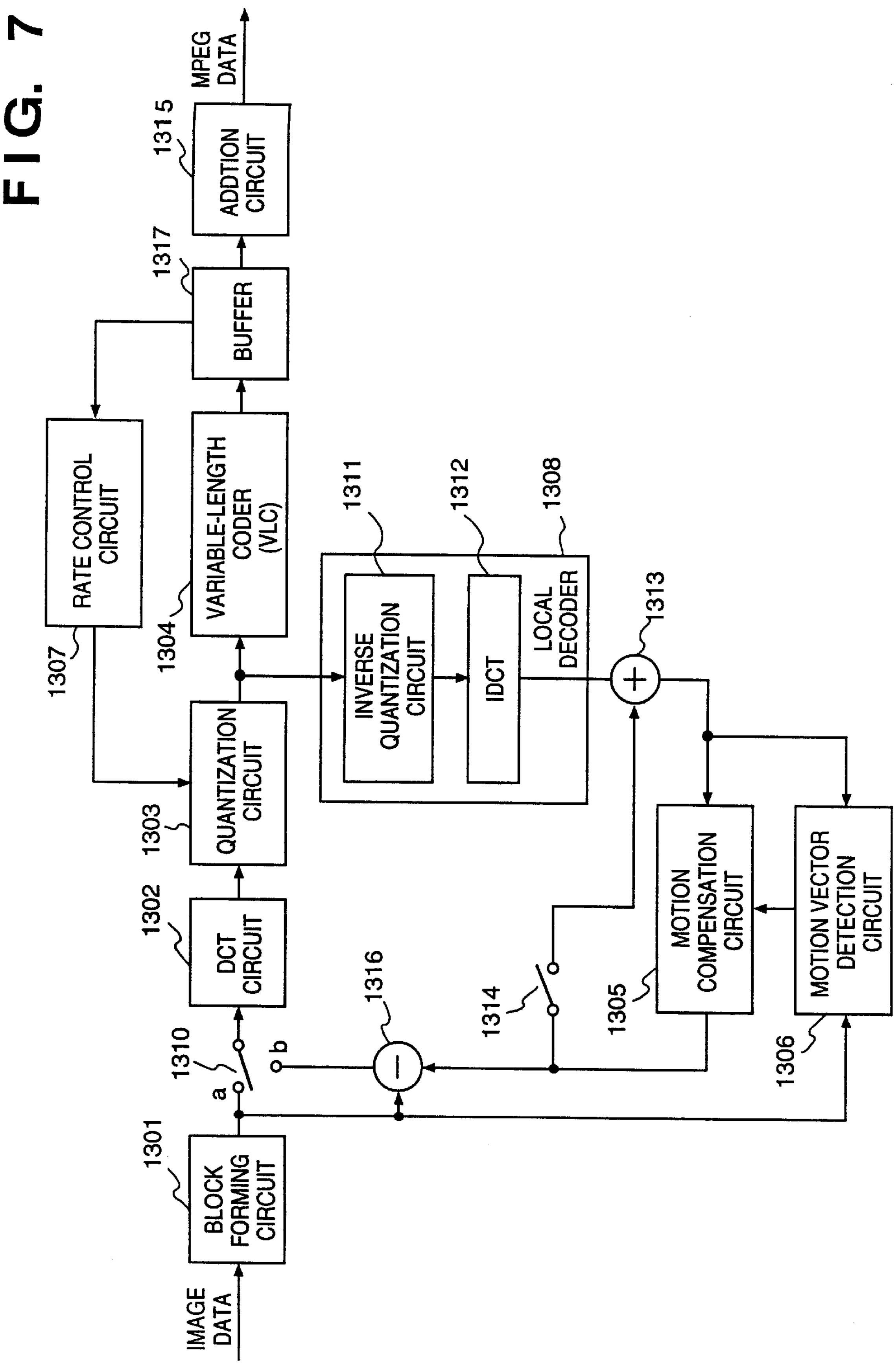
FIG. 7 is a block diagram showing the arrangement of an MPEG coding device.

FIG. 7 is a block diagram showing the arrangement of an MPEG coding device. The image sizes of images to be coded include High (corresponding to High Level in MPEG2) of 1,920×1,080 pixels, High-1440 (corresponding to High-1440 Level in MPEG2) of 1,440×1,080 pixels, images corresponding to the 4:2:2 or 4:2:0 format of ITU-RS recommendation 601, and images corresponding to the SIF (Source Input Format), CIF (Common Intermediate Format), and QCIF (Quarter CIF) formats. At Low Levels of MPEG1 and MPEG2, images having sizes of the SIF format are to be coded.

Referring to FIG. 7, reference numeral 1301 denotes a block forming circuit which divides input image data into 8×8 pixel blocks. Reference numeral 1302 denotes a DCT circuit, which calculates the DCT of a block input via a switch 1310. The switch 1310 is switched depending on whether input image data is an I-picture or a picture other than the I-picture, and selects a contact a for the I-picture; selects a contact b for other pictures. Therefore, in the case of an I-picture, a block output from the block forming circuit 1301 is input to the DCT circuit 1302. In the case of a picture other than the I-picture, the above-mentioned motion compensation is performed.

Reference numeral 1303 denotes a quantization circuit for quantizing a DCT coefficient output from the DCT circuit 1302. Reference numeral 1304 denotes a variable-length coder (to be abbreviated as a "VLC" hereinafter), which codes a quantized coefficient output from the quantization circuit 1303. Reference numeral 1317 denotes a buffer for temporarily storing a code output from the VLC. Note that the VLC 1304 performs two-dimensional Huffman coding in substantially the same manner as in JPEG, except that it assigns a predetermined code (escape code) to components with a low probability of occurrence.

Reference numeral 1308 denotes a local decoder which comprises an inverse quantization circuit 1311 and an inverse DCT circuit 1312, and performs dequantization and inverse DCT computation of a quantized coefficient output from the quantization circuit 1303. Reference numeral 1306 denotes a motion vector detection circuit which receives a block output from the local decoder 1308 via an adder 1313 and a block output from the block forming circuit 1301, and detects a motion vector. Reference numeral 1305 denotes a motion compensation circuit which receives a block output from the local decoder via the adder 1313, and outputs a corresponding macroblock in a predetermined frame (the past or future frame or an interpolated frame of these frames) with reference to the motion vector detected by the motion vector detection circuit 1306. Note that the motion vector detection circuit 1306 obtains a motion vector by comparing the frame to be coded and a reference frame, and its detection result designates a macroblock to be output from the motion compensation circuit 1305. Reference numeral 1314 denotes a switch which is closed in the case of a picture other than an I-picture.

Reference numeral 1316 denotes a subtracter which performs subtraction processing between the output from the motion compensation circuit 1305 and the block forming circuit 1301. The calculated difference value is input to the DCT circuit 1302 via the switch 1310 in the case of a picture other than an I-picture, and is subjected to coding.

Reference numeral 1307 denotes a rate control circuit which performs code amount control by changing the quantization step of the quantization circuit 1303 on the basis of the occupation amount of codes in the buffer 1317. Reference numeral 1315 denotes an addition circuit which adds the above-mentioned various headers to code data output from the buffer 1317, and outputs the sum data as MPEG data.

Figure 8:
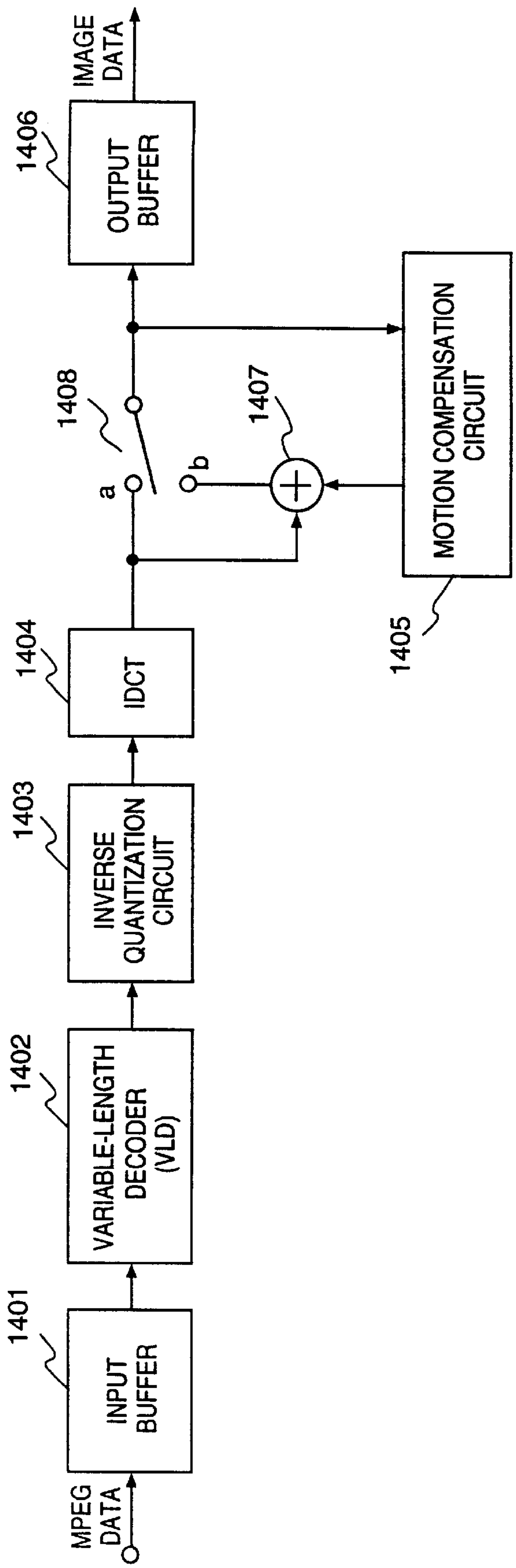
FIG. 8 is a block diagram showing the arrangement of an MPEG decoding device.
Figure 9:
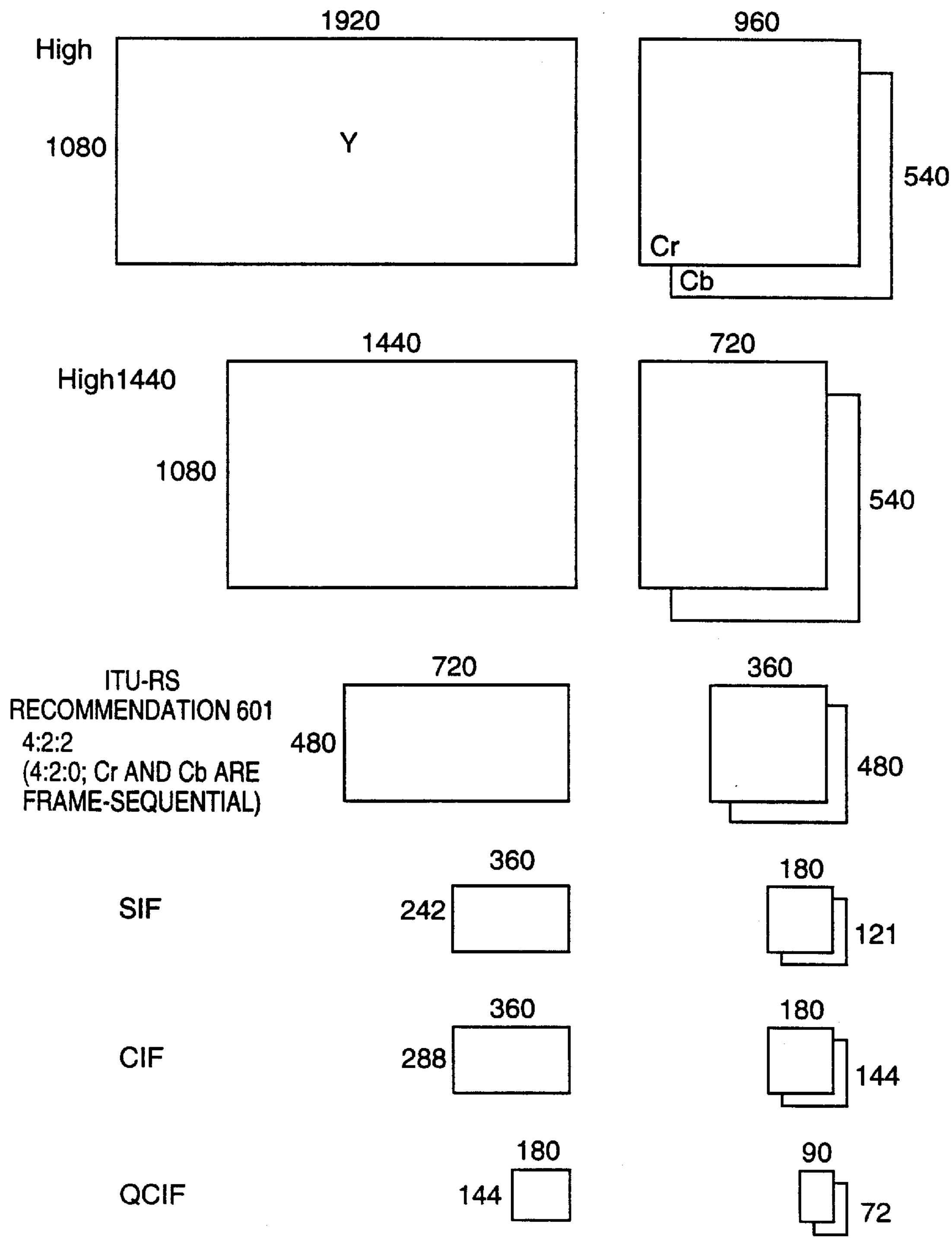
FIG. 9 is a view showing the image sizes of objects to be coded by the MPEG coding device.

FIG. 8 is a block diagram showing the arrangement of an MPEG decoding device. Reference numeral 1401 denotes an input buffer which temporarily stores input MPEG data. Reference numeral 1402 denotes a variable-length decoder (to be abbreviated as a "VLD" hereinafter) which decodes code data sequentially read out from the input buffer 1401. Reference numeral 1403 denotes an inverse quantization circuit which dequantizes data decoded by the VLD 1402. Reference numeral 1404 denotes an IDCT circuit which calculates the inverse DCT of data dequantized by the inverse quantization circuit 1403 to convert it into data in the spatial domain. Reference numeral 1405 denotes a motion compensation circuit which receives data via a switch 1408, and outputs a difference value for motion compensation. Reference numeral 1407 denotes an adder for adding the difference value output from the motion compensation circuit 1405 to the output from the IDCT circuit 1404. Note that the switch 1408 selects a contact a for an I-picture, and a contact b for a picture other than the I-picture on the basis of a coding identification code detected by a data detection circuit (not shown). Therefore, in the case of an I-picture, the output from the IDCT circuit 1404 is supplied to an output buffer 1406, and in the case of a picture other than the I-picture, the output from the adder 1407 is supplied to the output buffer 1406.

The decoded data is temporarily stored in the output buffer 1406, and is demodulated to its original spatial layout. Thereafter, the data is output as image data for one frame.

ATM format

The ATM communication format will be described below.

Figure 2B:
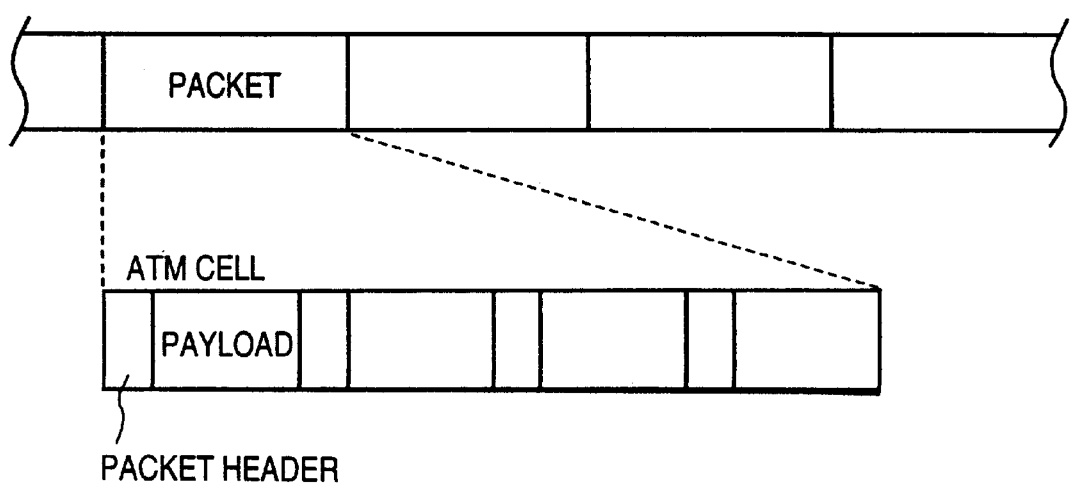
FIG. 2B is a view showing the ATM communication format.

FIG. 2B shows the ATM communication format. A bitstream is divided into a plurality of fixed-length packets, and each packet consists of a plurality of (e.g., four) ATM cells. Each ATM cell consists of a packet header and payload for data. In general, the header has 5 bytes, and the payload has 48 bytes. According to this ATM communication, data can be transmitted independently of the bit rate of a network (asynchronously), and the transmission rate can be arbitrarily set by the number of transmission cells per unit time. Thus, the ATM is suitable for a transmission system which transmits various kinds of data.

Personal Computer

The arrangement of the personal computer 1115 shown in FIG. 1 will be described below. The personal computer 1115 comprises a multi-bus system which selectively uses an optimal data bus in correspondence with the data size of data to be transmitted and the transfer rate required for processing so as to process various kinds of data described above and to execute various functions. In this embodiment, the personal computer 1115 comprises a 16-bit data bus D1, a 32-bit data bus D2, a 64-bit data bus D3, a 128-bit data bus D4 as an expansion bus, and a system bus SB. The personal computer 1115 comprises an expansion card interface (to be described later) to allow expansion of functions, and can expand equipment using various kinds of expansion cards connected to this interface.

Figure 10:
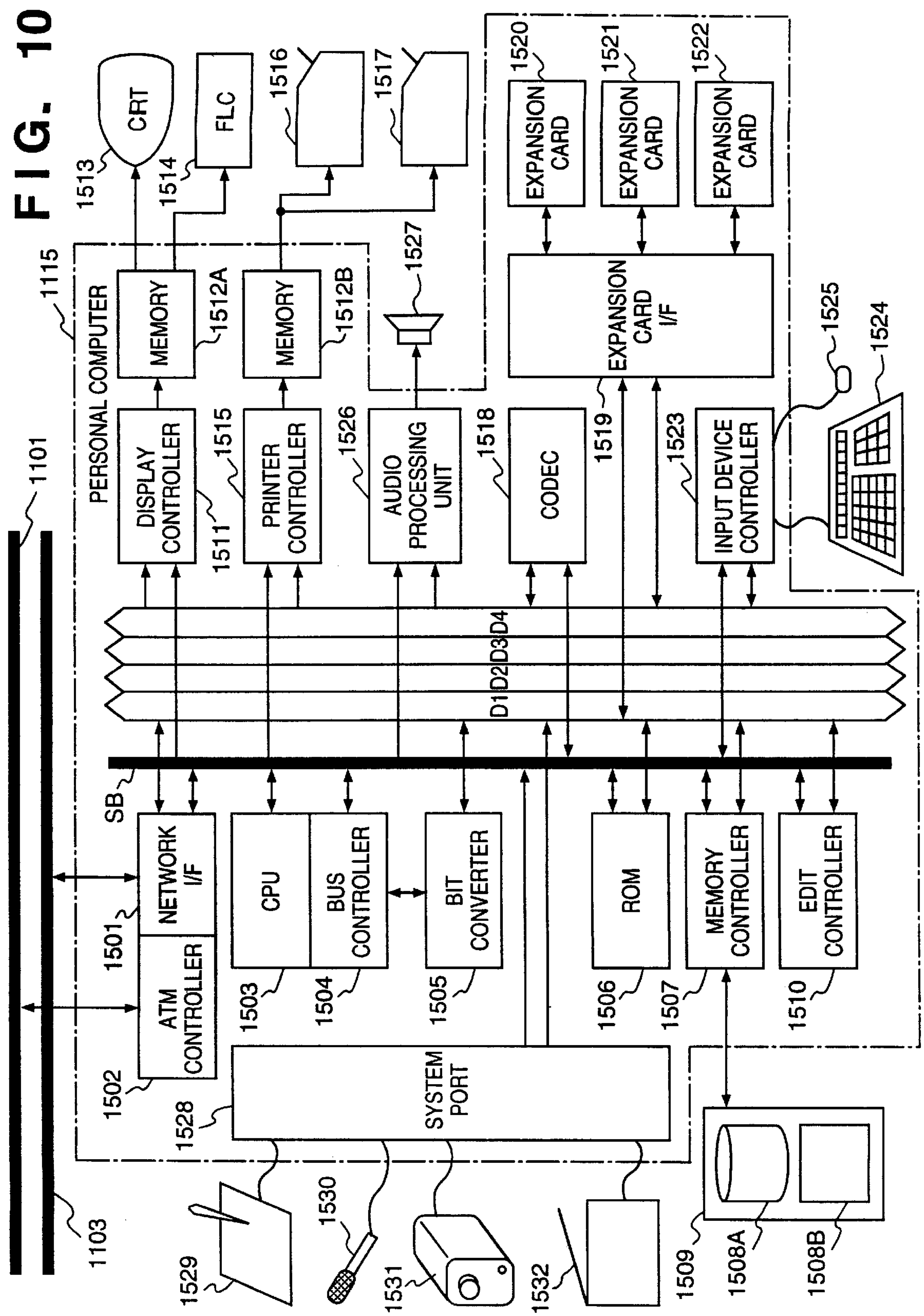
FIG. 10 is a block diagram showing the arrangement of a personal computer shown in FIG. 1.

FIG. 10 is a block diagram showing the arrangement of the personal computer 1115. Reference numeral 1501 denotes a network interface (I/F); and 1502, an ATM controller. The personal computer 1115 exchanges various kinds of data with transmission channels such as the ATM network 1101, the LAN 1103, and the like via the network I/F 1501 and the ATM controller 1502. The ATM controller 1502 not only has a function as an ATM switch, but also performs various kinds of communication control such as congestion control in the ATM network 1101.

Reference numeral 1503 denotes a CPU which controls the entire apparatus in accordance with programs pre-stored in a ROM 1506. The CPU 1503 comprises a bus controller 1504 which constitutes a multi-bus system as a sub CPU, and a bit converter 1505. The multi-bus system obtains a required processing speed by selectively using one of data buses in correspondence with the data size to be processed and the processing speed.

Reference numeral 1507 denotes a memory controller which exchanges data with an external storage device 1509 having a hard disk device 1508A and a CD-ROM drive 1508B. Reference numeral 1510 denotes an edit controller which performs phase management of data and the like in, e.g., an image edit mode.

Reference numeral 1511 denotes a display controller which supplies image data to a display device such as a CRT display 1515, an FLC display 1514, or the like via a memory 1512A, and controls the display device to display an image. The display controller 1511 appropriately performs processing in correspondence with the type of display device. Reference numeral 1515 denotes a printer controller which supplies image data to a thermal printer 1516 or a hybrid printer 1517 comprising different types of print units such as an ink-jet print unit, a thermal print unit, and the like via a memory 1512B, and controls the printer to print an image. Note that the printer 1515 selectively uses these printers in correspondence with image data to be printed. Note that a single memory may replace the memories 1512A and 1512B, and may be shared by the display and printer controllers 1511 and 1515.

Reference numeral 1518 denotes a CODEC for coding/decoding data. The CODEC 1518 corresponds to the above-mentioned JPEG and MPEG methods. Reference numeral 1519 denotes an expansion card interface. As described above, when various expansion cards 1520, 1521, and 1522 are connected to this interface, the functions of the personal computer 1115 can be expanded.

Reference numeral 1523 denotes an input device controller which connects a keyboard 1524 and a mouse 1525. Reference numeral 1526 denotes an audio processing unit which processes an audio signal and outputs it to a loudspeaker 1527. Reference numeral 1528 denotes a system port to which a tablet 1529 for handwriting input, a microphone 1530, a video camera 1531, and a scanner 1532 are connected.

The personal computer 1115 with the above-mentioned arrangement can selectively use an optimal data bus on the basis of the required transfer rate/processing speed in correspondence with the data size and processing since it comprises the multi-bus system constituted by the multi-data buses D1, D2, D3, and D4, the bus controller 1504, and the bit converter 1505. The personal computer 1115 can expand its functions by the expansion cards connected to the expansion card interface 1519. For example, when a CODEC board for performing coding/decoding corresponding to the above-mentioned profiles is connected, processing operations corresponding to these profiles can be easily realized.

CODEC

The arrangement of the CODEC 1518 will be described below.

Figure 11:
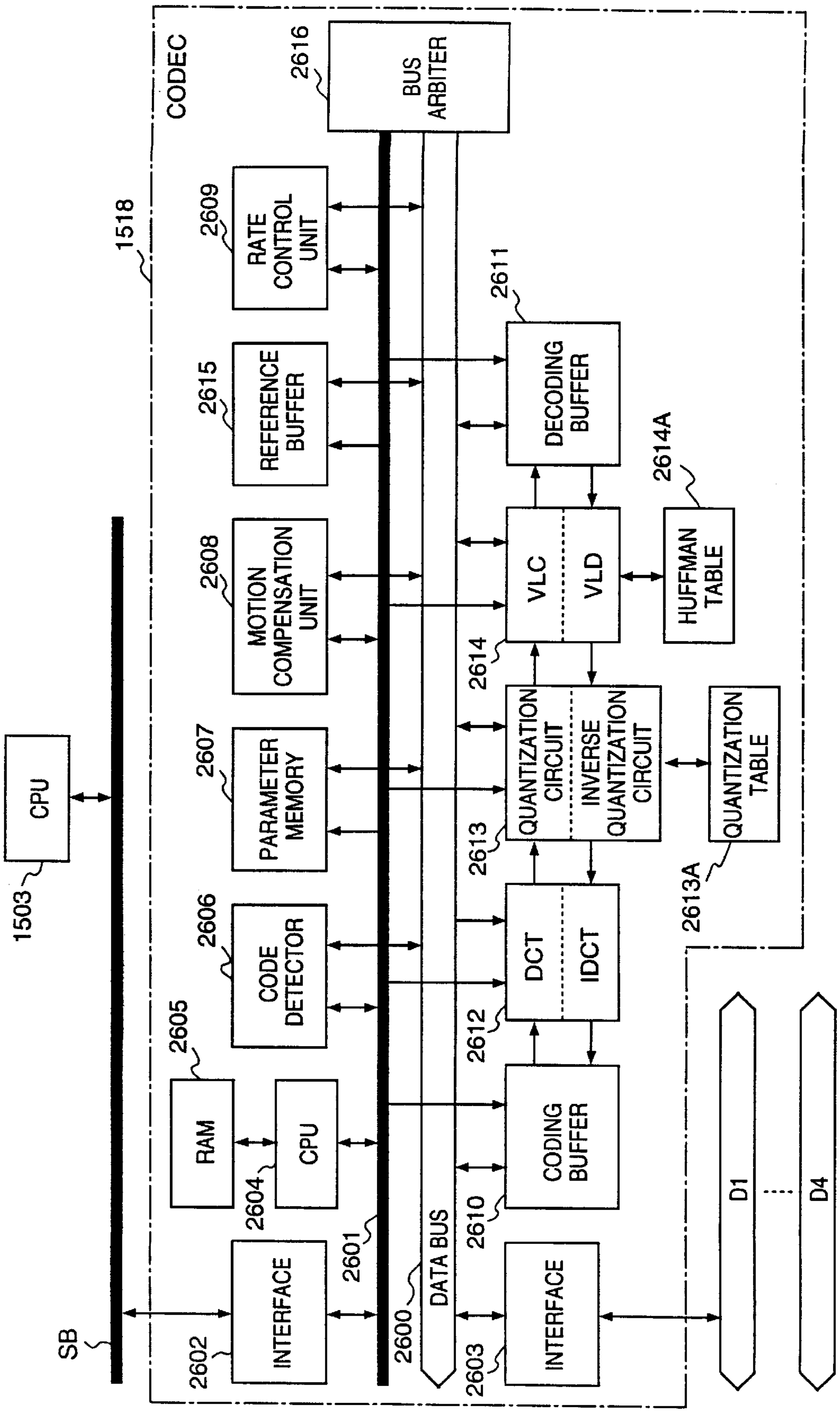
FIG. 11 is a block diagram showing the arrangement of a CODEC shown in FIG. 10.

FIG. 11 is a block diagram showing the arrangement of the CODEC 1518. Reference numeral 2600 denotes a data bus; and 2601, a system bus. These buses connect the respective function blocks each other. The system bus 2601 and the system bus SB of the personal computer 1115 main body are coupled to each other via an interface 2602, and the data bus 2600 and the respective data buses of the personal computer 1115 main body are coupled to each other via an interface 2603. Reference numeral 2616 denotes a bus arbiter for performing arbitration of the data bus 2600 in, e.g., pipeline processing.

Reference numeral 2604 denotes a CPU for performing the operation control of the entire CODEC 1518. The CPU 2604 controls the respective function blocks on the basis of programs pre-stored in a RAM 2605, thus executing coding/decoding processing.

Reference numeral 2606 denotes a code detector which detects control codes such as a start code (time code), various headers, and the like, and code data in input code data. The detected codes are supplied to the CPU 2604 via the data bus 2600 or the system bus 2601, and are utilized as information for controlling an operation. Also, the detected codes are stored in a parameter memory 2607, and are then supplied to predetermined blocks, as needed.

Reference numeral 2608 denotes a motion compensation unit which performs motion compensation of P- and B-pictures in coding and decoding modes using a reference buffer 2615, and also performs an operation for calculating the difference values of DC components in JPEG coding.

Reference numeral 2609 denotes a rate control unit; 2610, a coding buffer; 2611, a decoding buffer; 2612, a conversion unit comprising a plurality of DCT devices and inverse DCT (IDCT) devices; 2613, a quantization unit comprising a plurality of quantization circuits and inverse quantization circuits; and 2614, a variable-length coding unit comprising a plurality of VLCs and VLDs. Reference numeral 2613A denotes a quantization table for the quantization unit 2613; and 2614A, a Huffman table for the variable-length coding unit 2614. These tables appropriately receive various parameters such as quantization steps, Huffman codes, and the like required for the processing of the units from the parameter memory 2607.

The CPU 2604 of the CODEC 1518 with the above-mentioned function blocks operates predetermined units in accordance with an instruction received from the CPU 1503 of the personal computer 1115 main body, thus performing coding or decoding. More specifically, input image data transmitted via the coding buffer 2610, or the motion vector data and difference values (data to be coded) output from the motion compensation unit 2608 are processed in turn by the conversion unit 2612, the quantization unit 2613, and the variable-length coding unit 2614, and are stored in the decoding buffer 2611 serving as an output buffer. Thereafter, the stored data are output from the CODEC 1518 via the data bus 2600 and the interface 2603 at a predetermined timing instructed by the CPU 2604.

On the other hand, code data (data to be decoded) transmitted via the decoding buffer 2611 are processed in turn by the variable-length coding unit 2614, the quantization unit 2613, and the conversion unit 2612, and are stored in the coding buffer 2610 serving as an output buffer. Thereafter, the stored data are output from the CODEC 1518 via the data bus 2600 and the interface 2603 at a predetermined timing instructed by the CPU 2604.

The CODEC 1518 performs the data transfer control to the respective units and the operation control of the respective units using optimal sequences corresponding to various processing modes, e.g., when a plurality of systems of coding or decoding are simultaneously performed, when parallel processing of coding and decoding is performed, when coding/decoding is performed parallel to various processing operations such as a communication, display operation, print-out operation, and the like in the personal computer 1115 main body, and so on. Note that operation programs corresponding to these sequences are pre-stored in the RAM 2605 which comprises a static RAM, a battery-backup RAM, or the like. The programs stored in the RAM 2605 can be updated as needed.

Arrangement of Color Copying Machine

The arrangement of the image processing apparatus of the color copying machines 1109 and 1119 will be described below.

Reader Section

Figure 12A:
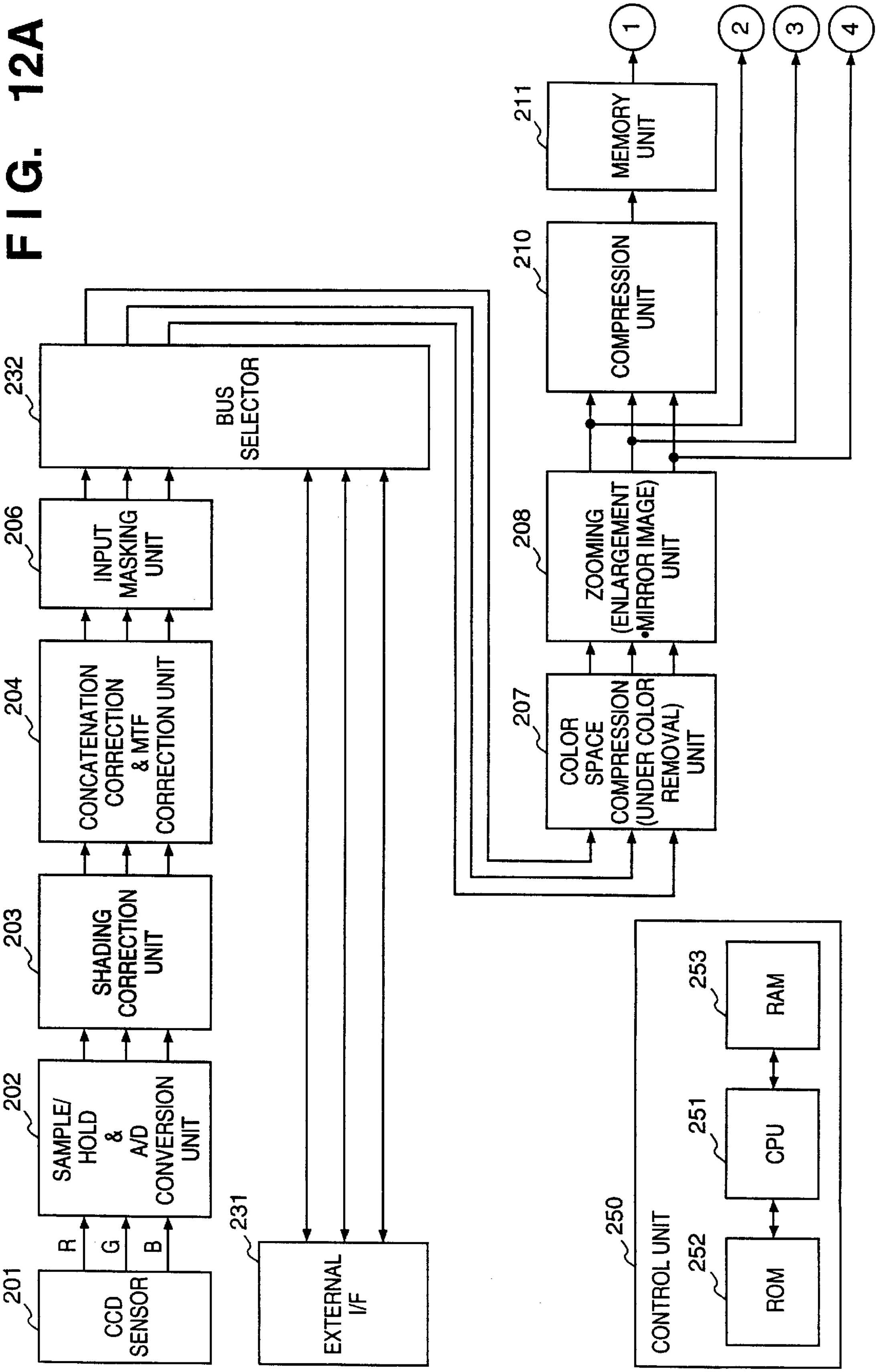
FIGS. 12A to 12C are block diagrams showing the arrangement of an image processing apparatus of a color copying machine shown in FIG. 1.
Figure 12B:
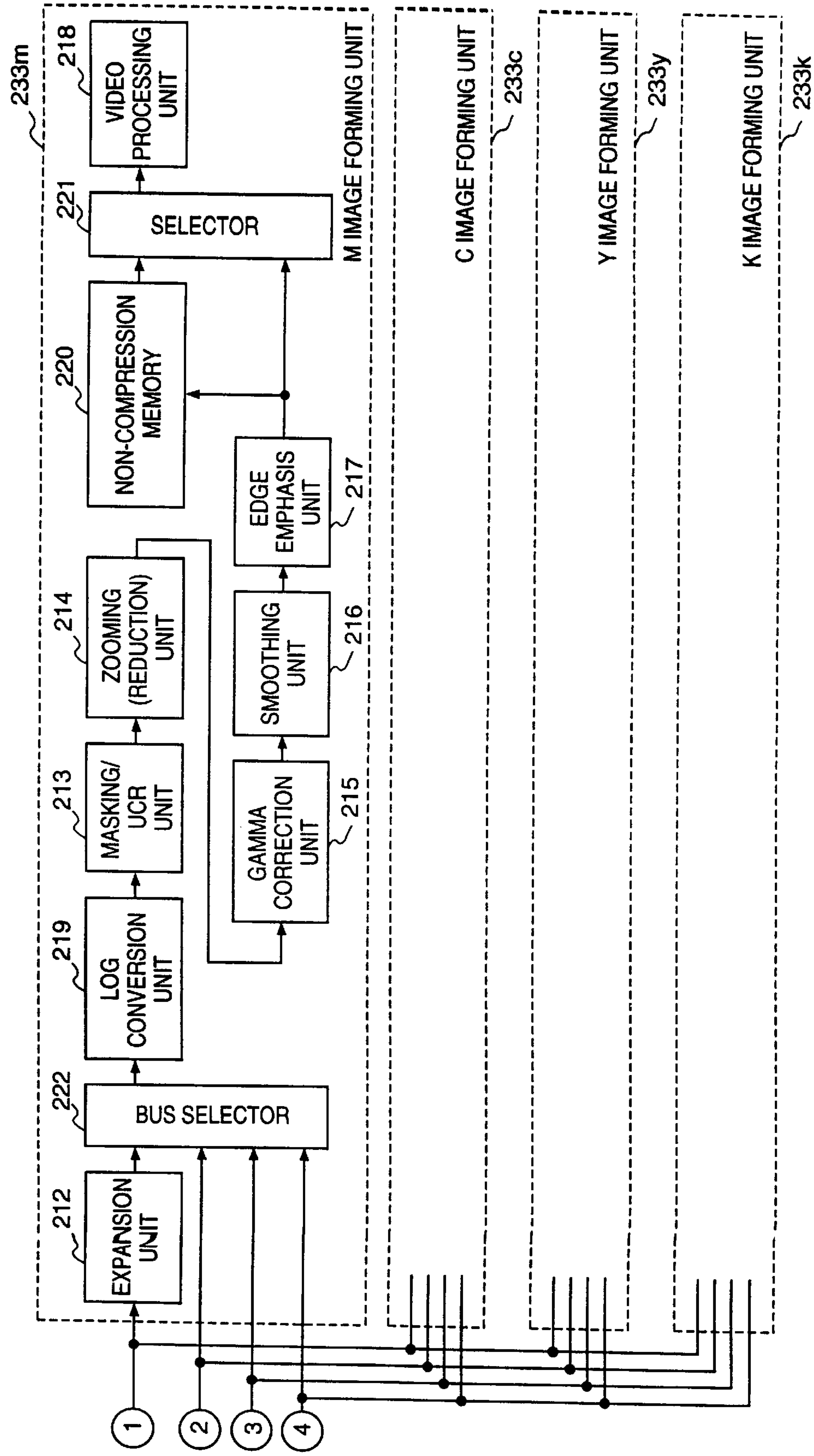

FIGS. 12A and 12B are block diagram showing the arrangement of the image processing apparatus.

Referring to FIGS. 12A and 12B, reference numeral 250 denotes a control unit comprising a CPU 251, a ROM 252, a RAM 253, and the like. The CPU 251 controls the following arrangement in accordance with control programs stored in the ROM 252, and performs various kinds of calculation processing using the RAM 253 as a work memory.

Reference numeral 201 denotes a CCD sensor which is a 3-line CCD sensor comprising three color, i.e., R, G, and B filters, and reads an original image. Reference numeral 202 denotes a sample hold & A/D conversion unit which converts analog R, G, and B signals input from the CCD sensor 201 into 8-bit digital R, G, and B image signals. Reference numeral 203 denotes a shading correction unit which performs shading correction of the A/D-converted image signals. Reference numeral 204 denotes a concatenation correction & MTF correction unit, which performs phase matching, in the sub-scan direction of the R, G, and B colors of the CCD sensor 201, correction of optical distortion, and shift correction in the sub-scan direction upon zooming of the shading-corrected image signals. Reference numeral 206 denotes an input masking unit which converts the R, G, and B image signals subjected to the above-mentioned corrections into R, G, and B image signals compatible with the apparatus.

Reference numeral 232 denotes a bus selector, which selects image signals output from the input masking unit 206 or image signals input via an external I/F 231 in accordance with a select signal from the control unit 250. Note that the external I/F 231 is a network interface for a connection to the ATM network 1101 or the LAN 1103, or a versatile interface such as Centronics, SCSI, GPIB, RS232C, RS422, or the like. The bus selector 232 can send image signals input from the input masking unit 206 to the external I/F 231. For example, a host machine (e.g., the personal computer 1115) can acquire image data obtained by reading an original image via the external I/F 231.

Reference numeral 207 denotes a color space compression unit, which compresses the color reproduction range of image signals input from the bus selector 232 in correspondence with that of an equipment which outputs an image, and removes background noise (undercolor). Reference numeral 208 denotes a zooming unit, which performs zooming processing for enlarging an image and mirror image processing for converting an image into a mirror image for image signals whose color reproduction range is compressed, as needed. Reference numeral 210 denotes a compression unit, which codes image signals input from the zooming unit 208, and stores the coded signals in a memory unit 211. The coded image signals stored in the memory unit 211 are read out by four image forming units 233*m,* 233*c,* 233*y,* and 233*k* in synchronism with an output from a printer section (to be described later), thus forming M, C, Y, and K image signals. Since the four image forming units 233*m,* 233*c,* 233*y,* and 233*k* have an identical arrangement, only the M image forming unit 233*m* will be described below, and a description of the other units will be omitted.

Reference numeral 212 denotes an expansion unit, which decodes the coded image signals input from the memory unit 211. When original image signals are compressed by a lossy compression method, image quality may deteriorate by this expansion in some cases. Reference numeral 222 denotes a bus selector which selects image signals output from the expansion unit 212 or image signals output from the zooming unit 208 in accordance with a select signal from the control unit 250. Reference numeral 219 denotes a LOG conversion unit which converts R, G, and B image signals input from the bus selector 222 into 8-bit M, C, and Y image signals. Reference numeral 213 denotes a masking UCR unit, which performs output masking processing and UCR processing for image signals input from the LOG conversion unit 219, and outputs an 8-bit M image signal.

Reference numeral 214 denotes a zooming unit, which performs zooming processing for reducing an image as needed for the M image signal input from the masking UCR unit 213. Reference numeral 215 denotes a gamma correction unit, which performs gamma correction of the M image signal input from the zooming unit 214 in correspondence with the color reproduction characteristics of an equipment which outputs an image. Reference numeral 216 denotes a smoothing unit which performs smoothing processing of the gamma-corrected M image signal for the purpose of, e.g., removing moiré. Reference numeral 217 denotes an edge emphasis unit, which emphasizes the edges of, e.g., characters, line images, and the like included in the M image signal subjected to the smoothing processing.

Reference numeral 220 denotes a non-compression memory, which stores the image signal input from the edge emphasis unit 217. Reference numeral 221 denotes a selector, which selects the image signal output from the edge emphasis unit 217 or the image signal output from the non-compression memory in accordance with a select signal from the control unit 250. Reference numeral 218 denotes a video processing unit, which converts the M image signal input from the selector 221 into a signal compatible with an equipment which outputs an image. For example, when the image output equipment is a laser beam printer, the video processing unit outputs a drive signal which is pulse-width modulated in correspondence with an input image signal, so as to drive a laser element.

Figure 12C:
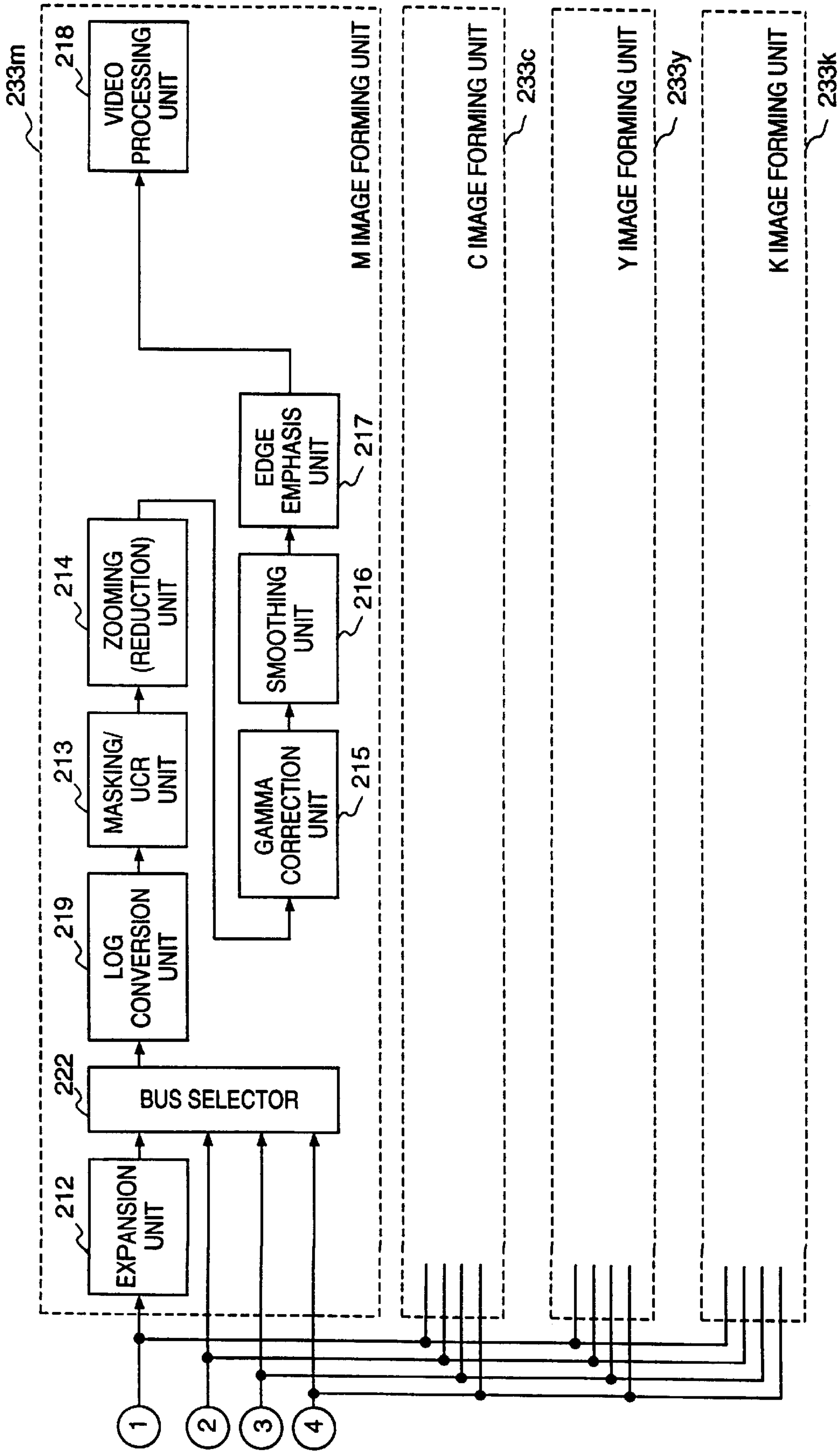

Not that the arrangement without the non-compression memory 220 is also available, as shown in FIG. 12C. As will be described in detail later, when the address space of a memory module attached to the apparatus is small, the non-compression memory 220 cannot be constituted. In this case, the image signal output from the edge emphasis unit 217 is directly input to the video processing unit 218.

Arrangement of Printer Section

Figure 13:
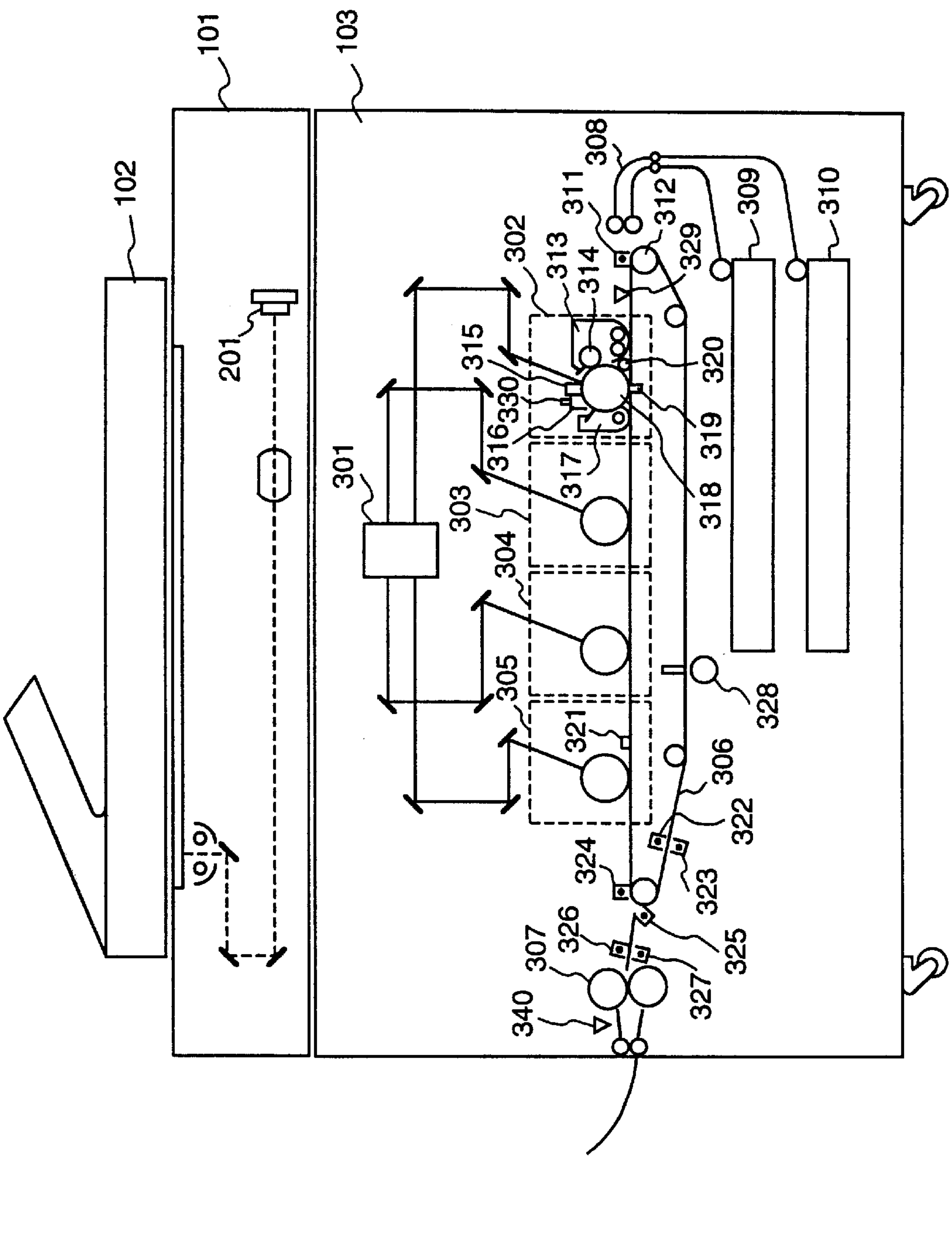
FIG. 13 is a schematic sectional view of the color copying machine shown in FIG. 1.

FIG. 13 is a schematic sectional view of the color copying machines 1109 and 1119 shown in FIG. 1. The color copying machine is roughly divided into two arrangements. Reference numeral 101 denotes a reader section, which reads a color original image, and performs image processing, as described above. Reference numeral 103 denotes a printer section, which comprises different image carriers, and reproduces a color image in accordance with respective color digital image signals supplied from the reader section 101. Note that an original feeder 102 set on the reader section 101 is a known optional device which automatically feeds originals to an original reading area of the reader section 101.

Reference numeral 301 denotes a polygonal scanner, which scans laser beams emitted by four laser elements (not shown) driven in units of M, C, Y, and K colors by the video processing unit 218 onto photosensitive drums of image forming units corresponding to the respective colors, and detects the scanned laser beams using a beam detection sensor (not shown; to be referred to as a "BD sensor" hereinafter), thereby generating a main scan synchronization signal. Reference numeral 302 denotes an M (magenta) image forming unit; 303, a C (cyan) image forming unit; 304, a Y (yellow) image forming unit; and 305, a K (black) image forming unit. These image forming units form images of the corresponding colors. Since the image forming units 302 to 305 have an identical arrangement, the M image forming unit 302 will be described in detail below, and a description of the other image forming units will be omitted.

In the M image forming unit 302, reference numeral 318 denotes a photosensitive drum, on the surface of which a latent image is formed by the laser beam scanned by the polygonal scanner 301. Reference numeral 315 denotes a primary charger for charging the surface of the photosensitive drum 318 to a predetermined potential, thus preparing for latent image formation. Reference numeral 313 denotes a developer which develops the latent image on the photosensitive drum 318 to form a toner image. Note that the developer 313 includes a sleeve 314 for performing development by applying a developing bias. Reference numeral 319 denotes a transfer charger for performing discharging from the back surface of a transfer belt 306 and transferring the toner image on the photosensitive drum 318 onto a recording sheet or the like on the transfer belt 306. After the transfer operation, the surface of the photosensitive drum 318 is cleaned by a cleaner 317, and is subjected to charge removal by an auxiliary charger 316. Furthermore, any residual charge on the surface of the drum 318 is removed by a pre-exposure lamp 330 so that a satisfactory charging state can be obtained by the primary charger 315.

A procedure for forming an image on, e.g., a recording sheet will be explained below. Reference numeral 308 denotes a paper feed unit for feeding recording sheets or the like stored in a cassette 309 or 310 to the transfer belt 306. The recording sheet fed from the paper feed unit 308 is charged by an attraction charger 311. Reference numeral 312 denotes a transfer belt roller, which drives the transfer belt 306, and charges the recording sheet or the like in combination with the attraction charger 311, thus attaching the recording sheet or the like onto the transfer belt 306. Reference numeral 329 denotes a paper leading end sensor for detecting the leading end of the recording sheet or the like on the transfer belt 306. Note that the detection signal output from the paper leading end sensor 329 is supplied from the printer section 103 to the reader section 101, and is used as a sub-scan synchronization signal used when the reader section 101 supplies a video signal to the printer section 103.

Thereafter, the recording sheet or the like is conveyed by the transfer belt 306, and toner images are formed on the surface of the recording sheet in the order of M, C, Y, and K images by the image forming units 302 to 305. The recording sheet or the like, which has passed the K image forming unit 305 is subjected to charge removal by a charge removal charger 324 to facilitate separation from the transfer belt 306, and thereafter, is separated from the transfer belt 306. Reference numeral 325 denotes a peeling charger, which prevents an image error caused by peeling discharging upon separation of the recording sheet or the like from the transfer belt 306. The separated recording sheet or the like is charged by pre-fixing chargers 326 and 327 to assist the toner attraction force and to prevent an image error. Thereafter, the toner images on the recording sheet or the like are thermally fixed by a fixing device 307, and the recording sheet or the like is exhausted. Reference numeral 340 denotes a paper exhaust sensor which detects if the recording sheet or the like is exhausted.

Data Compression Unit

The compression method in the data compression unit of this embodiment is different from a standardized compression method such as the JPEG method. More specifically, since in an image to be processed by the image processing apparatus, image data such as characters, thin lines, and the like has relatively high frequency of occurrence, a method that can effectively reproduce these image data is adopted. Furthermore, since fixed-length coding is adopted, the output speed of image data need not be varied. Thus, an image compression method suitable for the image processing apparatus is adopted.

Figure 14:
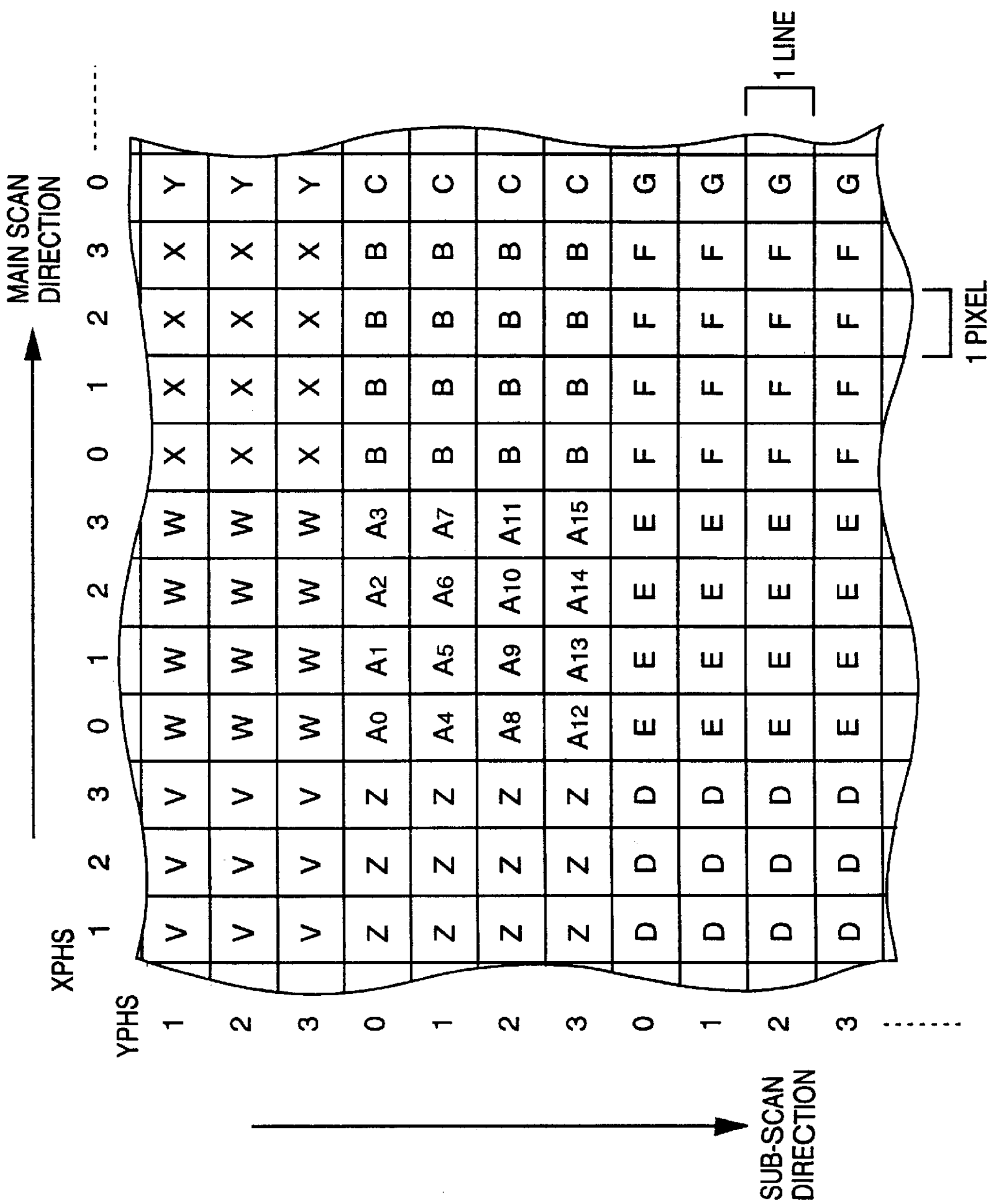
FIG. 14 is a view for explaining coding performed by a compression unit shown in FIG. 12A.

FIG. 14 is a view for explaining coding performed by the compression unit 210. One square in FIG. 14 corresponds to one pixel, whose R, G, and B components are respectively expressed by 8 bits. A total of 16 pixels (=4×4 pixels) form one block, and 384-bit data (=16 pixels×3 colors×8 bits) is compressed to 1/6, thus obtaining 64-bit fixed length data. This coding uses vector quantization and orthogonal transformation coding (to be described later).

Color Space Conversion Unit

Figure 15:
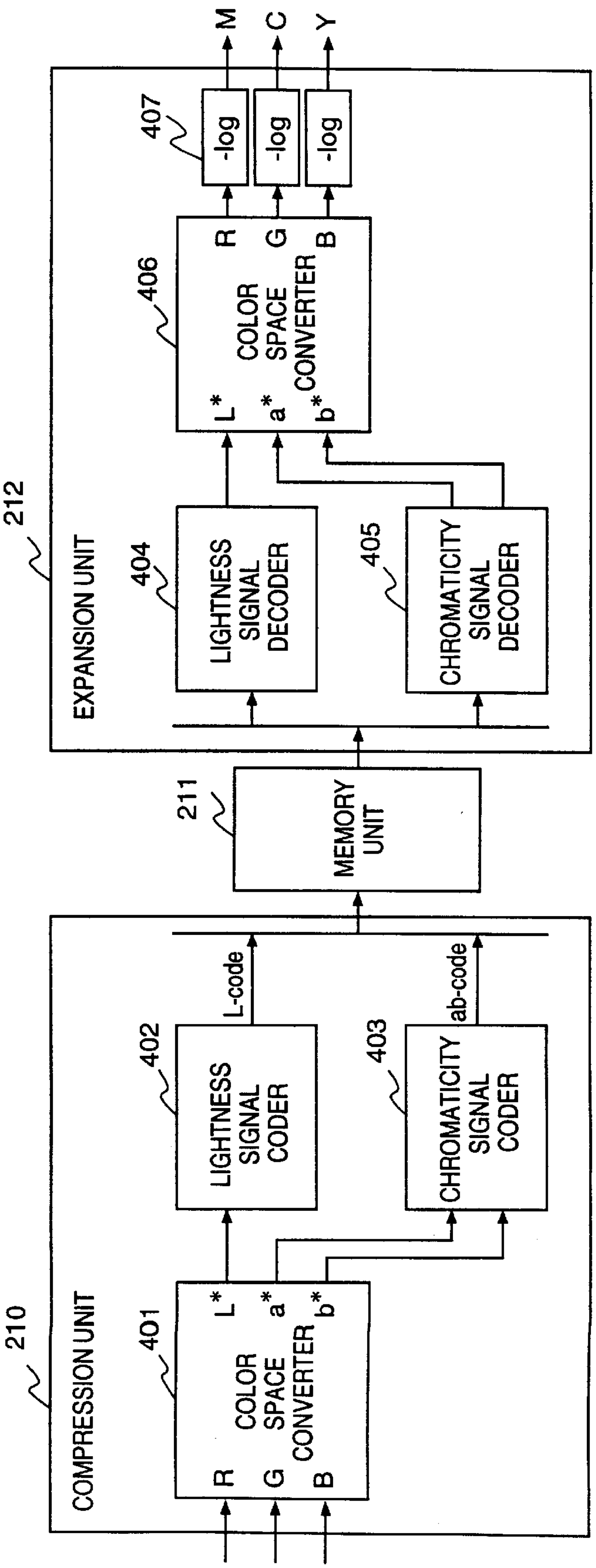
FIG. 15 is a block diagram showing the detailed arrangement of the compression unit shown in FIG. 12A and an expansion unit shown in FIG. 12B.

FIG. 15 is a block diagram showing the detailed arrangement of the compression unit 210 and the expansion unit 212.

Referring to FIG. 15, reference numeral 401 denotes a color space converter, which converts R, G, and B image signals input to the compression unit 210 into a lightness signal L* and chromaticity signals a* and b*. Note that the L*, a*, and b* signals are those representing a uniform color space as defined by CIE, and are given by:

$$\begin{bmatrix} L^* \\ a^* \\ b^* \end{bmatrix} = \begin{bmatrix} 0 & \alpha 12 & 0 \\ \alpha 21 & \alpha 22 & 0 \\ 0 & \alpha 32 & \alpha 33 \end{bmatrix} \begin{bmatrix} (x/x0)^{1/3} \\ (y/y0)^{1/3} \\ (z/z0)^{1/3} \end{bmatrix} \quad (1)$$

where αij, x0, y0, and z0 are constants.

X, Y, and Z in equation (1) are signals obtained by calculating the R, G, and B signals, and are given by:

$$\begin{bmatrix} X \\ Y \\ Z \end{bmatrix} = \begin{bmatrix} \beta 11 & \beta 12 & \beta 13 \\ \beta 21 & \beta 22 & \beta 23 \\ \beta 31 & \beta 32 & \beta 33 \end{bmatrix} \begin{bmatrix} R \\ G \\ B \end{bmatrix} \quad (2)$$

where βij is a constant.

Reference numeral 402 denotes a lightness signal coder, which codes the lightness signal L* in units of 4×4 pixel blocks, and outputs a code signal L-code and an attribute signal E-code which represents whether or not the pixel block of interest corresponds to an edge portion. Reference numeral 403 denotes a chromaticity signal coder, which codes the chromaticity signals a* and b* in units of 4×4 pixel blocks, and outputs a code signal ab-code.

These code signals are stored in the memory unit 211, and are read out by the expansion unit 212. Reference numeral 404 denotes a lightness signal decoder, which decodes the input code signal L-code to obtain the lightness signal L*. Reference numeral 405 denotes a chromaticity signal decoder, which decodes the input code signal ab-code to obtain the chromaticity signals a* and b*. Reference numeral 406 denotes a color space converter for converting the decoded L*, a*, and b* image signals into original R, G, and B image signals. Reference numeral 407 denotes log converters for respectively converting the R, G, and B signals input from the color space converter 406 into M, C, and Y image signals.

Lightness Signal Coder

Figure 16:
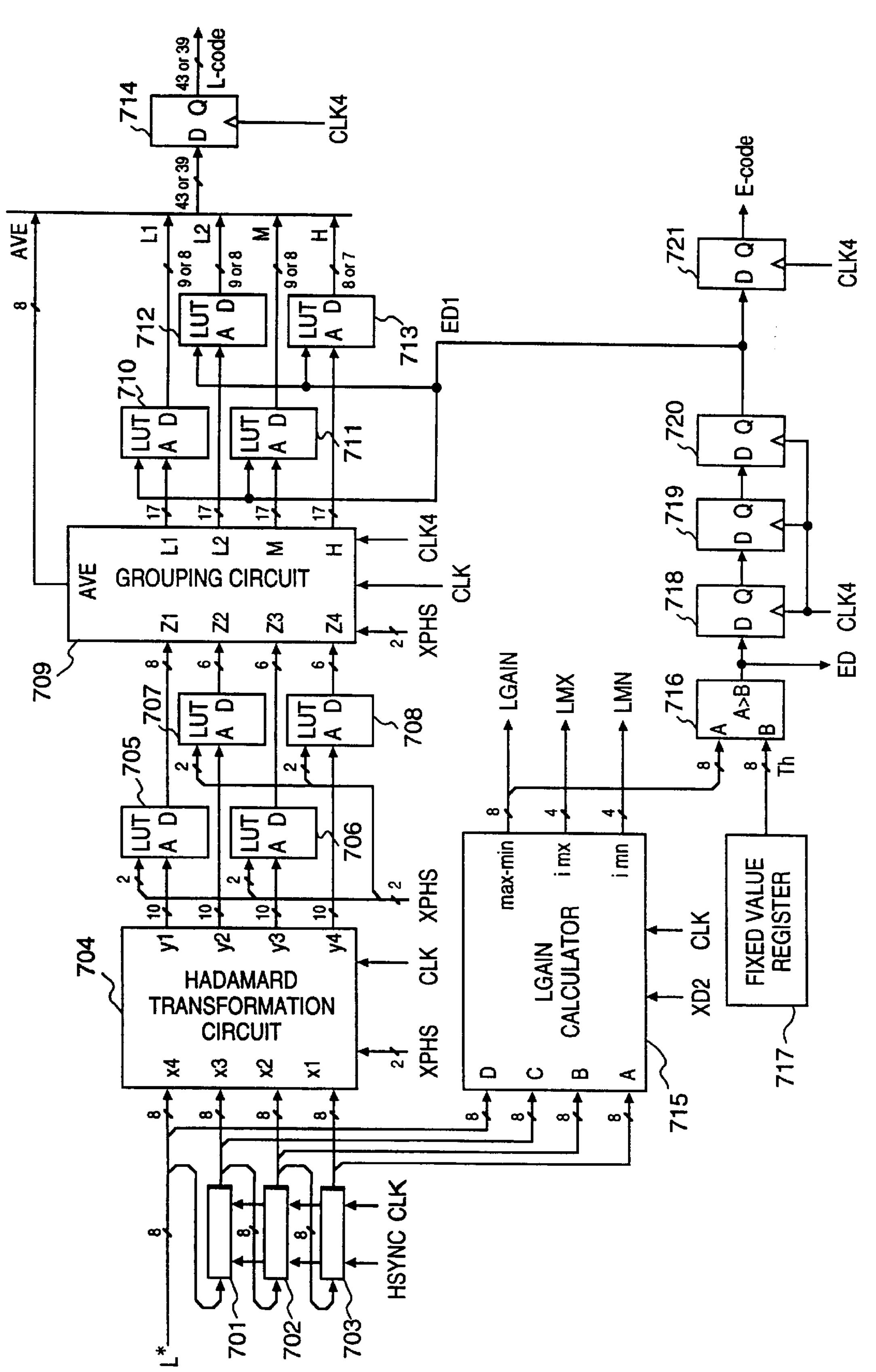
FIG. 16 is a block diagram showing the detailed arrangement of a lightness signal coder shown in FIG. 15.

FIG. 16 is a block diagram showing the detailed arrangement of the lightness signal coder 402, and FIGS. 17A to 17D and FIGS. 18A to 18E are views showing the principle of lightness signal coding.

Coding (compression) of image data is performed in units of blocks each including a total of 16 pixels (=four pixels in the main scan direction×four lines in the sub-scan direction), as shown in FIG. 14. Note that reference symbol XPHS denotes a 2-bit signal which indicates the main scan position, and repetitively assumes values 0, 1, 2, and 3; and YPHS, a 2-bit signal which indicates the sub-scan position, and repetitively assumes values 0, 1, 2, and 3. As shown in FIG. 14, a 4×4 pixel block is extracted in synchronism with the signals XPHS and YPHS.

The principle of lightness signal coding will be explained below. A 4×4 Hadamard transformation given by equation (3) of lightness information Xij (i, j=1, 2, 3, 4) extracted into the 4×4 pixel block shown in FIG. 17A yields Yij (i, j=1, 2, 3, 4) shown in FIG. 17B. The Hadamard transform is a kind of orthogonal transform, and develops 4×4 data by a two-dimensional Walsh function. This transformation corresponds to transformation of a signal in the time or spatial domain into one in the frequency or spatial frequency domain by Fourier transformation.

More specifically, the Hadamard-transformed matrix Yij (i, j=1, 2, 3, 4) has signals corresponding to spatial frequency components of the matrix Xij (i, j=1, 2, 3, 4) of the input signal.

$$\begin{bmatrix} Y11 & Y12 & Y13 & Y14 \\ Y21 & Y22 & Y23 & Y24 \\ Y31 & Y32 & Y33 & Y34 \\ Y41 & Y42 & Y43 & Y44 \end{bmatrix} = (1/4)H^T \begin{bmatrix} X11 & X12 & X13 & X14 \\ X21 & X22 & X23 & X24 \\ X31 & X32 & X33 & X34 \\ X41 & X42 & X43 & X44 \end{bmatrix} H \quad (3)$$

where H is the 4×4 Hadamard matrix, and $H^T$ is the transposed matrix of H:

$$H = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

As in the two-dimensional Fourier transformation, in the Hadamard-transformed result Yij (i, j=1, 2, 3, 4), higher frequency components are distributed in the sub-scan direction as the value i (i.e., the row position) becomes larger, and higher frequency components are distributed in the main scan direction as the value j (i.e., the column position) becomes larger. In particular, when i=j=1, Yij=(¼)ΣXij, and a signal corresponding to the DC component, i.e., the average value of the input data Xij (i, j=1, 2, 3, 4) (strictly speaking, a signal assuming a value obtained by multiplying the average value with 4) is output.

As is generally known, an image read by an image scanner has a smaller number of high spatial frequency components due to the resolution of a reading sensor such as a CCD, the transmission characteristics of an optical system, and the like. Furthermore, by also utilizing the fact that the visual sensitivity characteristics of human eye have low sensitivity to high spatial frequency components, the Hadamard-transformed signals Yij (i, j=1, 2, 3, 4) are scalar-quantized to obtain Zij (i, j=1, 2, 3, 4) shown in FIG. 17C.

Figures 17A, 17B, 17C, 17D:
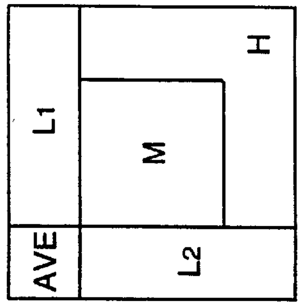
FIGS. 17A to 17D are views showing the principle of lightness signal coding.
Figure 18E:
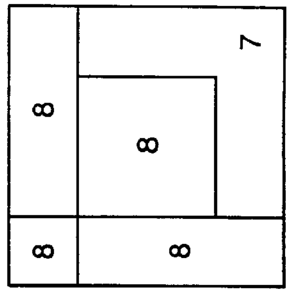
FIGS. 18A to 18E are views showing the principle of lightness signal coding.
Figure 18D:
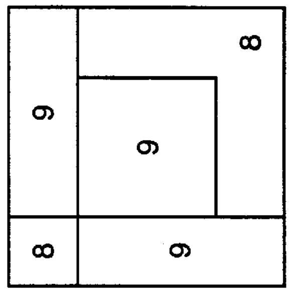
Figure 18C:
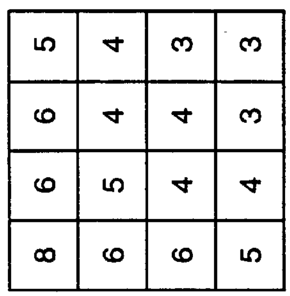
Figure 18B:
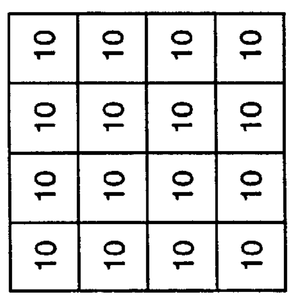
Figure 18A:
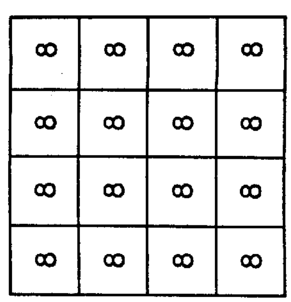

FIG. 18A shows the numbers of bits of respective elements of the lightness information Xij (i, j=1, 2, 3, 4), FIG. 18B shows the numbers of bits of respective elements of the Hadamard-transformed result Yij (i, j=1, 2, 3, 4), and FIG. 18C shows the numbers of bits of respective elements of the scalar-quantized result Zij (i, j=1, 2, 3, 4). As shown in FIGS. 18A to 18C, an element Y11, i.e., the DC component, is quantized using the largest number of bits (8 bits) to obtain Z11, and components with higher spatial frequencies are quantized using a smaller number of bits. Furthermore, as shown in FIG. 17D, 16 elements of Zij (i, j=1, 2, 3, 4) are divided into groups including a DC component and four AC components. More specifically, as shown in Table 1 below, the DC component Z11 is assigned to a signal AVE, a group of main scan AC components Z12, Z13, and Z14 are assigned to a signal L1, a group of sub-scan AC components Z21, Z31, and Z41 are assigned to a signal L2, a group of main scan and sub-scan middle-frequency AC components Z22, Z23, Z32, and Z33 are assigned to a signal M, and a group of main scan and sub-scan high-frequency AC components Z24, Z34, Z43, and Z44 are assigned to a signal H.

TABLE 1

| Signal Name | Component | Element |
|---|---|---|
| AVE | DC component (average value) | Z11 |
| L1 | main scan AC component | Z12, Z13, Z14 |
| L2 | sub-scan AC component | Z21, Z31, Z41 |
| M | main scan and sub-scan middle-frequency AC components | Z22, Z23, Z32, Z33 |
| H | main scan and sub-scan high-frequency AC components | Z24, Z34, Z42, Z43, Z44 |

Furthermore, the code lengths are changed depending on whether or not the pixel block of interest is an edge portion in an image, thus performing coding in units of groups. When the pixel block of interest is an edge portion, the respective groups are coded using the code lengths shown in FIG. 18D, and when the pixel block of interest is a non-edge portion, the respective groups are coded using the code lengths shown in FIG. 18E. More specifically, in the edge portion, since information of the AC components is important, larger code lengths are assigned to the AC component signals L1, L2, M, and H.

Referring to FIG. 16, reference numerals 701, 702, and 703 denote line memories, which delay image data by one line so as to extract the pixel block shown in FIG. 14. Reference numeral 704 denotes an Hadamard transformation circuit, which calculates the transform given by equation (3). More specifically, in synchronism with signals CLK and XPHS, data corresponding to X11, X12, X13, and X14 are input to a terminal x1 of the Hadamard transformation circuit 704, data corresponding to X21, X22, X23, and X24 are input to a terminal x2, data corresponding to X31, X32, X33, and X34 are input to a terminal x3, and data corresponding to X41, X42, X43, and X44 are input to a terminal x4. The Hadamard-transformed signals are delayed by eight pulses of the signal CLK, signals Y11, Y12, Y13, and Y14 are output from a terminal y1, signals Y21, Y22, Y23, and Y24 are output from a terminal y2, signals Y31, Y32, Y33, and Y34 are output from a terminal y3, and signals Y41, Y42, Y43, and Y44 are output from a terminal y4.

Reference numerals 705 to 708 denote LUTs, which comprise ROMs or the like, and perform the above-mentioned scalar quantization. More specifically, data are written in advance in the LUTs 705 to 708 to output scalar-quantized results in correspondence with the Hadamard-transformed results and the signal XPHS input to their address terminals A, so as to quantize the Hadamard-transformed outputs to the numbers of bits shown in FIG. 18C.

Figure 19:
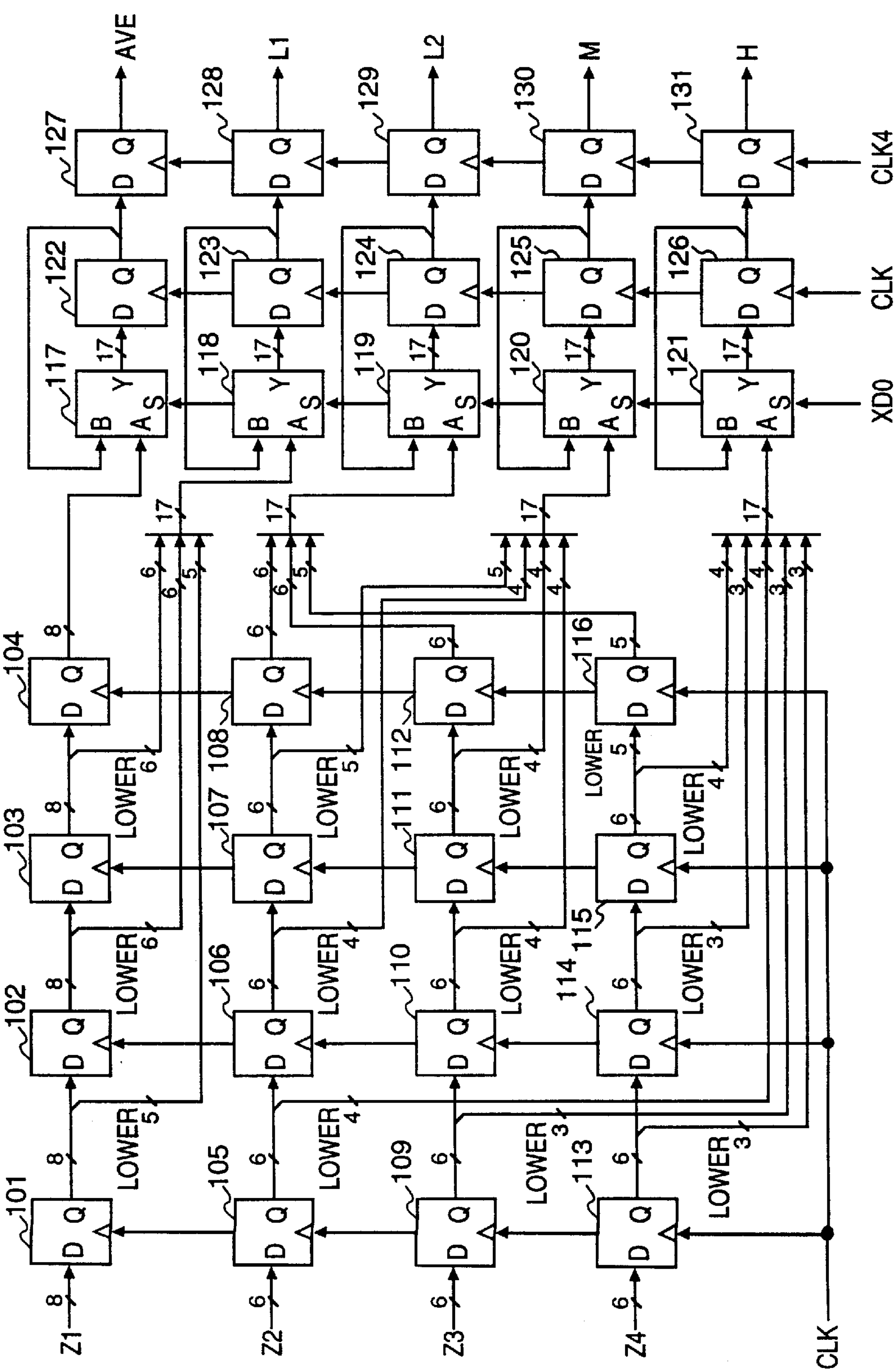
FIG. 19 is a block diagram showing the detailed arrangement of a grouping circuit shown in FIG. 16.

Reference numeral 709 denotes a grouping circuit, which performs grouping for vector quantization. FIG. 19 is a block diagram showing the detailed arrangement of the grouping circuit 709.

Referring to FIG. 19, reference numerals 101 to 116 denote flip-flops (to be referred to as "F/Fs" hereinafter), which hold 4×4 data shown in FIG. 17C by delaying input signals in synchronism with the signal CLK. The held data are divided into groups shown in Table 1 above, thereby extracting data of the signals AVE, L1, L2, M, and H.

Reference numerals 117 to 121 denote 2-input/1-output selectors. When "0" is input to a selection terminal S, each selector outputs a signal input to its terminal A; when "1" is input, it outputs a signal input to a terminal B. A signal XD0 input to the selection terminals S becomes "0" in synchronism with the signals CLK and XPHS only when the signal XPHS is "0"; otherwise, it becomes "1". Therefore, the scalar-quantized results in units of groups shown in Table 1 above are output from the selectors 117 to 121 in units of 4×4 blocks.

Referring back to FIG. 16, reference numerals 710 to 713 denote LUTs, which comprise ROMs or the like, and quantize the signals L1, L2, M, and H output from the grouping circuit 709 by known vector quantization. These LUTs quantize the group L1 to 9 bits, the group L2 to 9 bits, the group M to 8 bits, and the group H to 8 bits, thus quantizing input data to a total of 43 bits in combination with the 8-bit signal AVE.

As will be described in detail later, a signal ED1 input to the most significant bit of an address terminal A of each LUT is a signal indicating whether or not the pixel block of interest is an edge portion. The signal ED1 is input to upper addresses of each LUT, and the signals L1, L2, M, and H are input to lower addresses. When the pixel block of interest is an edge portion, the group L1 is quantized to 9 bits, the group L2 is quantized to 9 bits, the group M is quantized to 9 bits, and the group H is quantized to 8 bits, thus obtaining data of a total of 43 bits together with the 8-bit signal AVE. On the other hand, when the pixel block of interest is a non-edge portion, the group L1 is quantized to 8 bits, the group L2 is quantized to 8 bits, the group M is quantized to 8 bits, and the group H is quantized to 7 bits, thus obtaining data of a total of 39 bits together with the 8-bit signal AVE.

Furthermore, the quantized result is input to an F/F 714, and is held at the leading edge of a signal CLK4 (which becomes "1" when XPHS=0, 1; "0" when XPHS=2, 3). Then, the held result is output as a signal L-code at a predetermined timing.

On the other hand, reference numeral 715 denotes an LGAIN calculator, which receives the lightness information Xij (i, j=1, 2, 3, 4) at its terminals A, B, C, and D in units of 4×4 blocks at the same timing as the Hadamard transformation circuit 704, and calculates LGAIN representing the amplitude (maximum value−minimum value) of the lightness signal L*, LMX representing the position (coordinate position in the pixel block) of the maximum value of the lightness signal L*, and LMN representing the position (coordinate position in the pixel block) of the minimum value of the lightness signal L*.

Reference numeral 716 denotes a comparator, which compares the signal LGAIN with a threshold value Th pre-set in a fixed value register 717, and outputs a comparison result ED. More specifically, when the pixel block of interest is an edge portion, LGAIN>Th is satisfied, and the signal ED becomes "1"; when the pixel block of interest is a non-edge portion, LGAIN<Th is satisfied, and the signal ED becomes "0".

Reference numerals 718 to 720 denote F/Fs, which delay the input signal ED in synchronism with the leading edge of the signal CLK4, thus obtaining the above-mentioned signal ED1 which is synchronized with the vector quantization timing.

Reference numeral 721 denotes an F/F which delays the input signal ED1 in synchronism with the leading edge of the signal CLK4, and outputs the signal E-code.

Chromaticity Signal Coder

Figure 20:
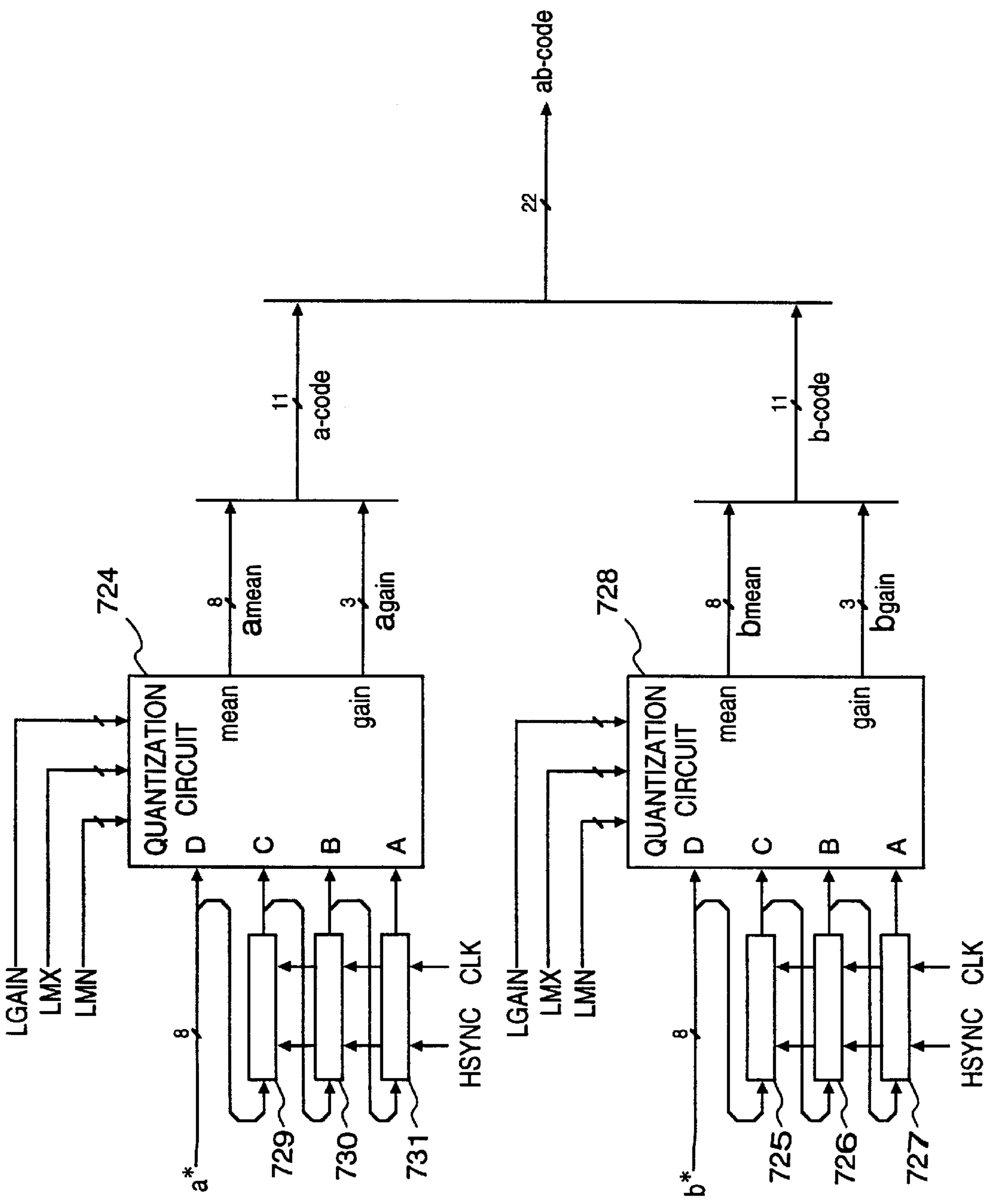
FIG. 20 is a block diagram showing the detailed arrangement of a chromaticity signal coder shown in FIG. 15.

FIG. 20 is a block diagram showing the detailed arrangement of the chromaticity signal coder 403.

Referring to FIG. 20, reference numerals 729 to 731 denote line memories, which delay the input chromaticity signal a* by one line to convert the signal into a 4×4 pixel block. Reference numeral 724 denotes a quantization circuit, which quantizes a* as the 4×4 pixel block input from the line memories 729, 730, and 731.

Similarly, reference numerals 725 to 727 denote line memories, which delay the input chromaticity signal b* by one line to convert the signal into a 4×4 pixel block. Reference numeral 728 denotes a quantization circuit, which quantizes b* as the 4×4 pixel block input from the line memories 725 to 727.

The outputs from quantization circuits 724 and 728, i.e., signals amean, again, bmean, and bgain, are combined to obtain a signal ab-code. The signal amean is the DC component of a*, the signal again is the AC component of a*, the signal bmean is the DC component of b*, and the signal bgain is the AC component of b*. Note that a delay circuit (not shown) for attaining synchronization with the lightness signal coder 402 is arranged at the output side of the chromaticity signal coder 403. Thus, the signals L-code and ab-code are output from the compression unit 210 to be in phase with each other.

Figure 21:
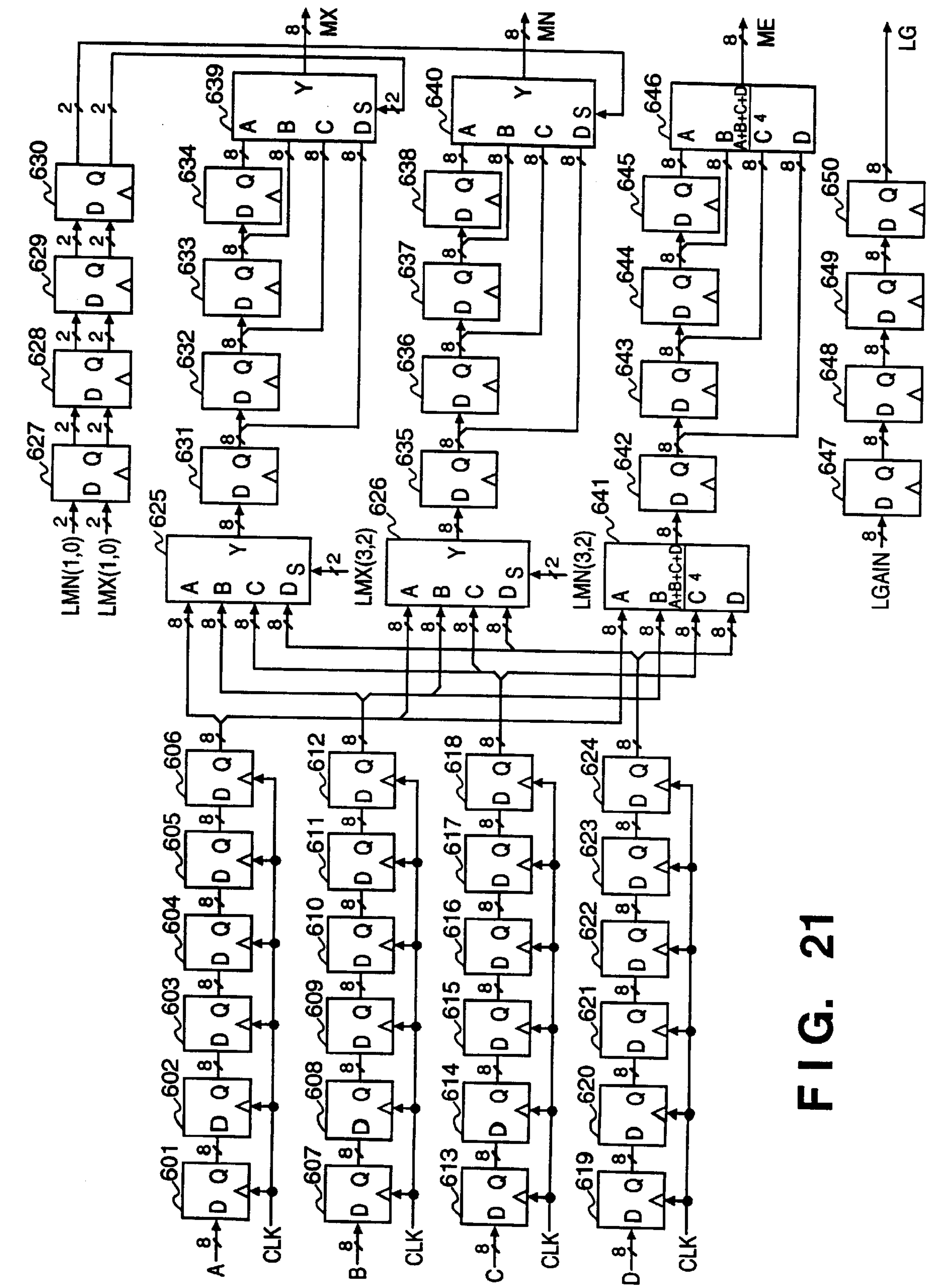
FIG. 21 is a block diagram showing the detailed arrangement of a quantization circuit shown in FIG. 20.
Figure 22:
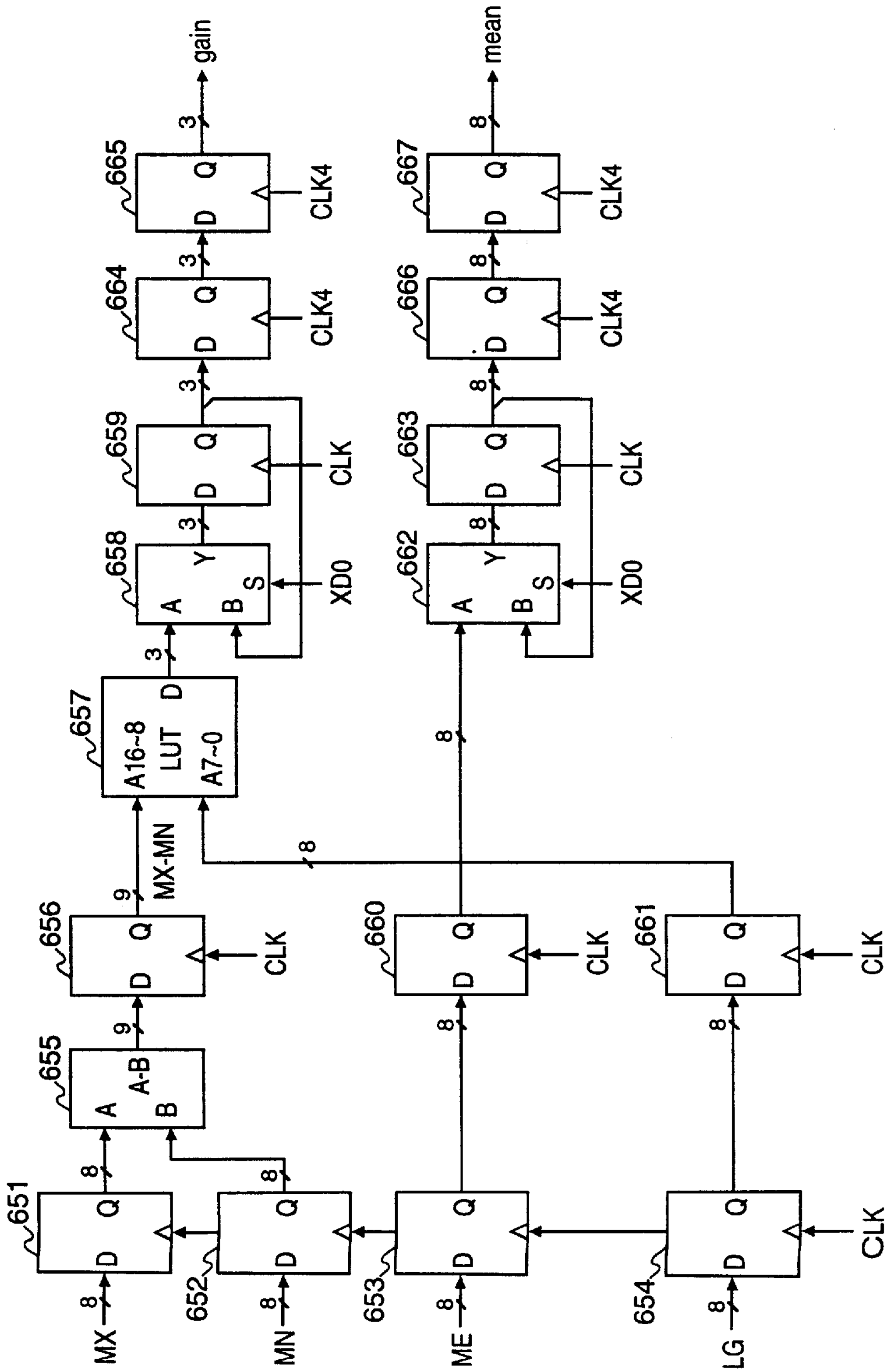
FIG. 22 is a block diagram showing the detailed arrangement of the quantization circuit shown in FIG. 20.

FIGS. 21 and 22 are block diagrams showing the detailed arrangement of the quantization circuit 724 or 728.

Referring to FIGS. 21 and 22, reference numerals 601 to 624 denote F/Fs. Four F/F groups constituted by these F/Fs respectively delay four input signals by six pulses in synchronism with the leading edge of the signal CLK, thus attaining synchronization with the lightness signal coder 402.

Reference numerals 625 and 626 denote 4-input/1-output selectors. Each selector selects and outputs a signal input to a terminal A when "0" is input to a terminal S; a signal input to a terminal B when "1" is input; a signal input to a terminal C when "2" is input; and a signal input to a terminal D when "3" is input. The terminal S of the selector 625 receives the upper 2 bits (i.e., bits 3 and 2) of the signal LMX, and the terminal S of the selector 626 receives the upper 2 bits (i.e., bits 3 and 2) of the signal LMN.

On the other hand, reference numerals 627 to 630 denote F/Fs, which delay the lower 2 bits (i.e., bits 1 and 0) of the input signal LMN and the lower 2 bits (i.e., bits 1 and 0) of the input signal LMX by four pulses in synchronism with the leading edge of the signal CLK.

Reference numerals 631 to 634 denote F/Fs, which respectively delay the signal input from the selector 625 by one to four pulses in synchronism with the leading edge of the signal CLK. Reference numerals 635 to 638 denote F/Fs, which respectively delay the signal input from the selector 626 by one to four pulses in synchronism with the leading edge of the signal CLK.

Reference numerals 639 and 640 denote 4-input/1-output selectors. The selector 639 selects and outputs one of signals input from the F/Fs 631 to 634 in accordance with the lower 2 bits of the synchronized signal LMX input from the F/F 630 to its selection terminal S, and the selector 640 selects and outputs one of signals input from the F/Fs 635 to 638 in accordance with the lower 2 bits of the synchronized signal LMN input from the F/F 630 to its selection terminal S. As a result, the value of the chromaticity signal a* or b* at the position (coordinate position) where the lightness signal L* assumes a maximum value in the 4×4 pixel block is output from the selector 639 as a signal MX, and the value of the chromaticity signal a* or b* at the position (coordinate position) where the lightness signal L* assumes a minimum value in the 4×4 pixel block is output from the selector 640 as a signal MN.

Reference numeral 641 denotes an average value calculator, which outputs an average value (A+B+C+D)/4 of signals input to its input terminals A to D. Reference numerals 642 to 645 denote F/Fs, which respectively delay the signal input from the average value calculator 641 by one to four pulses in synchronism with the leading edge of the signal CLK. Reference numeral 646 denotes an average value calculator, which outputs, as a signal ME, an average value (A+B+C+D)/4 of signals input from the F/Fs 642 to 645 to its input terminals A to D. As a result, the average value of a* or b* in the 4×4 pixel block is output as the signal ME.

Reference numerals 647 to 650 denote F/Fs, which delay the input signal LGAIN by four pulses in synchronism with the leading edge of the signal CLK, and output the delayed signal as a signal LG in synchronism with the signals MX, MN, and ME. In FIG. 22, the signals MX, MN, ME, and LG are synchronized with the leading edge of the signal CLK in F/Fs 651 to 654.

Reference numeral 655 denotes a subtracter, which subtracts the signal MN from the signal MX. More specifically, the subtracter 655 outputs a difference MX−MN of the signals a* or b* at the positions where the signal L* assumes maximum and minimum values in the 4×4 pixel block. Reference numeral 657 denotes an LUT, which receives the difference MX−MN of the signals a* or b* output from an F/F 656 at its upper address terminal, and receives the signal LG output from an F/F 661 at its lower address terminal. The LUT 657 is written in advance with data obtained by quantizing the ratio, (MX−MN)/LG, between the amplitude MX−MN of the AC components of the chromaticity signal a* or b* and the amplitude LG of the AC components of the lightness signal L* to 3 bits, and outputs data corresponding to the inputs.

Reference numerals 658 and 662 denote 2-input/1-output selectors; 659 and 663 to 667, F/Fs. Consequently, signals gain and mean are output at a predetermined timing.

Code Length

Figure 23:
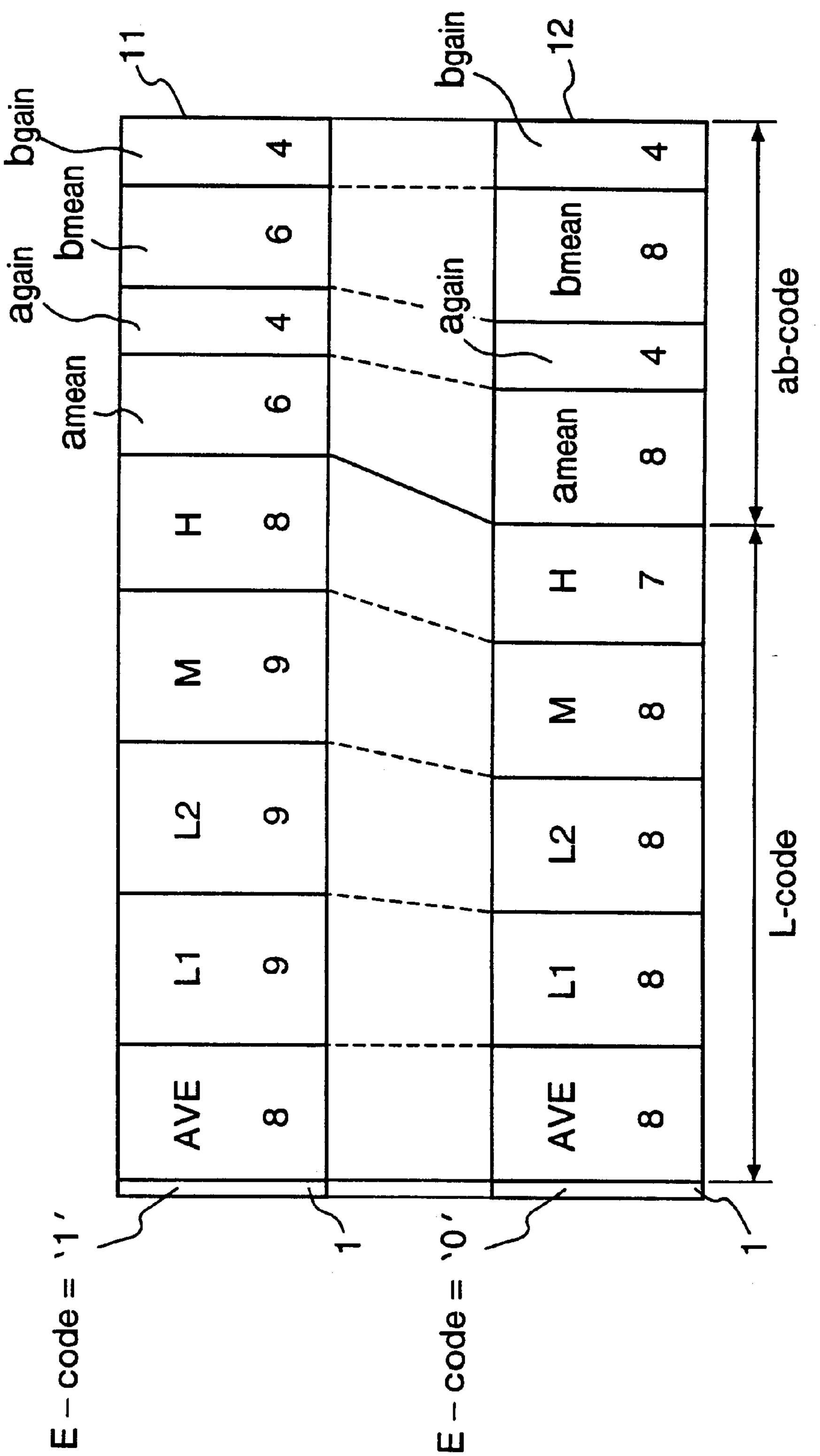
FIG. 23 is a view showing an example of the code length of a 4×4 pixel block in the coding method of the image processing apparatus shown in FIGS. 12A and 12B.

FIG. 23 shows the code lengths in the 4×4 pixel block in the coding method of the image processing apparatus shown in FIGS. 12A and 12B. Although the coding method has been briefly described above, the code lengths to be assigned may be changed in correspondence with whether or not the pixel block of interest is an edge portion. FIG. 23 shows an example wherein the code lengths to be assigned are changed. More specifically, a portion 11 shows the code lengths used when it is determined that the pixel block of interest is an edge portion, and a portion 12 shows the code lengths used when it is determined that the pixel block of interest is a non-edge portion.

One bit is assigned to a discrimination signal E-code indicating whether or not the pixel block of interest is an edge portion. Eight bits are assigned to the signal AVE as the DC component of the lightness signal L*.

In an edge portion, since the AC component information of the lightness signal L* is important, the numbers of bits to be assigned to the signals L1, L2, M, and H representing the AC components are set to be larger than those for a non-edge portion, i.e., 9, 9, 9, and 8 bits are respectively assigned to these signals. On the other hand, in a non-edge portion, 8, 8, 8, and 7 bits are assigned to these signals.

On the other hand, 6 bits (edge portion; 8 bits for a non-edge portion) are assigned to the signals amean and bmean representing the DC components of the chromaticity signals a* and b*. This is because the DC component information in a non-edge portion is more important than that in an edge portion. Four bits are assigned to the signals again and bgain representing the AC components of the chromaticity signals in both edge and non-edge portions.

As a result, when the pixel block of interest is an edge portion, a total of 43 bits are assigned to the lightness signal L*, and a total of 20 bits are assigned to the chromaticity signals a* and b*; when the pixel block of interest is a non-edge portion, a total of 39 bits are assigned to the lightness signal L*, and a total of 24 bits are assigned to the chromaticity signals a* and b*. Thus, a code having a fixed length of a total of 64 bits is obtained together with the discrimination signal E-code indicating whether or not the pixel block of interest is an edge portion.

Apparatus Timing Chart

Figure 24:
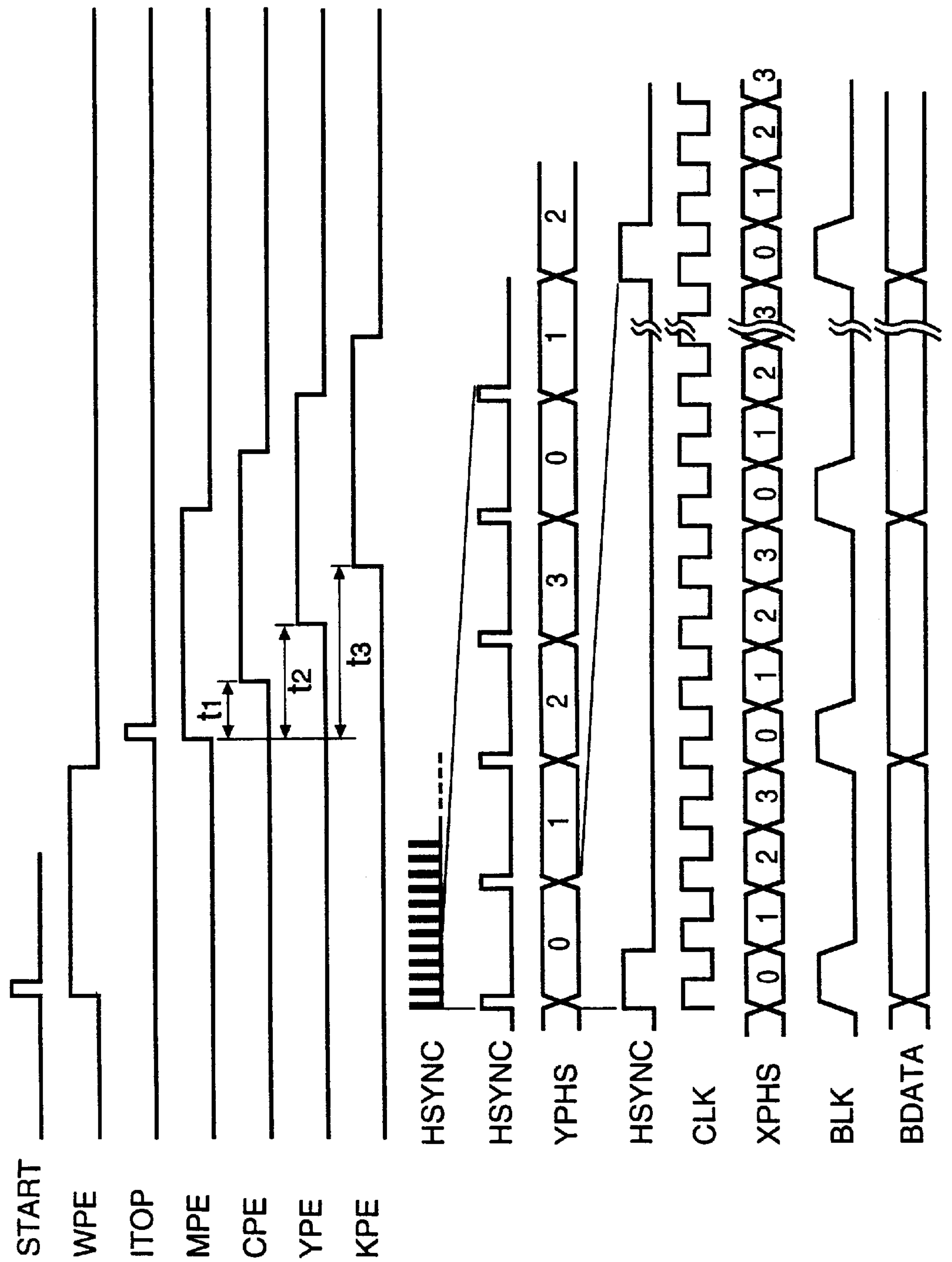
FIG. 24 is an apparatus timing chart of the color copying machine shown in FIG. 1.

FIG. 24 is an apparatus timing chart of the color copying machines 1109 and 1119.

Referring to FIG. 24, a signal START is a signal indicating the start of an original reading operation. A signal WPE represents a period in which the image scanner reads an original image, performs coding processing, and writes the code data in the memory. A signal ITOP is a signal indicating the start of a print operation. Signals MPE, CPE, YPE, and KPE are period signals for respectively driving magenta, cyan, yellow, and black semiconductor lasers.

As shown in FIG. 24, the signals CPE, YPE, and KPE are respectively delayed from the signal MPE by times t1, t2, and t3, and if the distances between the central axis of the photosensitive drum of the M image forming unit 302, and the central axes of the photosensitive drums of other image forming units are respectively represented by d1, d2, and d3, these signals are controlled to have the relationships given by equations (4) below:

$$t1=d1/v,\ t2=d2/v,\ t3=d3/v \tag{4}$$

where v is the feed speed of the recording sheet.

A signal HSYNC is a main scan synchronization signal, and the signal CLK is a pixel synchronization signal. The signal YPHS indicates the count value of a 2-bit main scan counter. A signal BLK is a synchronization signal in units of 4×4 pixel blocks, and processing is performed at timings indicated by BDATA in units of 4×4 pixel blocks.

Memory Unit

Figure 25:
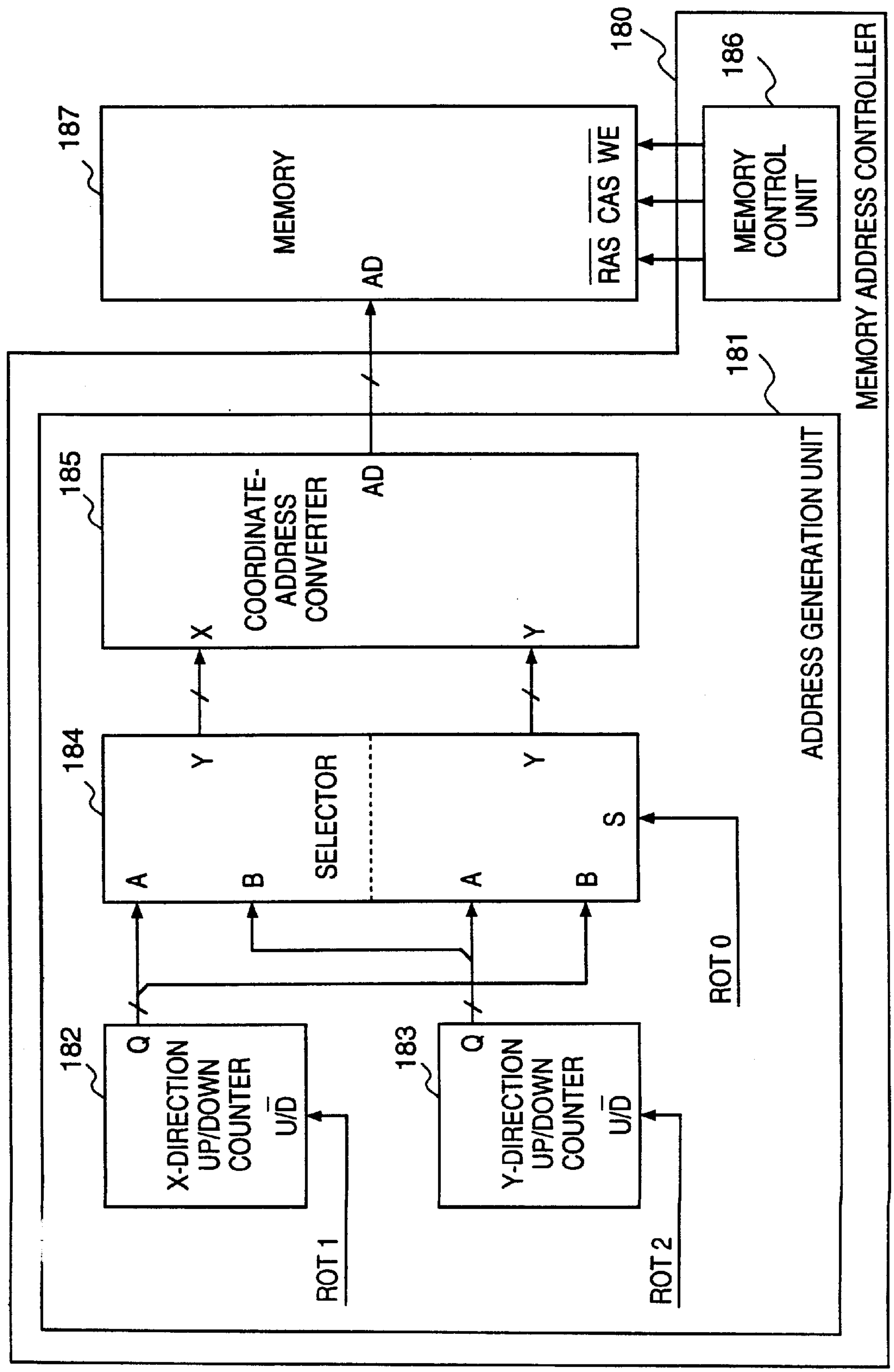
FIG. 25 is a block diagram showing the arrangement of a memory unit shown in FIG. 12A.
Figure 26A:
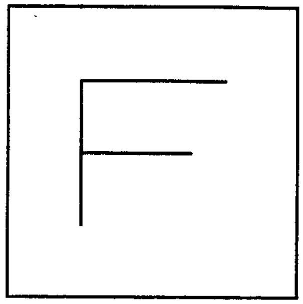
FIGS. 26A to 26H are views showing eight different images subjected to rotation and mirror image processing.
Figure 26B:
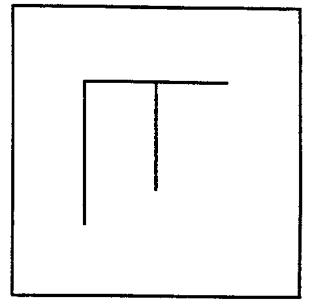
Figure 26C:
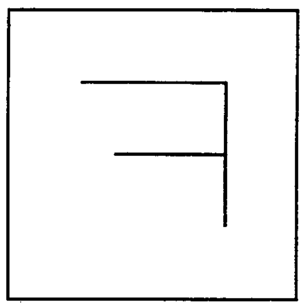
Figure 26D:
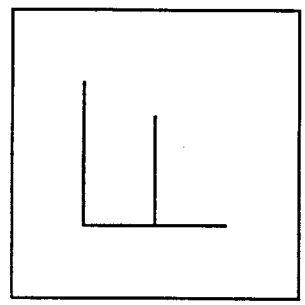
Figure 26E:
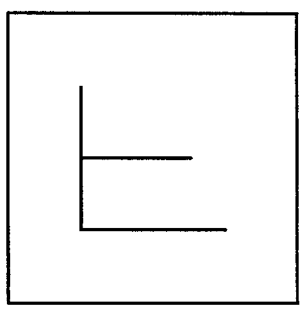
Figure 26F:
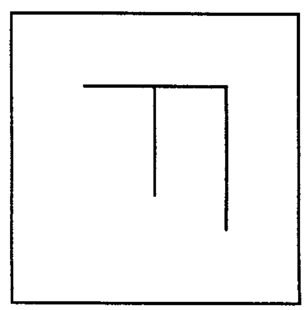
Figure 26G:
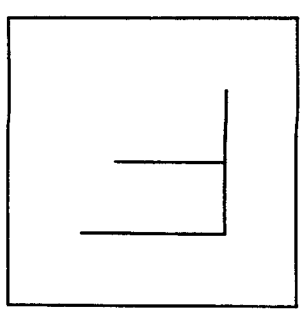
Figure 26H:
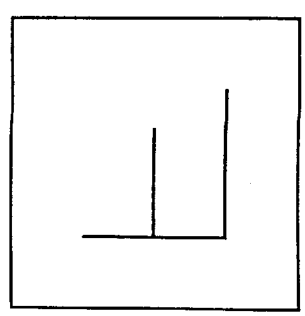

FIG. 25 is a block diagram showing the arrangement of the memory unit 211.

Reference numeral 180 denotes a memory address controller, which is constituted by an up/down counter 182 in the main scan direction (X-direction), an up/down counter 183 in the sub-scan direction (Y-direction), a selector 184 for selecting the output from one of these two counters, a coordinate-address converter 185 for converting the count value into an address of a memory 187 (comprising, e.g., a DRAM), and a memory control unit 186 for generating signals $\overline{RAS}$,, $\overline{CAS}$,, and $\overline{WE}$, (active low).

If a select signal of the selector 184 is represented by ROT0, and up/down switching signals of the two up/down counters are respectively represented by ROT1 and ROT2, the memory 187 can output eight different types of images subjected to rotation and mirror image processing, as shown in FIGS. 26A to 26H, on the basis of these signals of a total of 3 bits.

Furthermore, the memory 187 comprises one or a plurality of DRAM modules. For example, a case will be examined below wherein the memory 187 is constituted four DRAM modules having a 16-bit data width (i.e., a total of 64 bits as in the above-mentioned code length).

A plurality of types of DRAM modules (e.g., for compression and non-compression), which have the same data width but have different address spaces, are prepared. For example, when an A3-size image is to be stored at 400 dpi (the pixel interval of about 63.5 μm) as 8-bit R, G, and B data, a memory size of about 96 Mbytes (i.e., 32 Mbits (address)×8 bits (data)×3 colors) is required. In contrast to this, when image data is compressed to ⅙ in units of 4 pixels×4 lines, as described above, only a memory size of about 16 Mbytes (i.e., 2 Mbits (address)×64 bits (data) is required. Therefore, in order to store A3-size image information, a non-compression system can use a DRAM module having a 25-bit address space, and a data compression system can use a DRAM module having a 21-bit address space.

However, upon addressing A3-size image information in a 400-dpi non-compression mode, since the size in the main scan direction (X) is 297 mm (=4,677 pixels), and the size in the sub-scan direction (Y) is 420 mm (=6,614 pixels), if this information is simply addressed, 13 bits are required in both the X- and Y-directions, i.e., a total of 26 bits are required. Similarly, upon addressing A3-size image information in a 100-dpi compression mode (each block consists of 4 pixels×4 lines), 11 bits are required in both the X- and Y-directions, and a total of 22 bits are required. Therefore, these address bits cannot fall within their address spaces (32 Mbits in the non-compression mode, and 2 Mbits in the compression mode).

Figure 27:
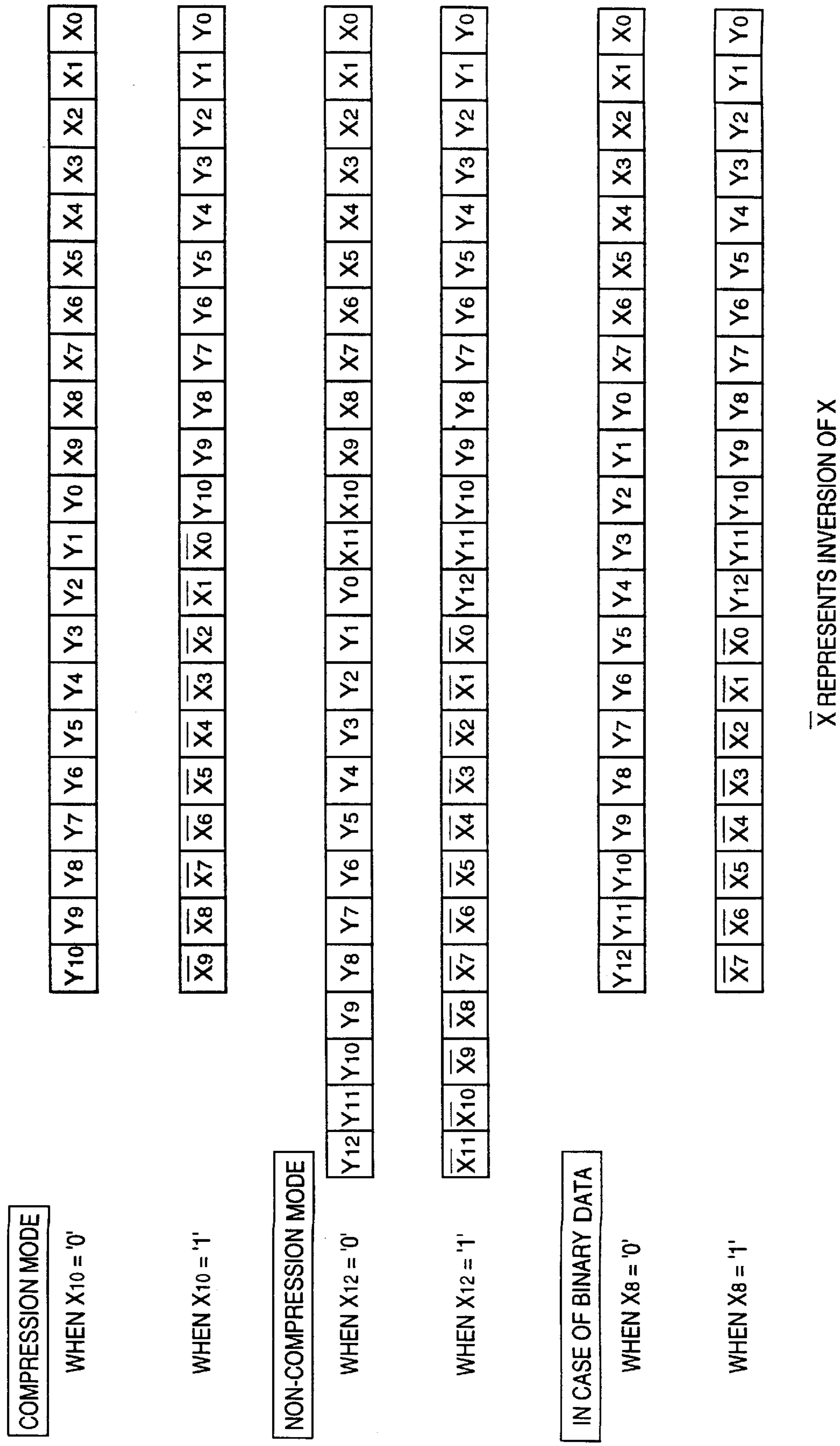
FIG. 27 is a view showing the addresses to be assigned to a memory shown in FIG. 25.
Figure 28:
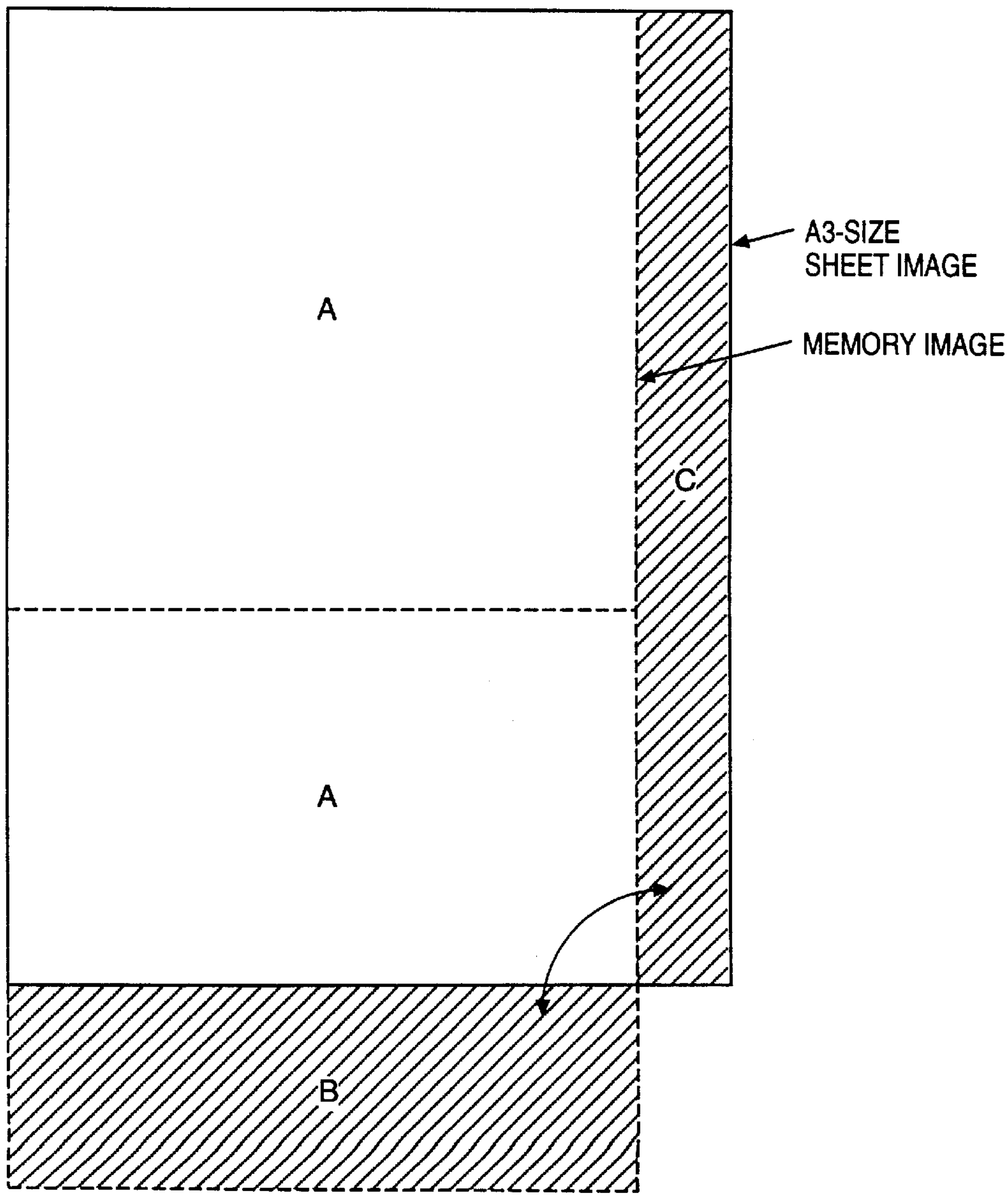
FIG. 28 is a view for explaining the mapping state of the memory shown in FIG. 25.

Thus, the addresses to be assigned to a DRAM module are converted, as shown in FIG. 27. More specifically, data are classified based on the most significant bit (MSB) in the X-direction. If the MSB in the X-direction is "0", addresses in the Y-direction are allocated in an upper address portion, except for the MSB, in the X-direction; if the MSB is "1", addresses obtained by inverting those in the X-direction are allocated in an upper address portion in the Y-direction. In this manner, the A3-size space can be converted into an address space compatible with a DRAM module, i.e., a region A shown in FIG. 28 is directly mapped, and a region C is mapped while being replaced by a region B, thus efficiently utilizing the address space. Note that this address conversion is performed by the coordinate-address converter 185 shown in FIG. 25. Furthermore, according to the rule of this conversion method, the address space can be efficiently used independently of 400 or 100 dpi.

Lightness Signal Decoder

Figure 29:
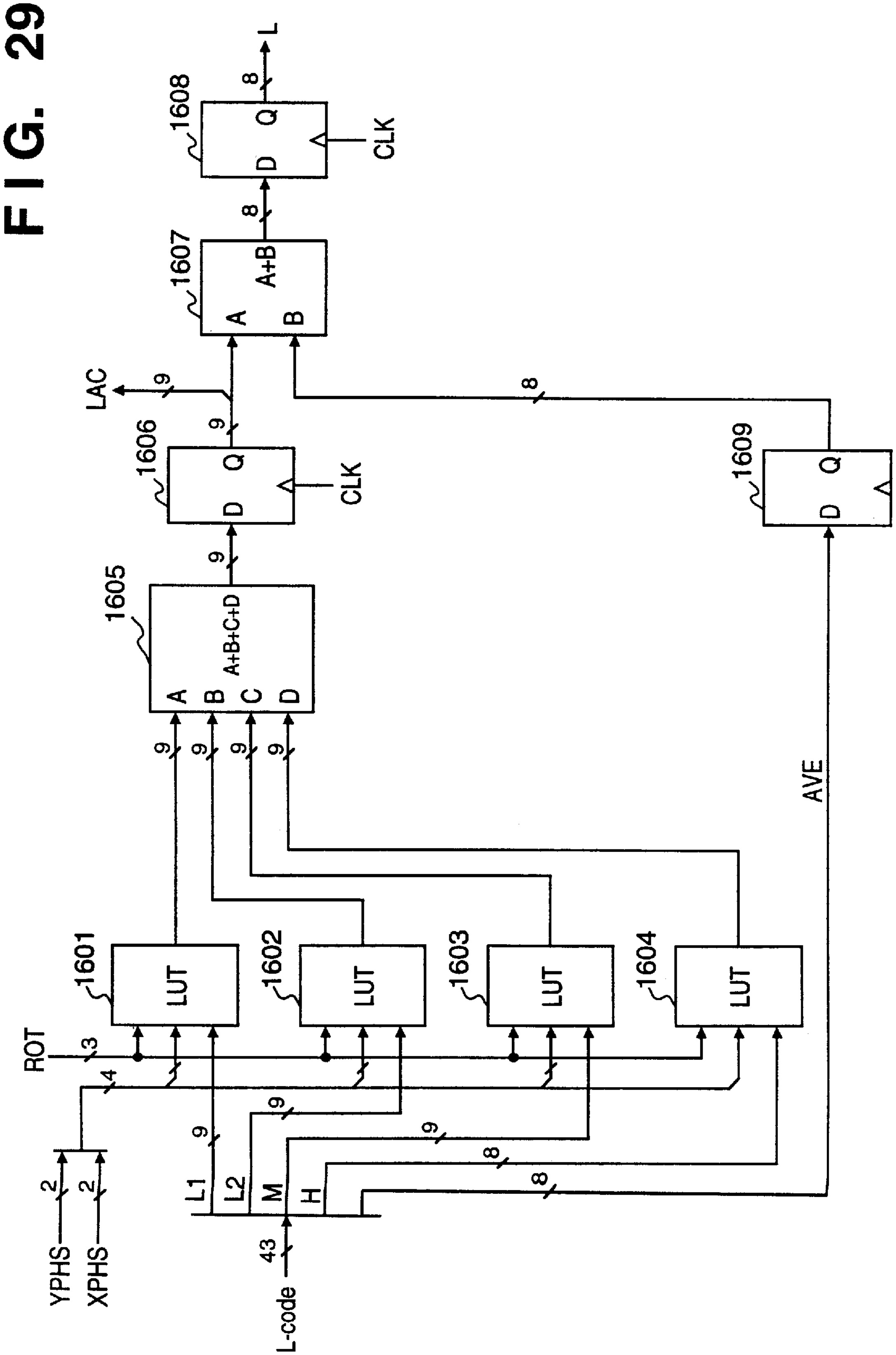
FIG. 29 is a block diagram showing the detailed arrangement of a lightness signal decoder shown in FIG. 15.

FIG. 29 is a block diagram showing the detailed arrangement of the lightness signal decoder 404.

The lightness signal decoder 404 decodes the signal L-code read out from the memory unit 211 and performs inverse Hadamard transformation of the decoded signal to obtain lightness information L*. The inverse Hadamard transformation is an inverse transformation of the Hadamard transformation given by equation (3) above, and is defined by equation (5) below:

$$\begin{bmatrix} X11 & X12 & X13 & X14 \\ X21 & X22 & X23 & X24 \\ X31 & X32 & X33 & X34 \\ X41 & X42 & X43 & X44 \end{bmatrix} = (1/4)H^T \begin{bmatrix} Y11 & Y12 & Y13 & Y14 \\ Y21 & Y22 & Y23 & Y24 \\ Y31 & Y32 & Y33 & Y34 \\ Y41 & Y42 & Y43 & Y44 \end{bmatrix} H \tag{5}$$

where H is the 4×4 Hadamard matrix, and $H^T$ is the transposed matrix of H:

$$H = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

On the other hand, the Hadamard transformation and the inverse Hadamard transformation are linear calculations, and if the Hadamard transform or the inverse Hadamard transform of a matrix X is expressed by H(X), equation (6) below normally holds:

$$H(X1+X2+\ldots+Xn)=H(X1)+H(X2)+\ldots+H(Xn) \tag{6}$$

By utilizing this nature, the inverse Hadamard transform is divided into the respective frequency bands defined in the lightness signal coder 402, and the divided calculations are performed parallelly. If a data matrix decoded from the code L1 is represented by YL1, a data matrix decoded from the code L2 is represented by YL2, a data matrix decoded from the code M is represented by YM, and a data matrix decoded from the code H is represented by YH, equation (7) below holds:

$$H(YL1+YL2+YM+YH)=H(YL1)+H(YL2)+H(YM)+H(YH) \tag{7}$$

Referring to FIG. 29, reference numerals 1601 to 1604 denote LUTs, which comprise, e.g., ROMs. Each LUT holds the calculation results of the decoding processing and the inverse Hadamard transformation processing. The lower address input terminals of the LUTs 1601, 1602, 1603, and 1604 respectively receive the codes L1, L2, M, and H, and their upper address input terminals (7 bits) receive the signals XPHS and YPHS and the rotation signals ROT (see FIG. 26).

Furthermore, reference numeral 1605 denotes an adder, which performs an addition corresponding to equation (7), i.e., adds the inverse Hadamard transformation results of the respective frequency components (L1, L2, M, and H). The sum represents the AC components of lightness information L* in a 4×4 pixel block, and is output as an AC component signal LAC of the lightness information L* via an F/F 1606.

If the coded signal is simultaneously decoded without using the above-mentioned method, an LUT having a total of 41 bits (=codes of a total of 34 bits+4-bit coordinate data (XPHS, YPHS)+3-bit signal ROT), i.e., a 41-bit address space (i.e., 2 Tbytes) is required, and is not impractical. With the above-mentioned method, several ROMs each having an address space (64 Kbytes) of a maximum of 16 bits (=9 bits (code)+4 bits (coordinate)+3 bits (signal ROT)) need only be prepared, and the arrangement is simplified very much. Also, when the code length is to be changed, it can be easily coped with.

Reference numeral 1607 denotes an adder, which adds the signal LAC input from the F/F 1606 and an average value AVE input from an F/F 1609 to obtain a lightness signal L*. The lightness signal L* output from the adder 1607 is output from an F/F 1608 in synchronism with the leading edge of the signal CLK.

Chromaticity Signal Decoder

Figure 30:
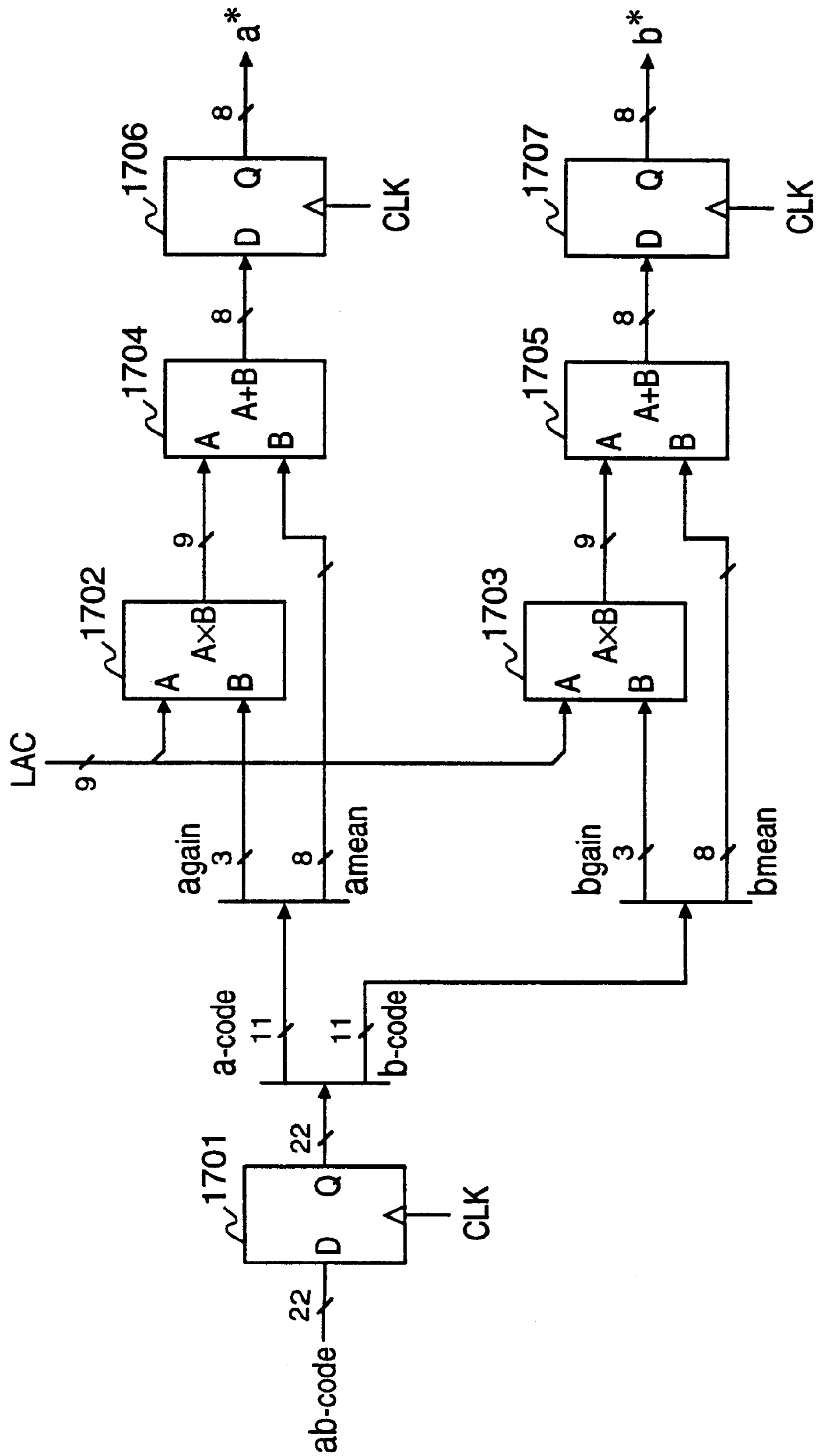
FIG. 30 is a block diagram showing the detailed arrangement of a chromaticity signal decoder shown in FIG. 15.

FIG. 30 is a block diagram showing the detailed arrangement of the chromaticity signal decoder 405.

The signal ab-code read out from the memory unit 211 is synchronized with the leading edge of the signal CLK by an F/F 1701, and is then separated into signals a-code and b-code. Furthermore, these signals are separated into signals again, amean, bgain, and bmean.

A signal a* is decoded in such a manner that the separated signal again (representing the ratio between the amplitudes of the signals a* and L*, as described above) is multiplied with the AC component LAC of the signal L* by a multiplier 1702, and the signal amean as the DC component of the signal a* is added to the product by an adder 1704. The decoded signal a* is output from an F/F 1706 in synchronism with the leading edge of the signal CLK.

Similarly, a signal b* is decoded in such a manner that the separated signal bgain (representing the ratio between the amplitudes of the signals b* and L*, as described above) is multiplied with the AC component LAC of the signal L* by a multiplier 1703, and the signal bmean as the DC component of the signal b* is added to the product by an adder 1705. The decoded signal b* is output from an F/F 1707 in synchronism with the leading edge of the signal CLK.

Color Space Converter

The color space converter 406 converts L*, a*, and b* signal into R, G, and B signals using the following equations:

$$\begin{bmatrix} R \\ G \\ B \end{bmatrix} = \begin{bmatrix} \beta11' & \beta12' & \beta13' \\ \beta21' & \beta22' & \beta23' \\ \beta31' & \beta32' & \beta33' \end{bmatrix} \begin{bmatrix} X \\ Y \\ Z \end{bmatrix} \tag{8}$$

$$\begin{bmatrix} X \\ Y \\ Z \end{bmatrix} = \begin{bmatrix} x^3 X0 \\ y^3 Y0 \\ z^3 Z0 \end{bmatrix} \tag{9}$$

$$\begin{bmatrix} x \\ y \\ z \end{bmatrix} = \begin{bmatrix} \alpha11' & \alpha12' & \alpha13' \\ \alpha21' & \alpha22' & \alpha23' \\ \alpha31' & \alpha32' & \alpha33' \end{bmatrix} \begin{bmatrix} L^* - \alpha14 \\ a^* - \alpha24 \\ b^* - \alpha34 \end{bmatrix} \tag{10}$$

Note that βij' (i, j=1, 2, 3) in equation (8) is the inverse matrix of βij (i, h=1, 2, 3) in equation (2). Also, αij' (i, j=1, 2, 3, 4) in equation (10) is the inverse matrix of αij (i, j=1, 2, 3, 4) in equation (1).

Log Converter

The log converter 407 converts R, G, and B signals into M, C, and Y signals using equations (11) below:

$$\left.\begin{aligned} M1 &= -K\log_{10}(G/255) \\ C1 &= -K\log_{10}(R/255) \\ Y1 &= -K\log_{10}(B/255) \end{aligned}\right\} \quad (11)$$

where K is a constant.

The output signals M1, C1, and Y1 are subjected to masking processing in the masking UCR unit 213, thereby generating M, C, Y, and K image signals in the respective image forming units.

The compression, storage, and expansion operations of image signals have been described. These operations are required since the positions of the image forming units for respective colors shift from each other, as shown in FIG. 13. More specifically, since the respective image forming units require image signals at different positions (i.e., the positions on an image) at a given timing, a memory is used for compensating for this time shift. However, as described above, since color image data has a large data size, the image data size is reduced by compressing/expanding data, thereby suppressing the required storage capacity of the memory.

Reducing Total Capacity of LUT

As described above, four decoders for decoding the lightness signal L* are required in correspondence with color signals M, C, Y, and K to be generated, and hence, a total of 16 LUTs (i.e., four LUTs for the signal L1, four LUTs for the signal L2, four LUTs for the signal M, and four LUTs for the signal H) are required. An identical table is written in these four LUTs. However, as described above, since the respective image forming unit require different positions of image signals (i.e., different positions on an image) at a given timing, different addresses of the LUTs are accessed. For this reason, these four LUTs cannot be simply realized by a single ROM or the like. In view of this problem, in the color copying machines 1109 and 1119, LUTs obtained by equally dividing a normal table into four portions, i.e., four LUTs each having a ¼ table size are prepared in correspondence with each of the above-mentioned signals, and signals are time-divisionally input to these LUTs to prevent collision of access timings. In this manner, these LUTs operate as if they were LUTs comprising normal tables.

Figure 31:
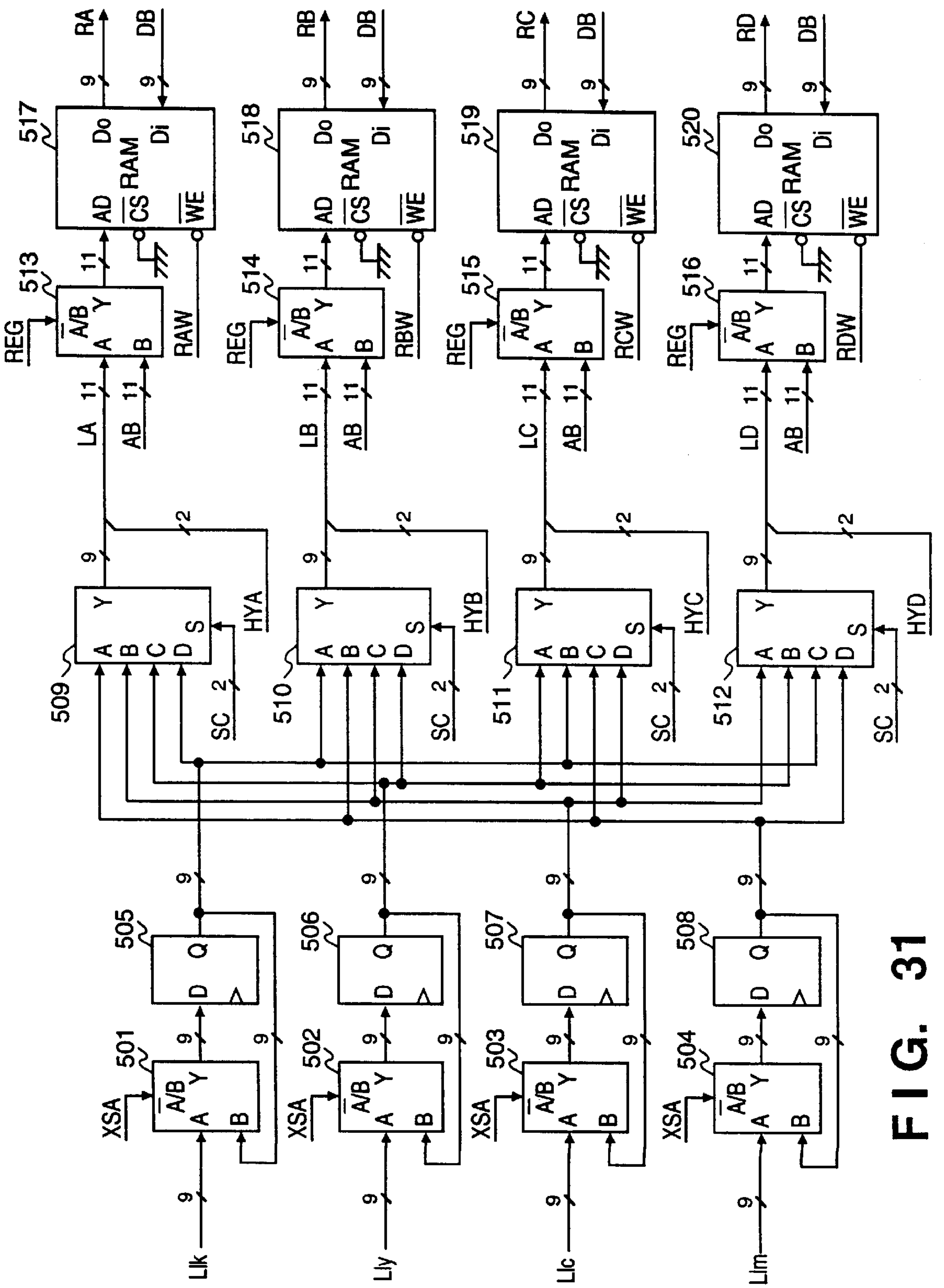
FIG. 31 is a block diagram showing the arrangement of an LUT for decoding a signal L1.

FIG. 31 is a block diagram showing the arrangement of an LUT used for decoding the signal L1. LUTs for other signals (L2, M, and H) have substantially the same arrangement as that for the signal L1, except for their data widths. In the following description, the signal used for generating an M image signal is represented by L1*m,* and similarly, signals used for generating other color image signals are represented by L1*c,* L1*y,* and L1*k*.

Referring to FIG. 31, reference numerals 501 to 504 denote selectors. A terminal A of the selector 501 receives the signal L1*k,* a terminal A of the selector 502 receives the signal L1*y,* a terminal A of the selector 503 receives the signal L1*c,* and a terminal A of the selector 504 receives the signal L1*m.* Reference numerals 505 to 508 denote F/Fs, which hold the signals input from the selectors in synchronism with the pixel clock. As described above, since each image signal is coded in units of 4×4 pixel blocks, these F/Fs and selectors hold the input signal L1 for a period for four pixels.

Reference numerals 509 to 512 denote 4-input/1-output selectors, each of which selects one of four inputs in accordance With a select signal SC (to be described later). These selectors receive different combinations of the signals L1 at their four input terminals. Therefore, these selectors select the signals L1 used for generating different color image signals. That is, the selectors 509 to 512 are used for determining LUTs to be accessed and their access timings.

The 9-bit signals L1 respectively selected by the selectors 509 to 512 are combined with 2-bit signals HYA, HYB, HYC, and HYD (to be described later) to obtain 11-bit signals LA, LB, LC, and LD. These signals are then input to address terminals AD of RAMs 517 to 520 via selectors 513 to 516, respectively. Note that the selector 513 (514, 515, 516) selects the signal LA (LB, LC, LD) or an address bus AB in accordance with a select signal REG.

Reference numerals 517 to 520 denote RAMs constituting LUTs. Since each of these RAMs has a smaller address width than that of the LUT 1601 by 2 bits, its storage capacity becomes ¼ of the LUT 1601. The table to be stored in each of these RAMs is downloaded from and set by the control unit 250 in the image processing apparatus using the address bus AB and a data bus DB and control signals RAW, RBW, RCW, and RDW generated based on chip select and line signals in a power-ON state or a reset state.

Figure 32:
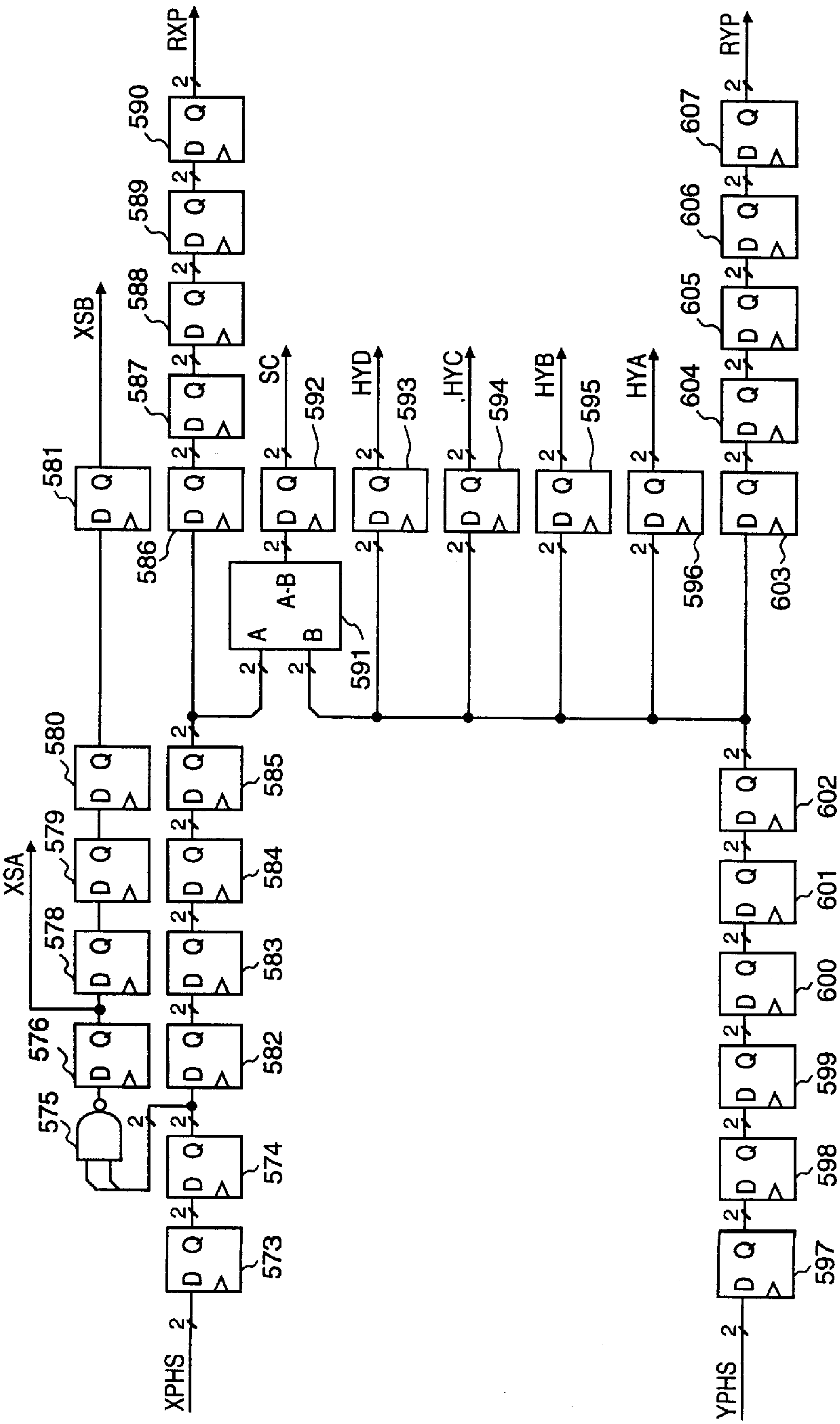
FIG. 32 is a block diagram showing the arrangement of a circuit for generating a select signal SC and the like shown in FIG. 31.

FIG. 32 is a block diagram showing the arrangement of a circuit for generating the select signal SC and the like. As shown in FIG. 32, the output from a subtracter 591, i.e., a value (XPHS−YPHS) obtained by subtracting YPHS from XPHS is the select signal SC. Therefore, when YPHS=0, the selector 509 selects the signals L1 in the order of M, C, Y, and K (L1*m,* L1*c,* L1*y,* and L1*k*). Similarly, the selector 510 selects the signals L1 in the order of K, M, C, and Y, the selector 511 selects the signals L1 in the order of Y, K, M, and C, and the selector 512 selects the signals L1 in the order of C, Y, M, and K. Therefore, signals used for generating an identical color never access an identical LUT. Note that the same applies when YPHS=1, 2, 3.

As shown in FIG. 32, signals XSA and XSB are generated by logically ANDing 2 bits of the signal XPHS by a NAND gate 575, a signal RXP is generated based on the signal XPHS, and signals HYA, HYB, HYC, HYD, and RYP are generated based on the signal YPHS.

FIGS. 33A and 33B show the tables to be set in the RAMs 517 to 520. When YPHS=0, if all the signals LA, LB, LC, and LD are 000H, the RAM 517 outputs RA=000H, the RAM 518 outputs RB=001H, the RAM 519 outputs RC=002H, and the RAM 520 outputs RD=003H. Note that the same applies when YPHS=1, 2, 3.

Figure 34:
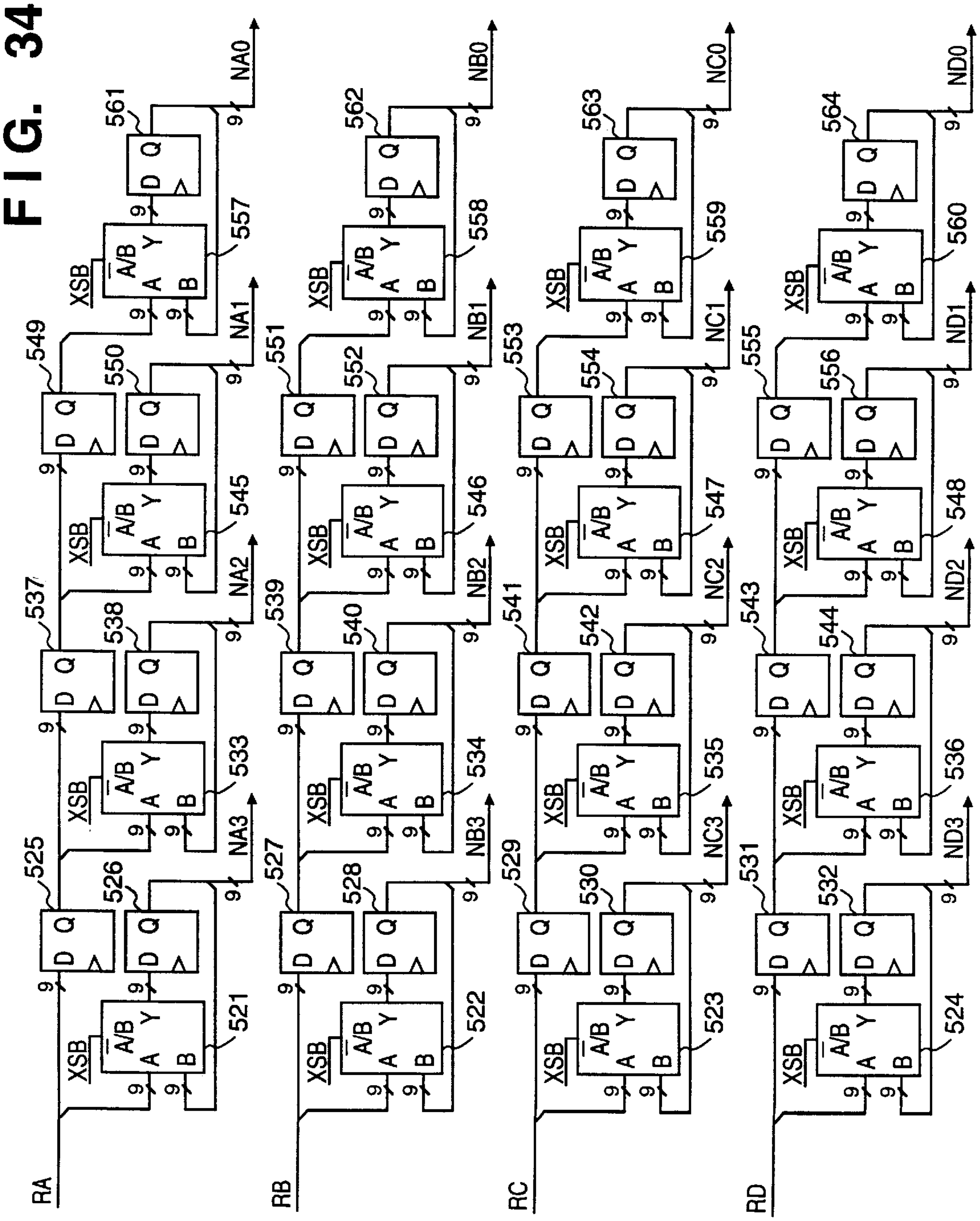
FIG. 34 is a block diagram showing the arrangement for restoring a signal output from the LUT shown in FIG. 31 to 4×4 pixels, and synchronizing these pixels.
Figure 35:
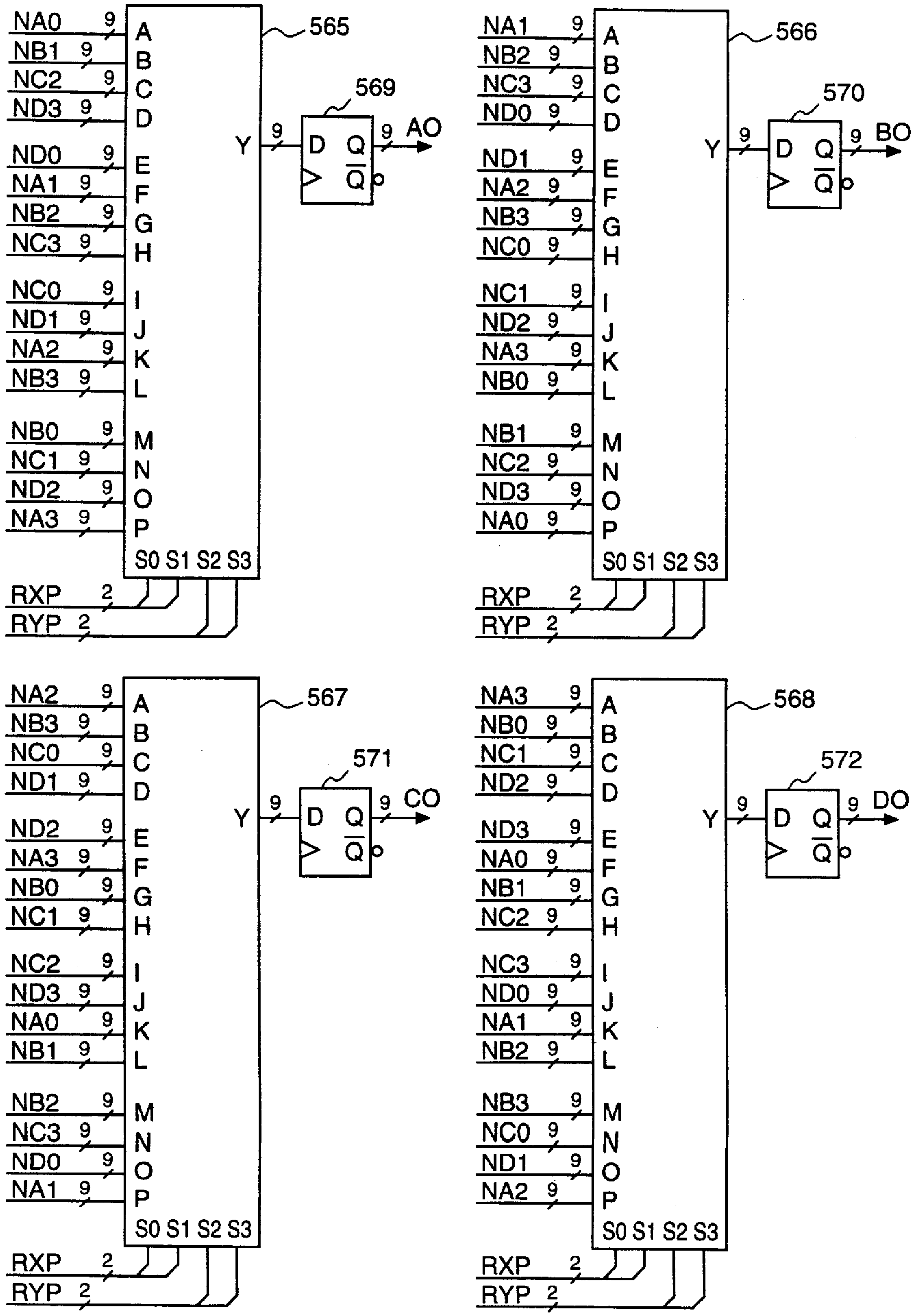
FIG. 35 is a block diagram showing the arrangement for restoring a signal output from the LUT shown in FIG. 31 to 4×4 pixels, and synchronizing these pixels.
Figure 36:
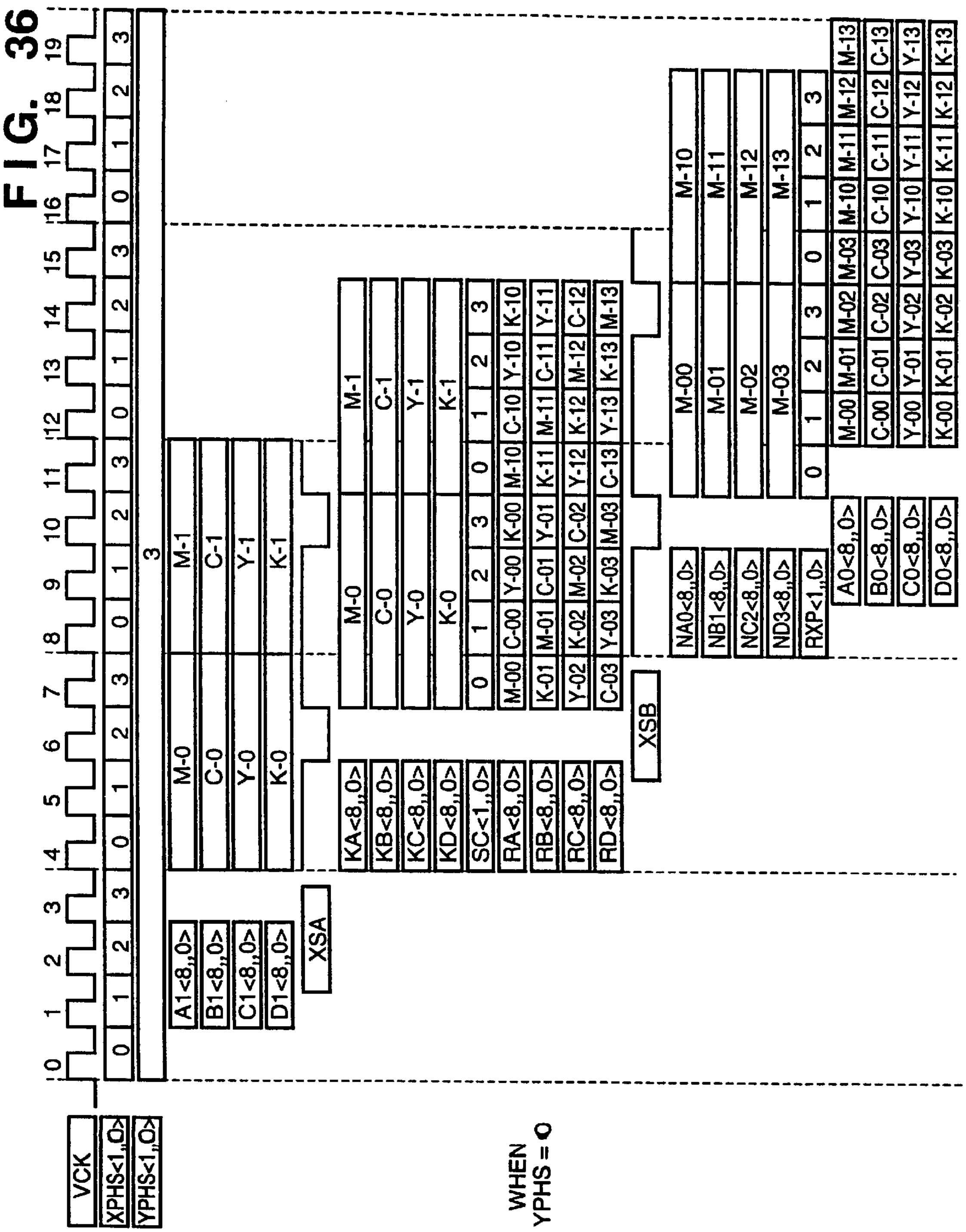
FIGS. 36 to 39 are timing charts of the LUT shown in FIG. 31.
Figure 37:
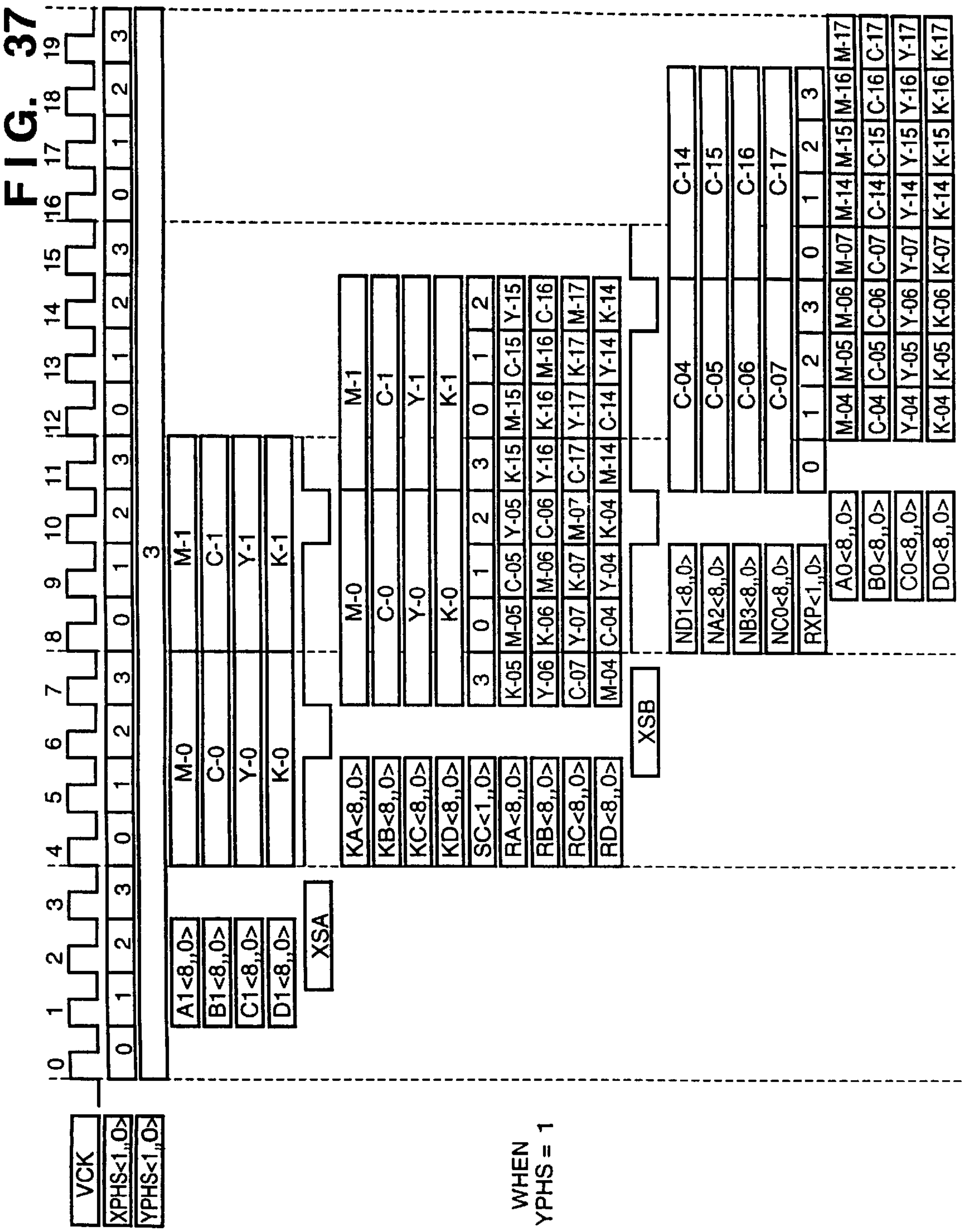
Figure 38:
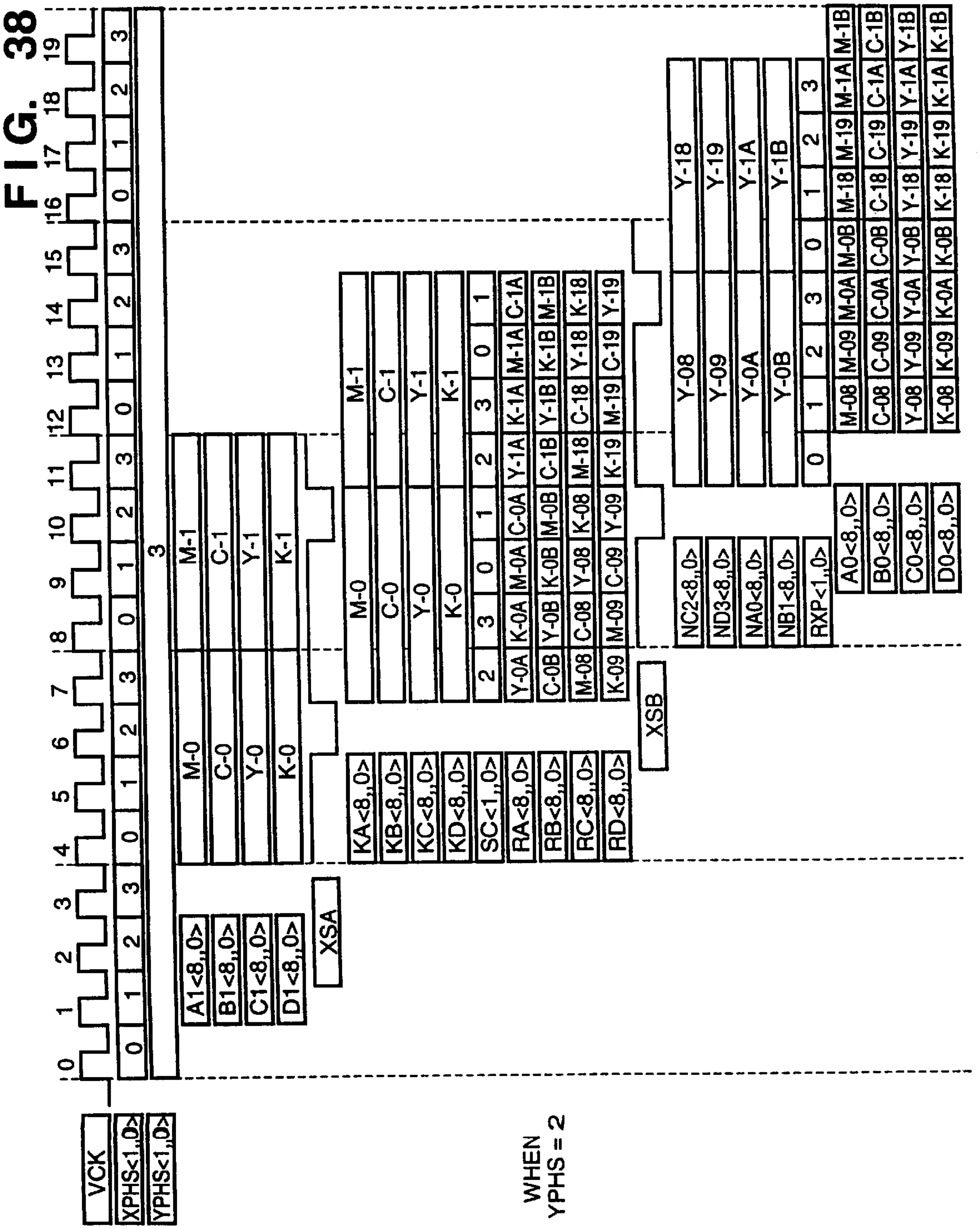
Figure 39:
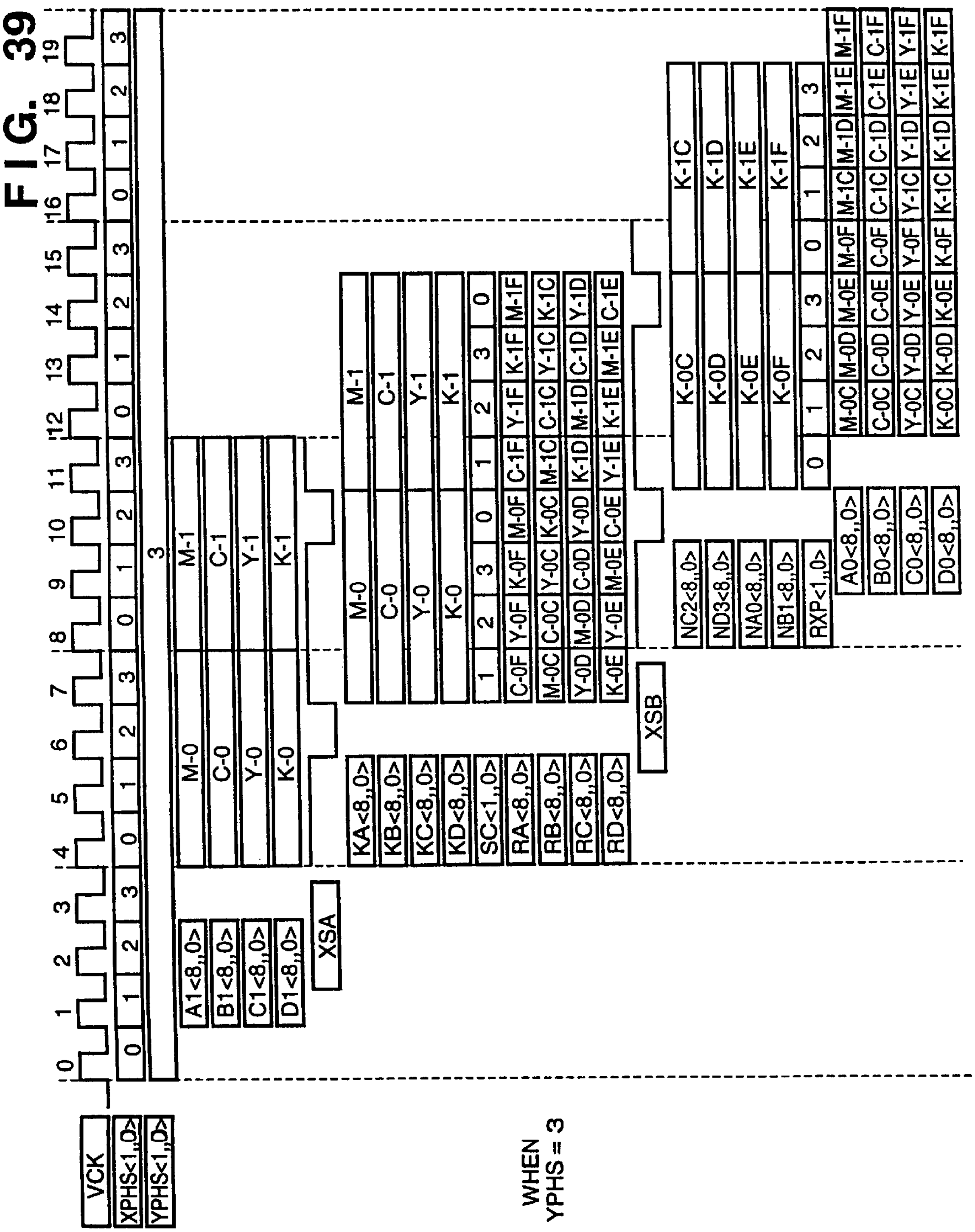

The signals RA, RB, RC, and RD output from the respective RAMs are outputs in units of blocks, and have a random order (see RA, RB, RC, and RD in the timing charts shown in FIGS. 36 to 39). Thus, these signals must be restored to 4×4 pixels and must be synchronized with each other. FIGS. 34 and 35 are block diagrams showing the circuit arrangement for realizing these operations.

The circuit shown in FIG. 34 performs the same operation as that attained by the combination of the selector 501 and the F/F 505 shown in FIG. 31, and forms pixel signals NA0 to NA3, NB0 to NB3, NC0 to NC3, ND0 to ND3 (see NA, NB, NC, and ND in the timing charts shown in FIGS. 36 to 39) using the selectors 512 to 524, 533 to 536, 545 to 548, and 557 to 560, and F/Fs 525 to 532, 537 to 544, 549 to 556, and 561 to 564.

The obtained pixel signals NA0 to NA3, NB0 to NB3, NC0 to NC3, ND0 to ND3 are input to 16-input/1-output selectors 565 to 568 shown in FIG. 35, thus restoring the random order to a normal one. Then, an F/F 569 outputs A0=L1*m,* an F/F 570 outputs B0=L1*c,* an F/F 571 outputs C0=L1y, and an F/F 572 outputs D0=L1k. At this time, the values A0, B0, C0, and D0 are output, as shown in a matrix ROT-0 in FIG. 40. Note that the four squares along the abscissa of 16 squares in FIG. 40 respectively correspond to XPHS=0, 1, 2, and 3 (main scan direction) from the left to the right positions in FIG. 40, and four squares along the ordinate respectively correspond to YPHS=0, 1, 2, and 3 (sub-scan direction) from the upper to lower positions in FIG. 40.

Note that the case has been exemplified wherein all the signals LA, LB, LC, and LD are 000H, for the sake of simplicity. However, even when these signals have different values, the output results are the same as those obtained when four LUTs are arranged. In the above description, the signal L1 has been exemplified. Needless to say, other signals L2, M, and H can be similarly processed by the LUTs with the above-mentioned arrangements.

The lightness signal L* is decoded by adding the signal AVE to the obtained signals L1, L2, M, and H used for generating respective color image signals. This arrangement has already been described above with reference to FIG. 16.

As described above, in each of the color copying machines 1109 and 1119, identical processing information which is normally stored in a plurality of (n) LUTs is divided into 1/n, and LUTs, each of which has n RAMs or ROMs storing the divided pieces of information are stored, are prepared. When coded image data are input to these LUTs at a predetermining and in a predetermined order, i.e., time-divisionally, parallel processing of decoding, dequantization, and the like for substantially simultaneously generating a plurality of color component image data is realized. Although the number of LUTs remains the same, the total of the capacities of these LUTs can be reduced to 1/n of the normal LUTs.

Figure 41:
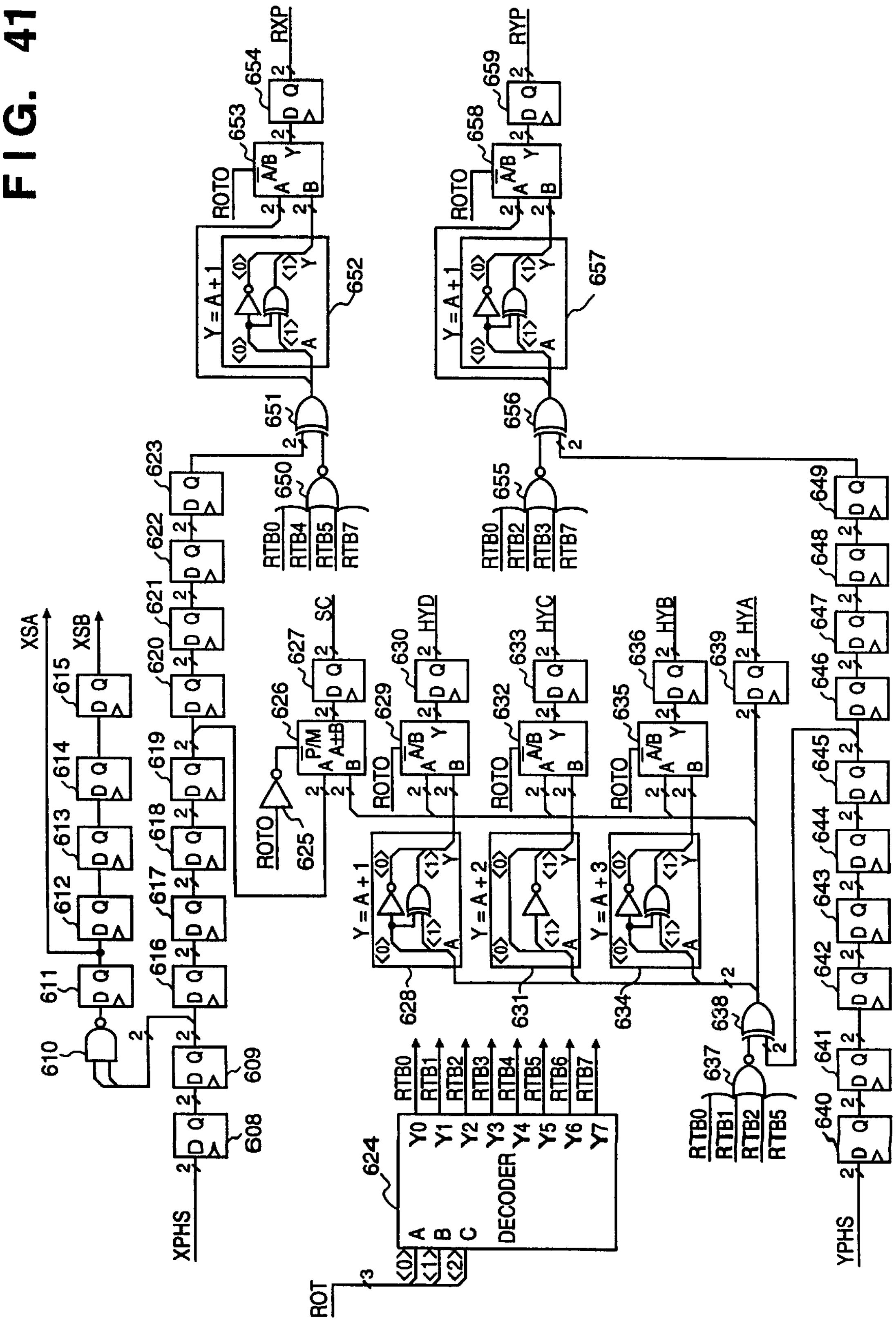
FIG. 41 is a block diagram showing another arrangement of a circuit for generating a select signal SC and the like shown in FIG. 31.
Figures 42, 43:
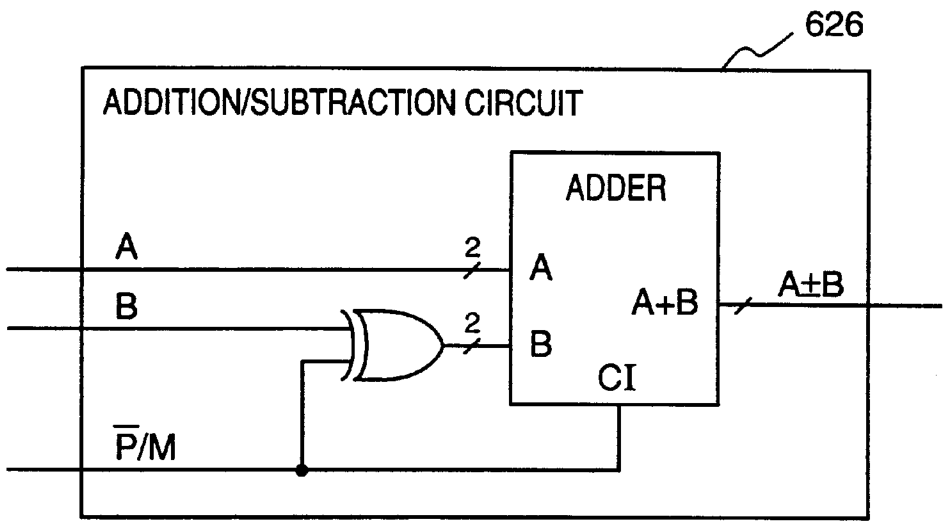
FIG. 42 is a block diagram showing the arrangement of an adder/subtracter shown in FIG. 41.
FIG. 43 is a view showing a truth table of a decoder shown in FIG. 41.

In the above description, only the state ROT-0 shown in FIG. 40 can be decoded. Thus, when the arrangement of the control signal generation circuit shown in FIG. 31 is modified to that shown in FIGS. 41 and 42, rotated images or mirror images shown in matrices ROT-1 to ROT-7 shown in FIG. 40 can also be output.

For example, when an image in a state ROT-1 (inverted in both the main scan and sub-scan directions) is to be output, the signals ROT are set to be "001"=1. Since a decoder 624 outputs RTB1="1" and "0"s as other outputs in accordance with the truth table shown in FIG. 43, the signals HYA, HYB, HYC, and HYD become 0, 1, 2, and 3 when YPHS=0; 3, 0, 1, and 2 when YPHS=1; 2, 3, 0, and 1 when YPHS=2; and 1, 2, 3, and 0 when YPHS=3. On the other hand, the signal RXP becomes 3, 2, 1, and 0 in correspondence with XPHS=0, 1, 2, and 3, and the signal RYP becomes 3, 2, 1, and 0 in correspondence with YPHS=0, 1, 2, and 3. The select signal SC and the signals XSA and XSB are the same those in FIG. 32.

When these control signals are input to the circuit described above with reference to FIGS. 31, 34, and 35, a rotated image shown in the state ROT-1 in FIG. 40 can be obtained. In addition, rotated and mirror images ROT-2 to ROT-7 can be similarly output.

Data Non-compression System

The data compression unit has been described above. A data non-compression system will be explained below.

In the data non-compression system, image data are input from the zooming unit 208 shown in FIG. 12A to the LOG conversion unit 219 shown in FIG. 12B via the bus selector 222 (i.e., without being compressed), and are temporarily stored in the non-compression memory 220 via units common to both the compression and non-compression systems, i.e., from the LOG conversion unit 219 to the edge emphasis unit 217. Thereafter, the image data are read out in synchronism with image formation timings, and are supplied to the video processing unit 218 common to both the compression and non-compression system via the selector 221.

In this manner, the compression system and the non-compression system are switched using the bus selector 222 and the selector 221. This switching control is made based on the discrimination result of the control unit 250. More specifically, a mode signal MOD indicating that a DRAM module for the non-compression system (or one for the compression system) is attached is arranged, and the control unit 250 discriminates based on this signal MOD which DRAM module is attached. For example, when only a DRAM module having a 2-Mbit address space is connected, the control unit 250 stores image data in the memory unit 211 using the compression system; when a DRAM module having a 32-Mbit address space is connected, the control unit 250 stores image data in the non-compression memory 220 using the non-compression system.

External Input System

A case will be described below wherein a multi-value image is externally input to the color copying machine 1109 or 1119.

Eight-bit R, G, and B image data input from the external I/F 231 shown in FIG. 12A are input to the color space compression unit 207 via the bus selector 232, and are temporarily stored in the memory unit 211 or the non-compression memory 220 in the same manner as described above. Thereafter, these image data are read out in synchronism with image formation timings, and are supplied to the video processing unit 218.

If three, i.e., R, G, and B data are simultaneously input from an external device, they can be stored in the non-compression memory without being compressed, or can be compressed and stored in the memory unit 211. However, when image data are frame-sequentially input from an external device in the order of R, G, and B (or C, M, and Y (K)), since image compression using the L*a*b* space cannot be performed unless three color image data are simultaneously input, image data in units of colors must be sequentially stored in the non-compression memory 220 in each image forming unit 233. Therefore, when image data are frame-sequentially input from an external device, if no non-compression memory 220 is connected, i.e., if no DRAM module having a 32-Mbit address space is attached, image data cannot be stored.

Binary Image Data

A case will be described below wherein a binary image is externally input to the color copying machine 1109 or 1119.

Figure 44:
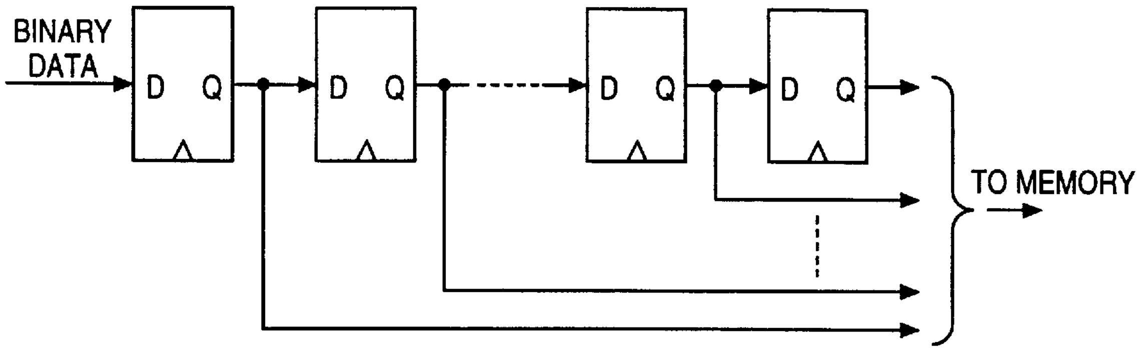
FIG. 44 is a view for explaining a case wherein a binary image is input from an external device to the color copying machine shown in FIG. 1.
Figure 45:
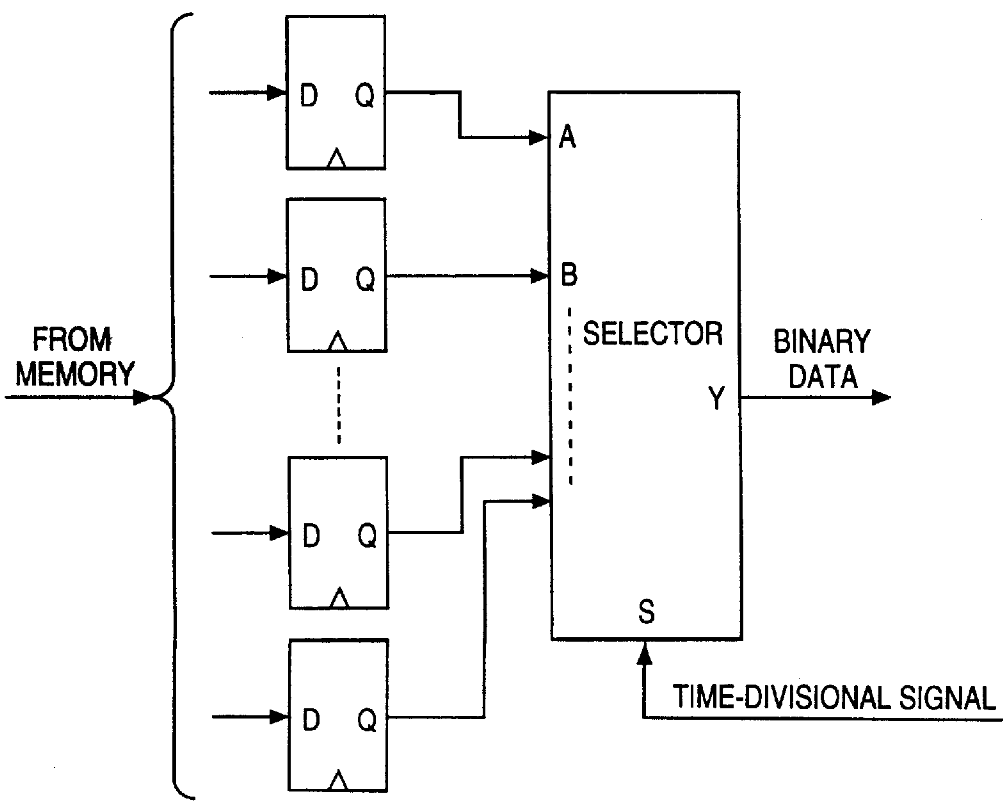
FIG. 45 is a view for explaining a case wherein a binary image is input from an external device to the color copying machine shown in FIG. 1.

As in a multi-value image data, when binary image data are frame-sequentially input in the order of R, G, and B (or C, M, and Y (K)) using the least significant bit (LSB) of the external I/F 231, the image data is converted into multi-value data using a serial-to-parallel converter shown in FIG. 44 immediately before it is input to the memory, and thereafter, the converted data is stored in the memory. For example, when one bit of binary data is converted into 16 bits, even A4-size image information can be stored in a 21-bit address space, as shown in FIG. 27. Immediately after data is read out from the memory, the data is converted into original binary data using a parallel-to-serial converter shown in FIG. 45. Furthermore, when the gamma correction unit 215 is set to output "00H" if the least significant bit (LSB) of image data is "0" and to output "FFH" if the LSB is "1", a binary image can be output.

Operation Unit

The operation unit of the color copying machine 1109 or 1119 will be described below.

Figure 46:
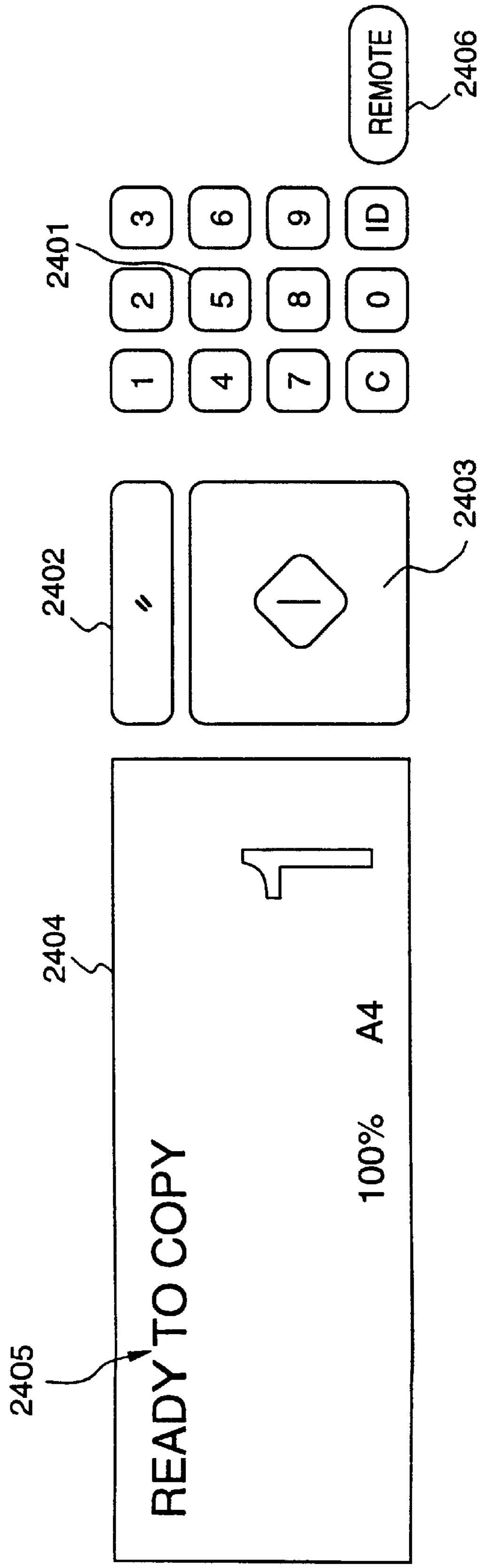
FIG. 46 is a view showing the arrangement of an operation unit of the color copying machine shown in FIG. 1.

FIG. 46 shows the arrangement of the operation unit. Reference numeral 2401 denotes a ten-key pad; and 2402, a reset key. An operator sets or resets the operation of the copying machine using these keys. Reference numeral 2403 denotes a copy start key. Upon depression of this key, the copying machine starts a copying operation. Reference numeral 2404 denotes a display unit such as a liquid crystal display, which has touch panel keys corresponding to its display contents. The control unit 250 of the image processing apparatus equally processes the key inputs from the touch panel and the key inputs from the hardware keys such as the ten-key pad 2401, the copy start key 2403, and the like. Reference numeral 2405 denotes a display example on the display unit 2404. Reference numeral 2406 denotes a remote key, which is turned off in a local mode in which the color copying machine 1109 or 1119 is used as a stand-alone machine, and is turned on in a remote mode in which the copying machine receives image data from an external device.

JPEG Data Interface

A case will be explained below wherein JPEG data is input to the color copying machine 1109 or 1119.

Figure 47:
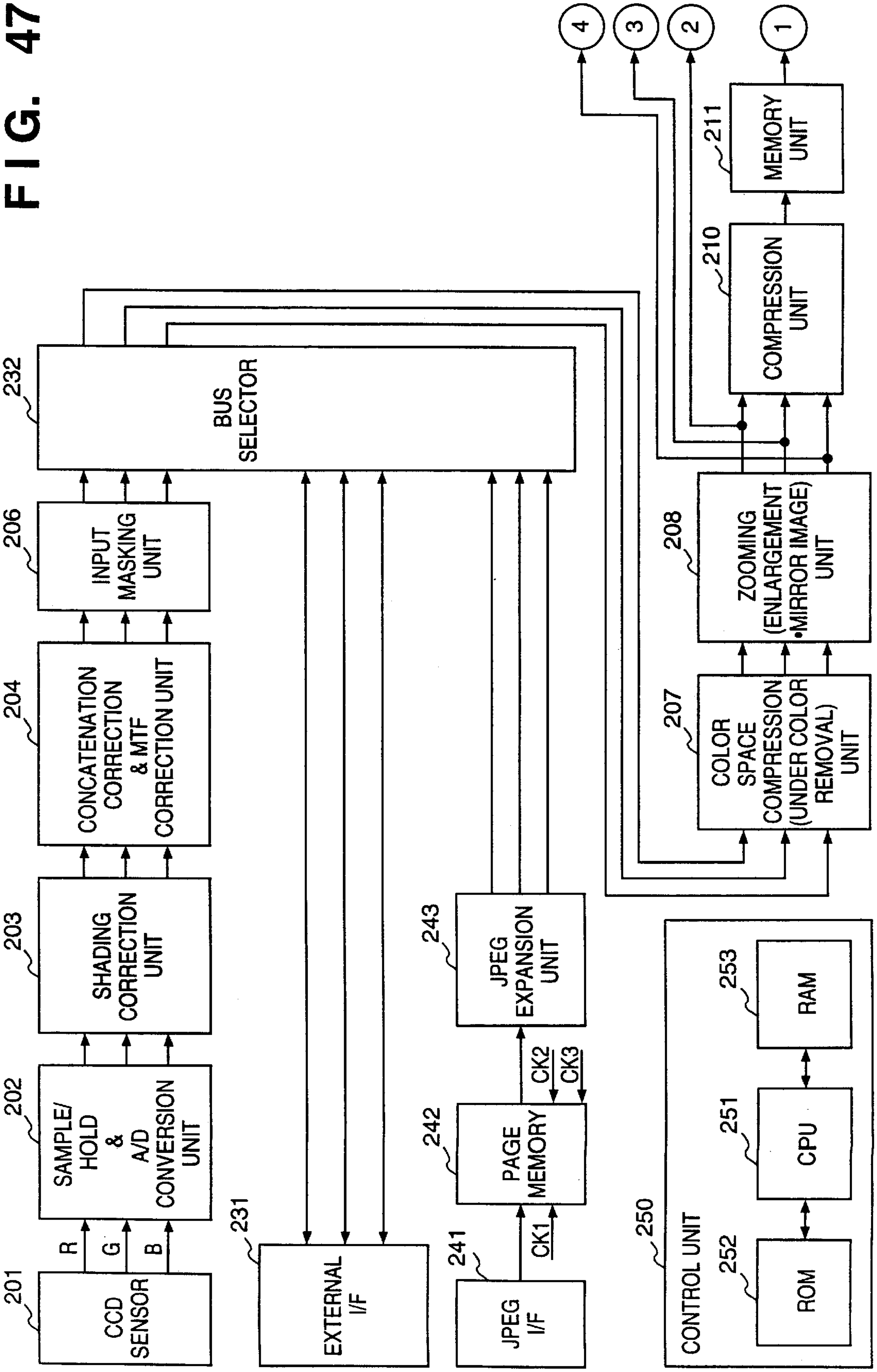
FIG. 47 is a block diagram showing the arrangement as a combination of the arrangement of the image processing apparatus described in FIG. 12A with a JPEG data processing unit.

FIG. 47 is a block diagram showing the arrangement as a combination of the arrangement of the image processing apparatus described above with reference to FIG. 12A and a JPEG data processing unit. When JPEG data is supplied from the ATM network 1101 to the color copying machine 1109 or to the color copying machine 1119 via the server 1117, the JPEG data is input via a JPEG-I/F 241. The JPEG data input to the JPEG-I/F 241 is temporarily stored in a page memory 242, and thereafter, is read out from the page memory 242 in synchronism with the image formation timing. The readout JPEG data is decoded by a JPEG expansion unit 243 having the arrangement shown in FIG. 4 in the above-mentioned procedure.

On the other hand, the control unit 250 supplies a select signal to the bus selector 232 on the basis of a signal which is supplied from the interface unit such as the external I/F 231, the JPEG-I/F 241, or the like, and indicates reception of image data. In response to this select signal, the bus selector 232 is switched to select data from the JPEG data processing unit, and decoded image data is supplied to the video processing unit 218 via the color space compression unit 207, the zooming unit 208, the bus selector 222, . . . , the edge emphasis unit 217, and the selector 221. More specifically, the JPEG data does not pass any memories in the compression and non-compression systems.

The JPEG data is temporarily stored in the page memory 242 since it has a variable length. More specifically, the image processing apparatus of the copying machine 1109 or 1119 must output image data at the same speed, and uses the page memory 242 for speed conversion. Therefore, the JPEG data is written in the page memory 242 on the basis of a predetermined clock CK1 synchronized with the transfer rate of the JPEG data, and is read out from the page memory 242 on the basis of a clock CK2 synchronized with the output speed of the printer section 103 or a clock CK3 synchronized with the processing speed of the subsequent processing circuits.

Figure 48:
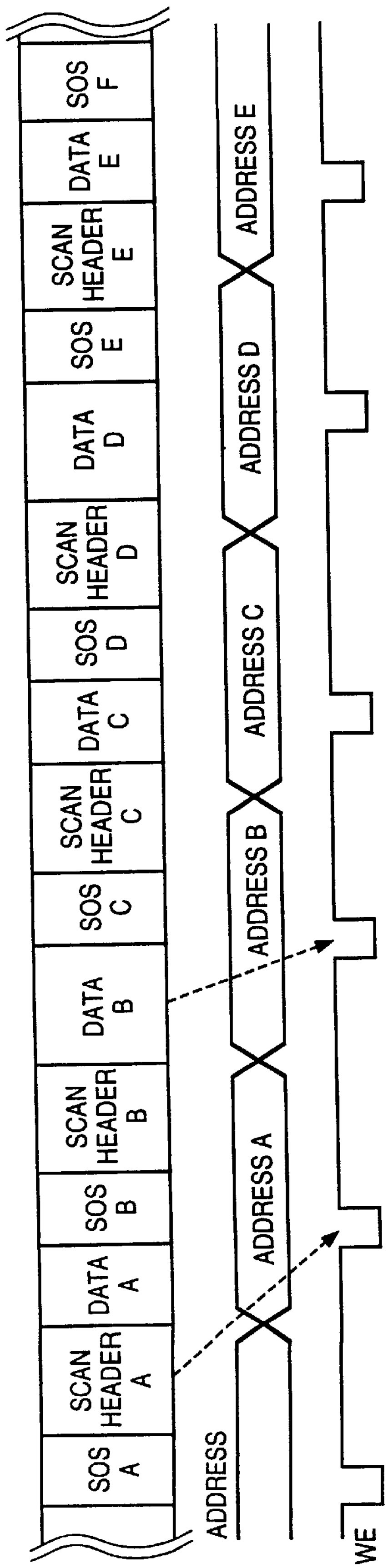
FIGS. 48 to 50 are views for explaining an example of read/write control of a page memory shown in FIG. 47.
Figure 49:
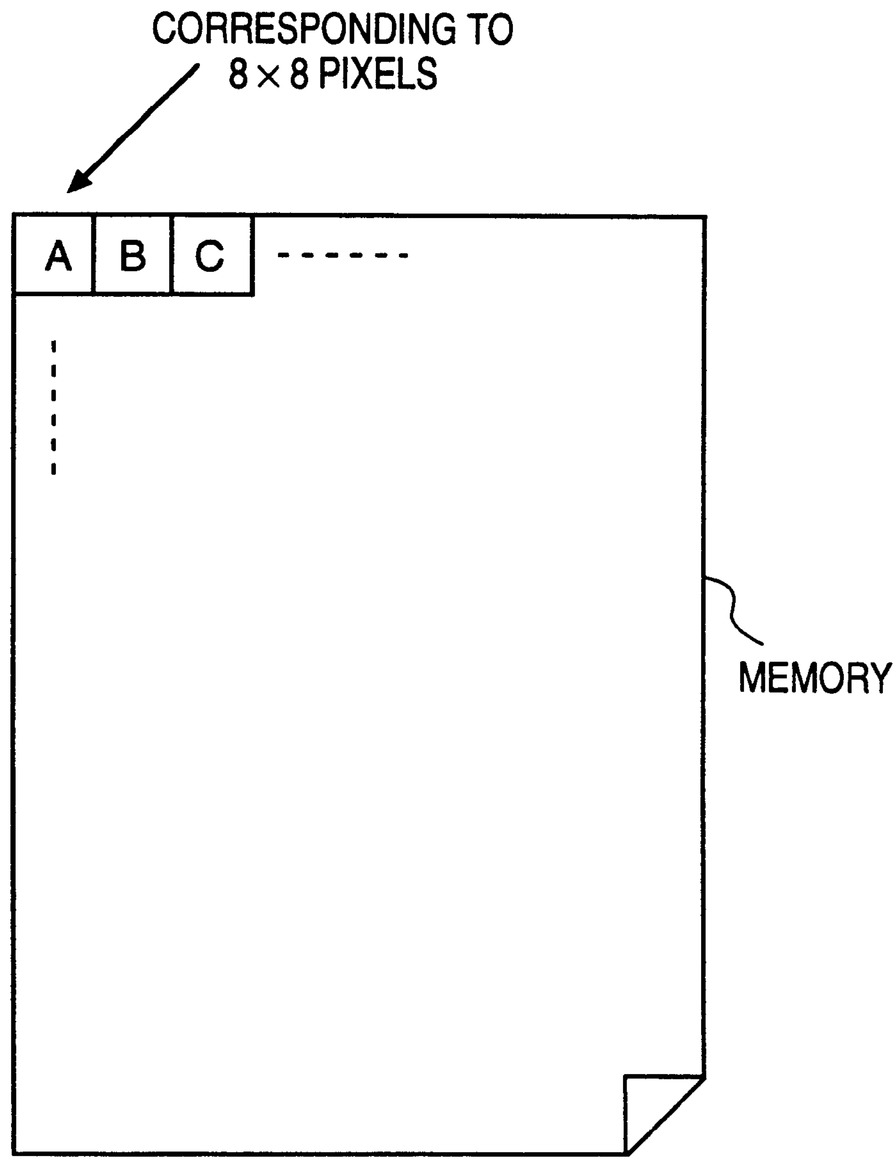
Figure 50:
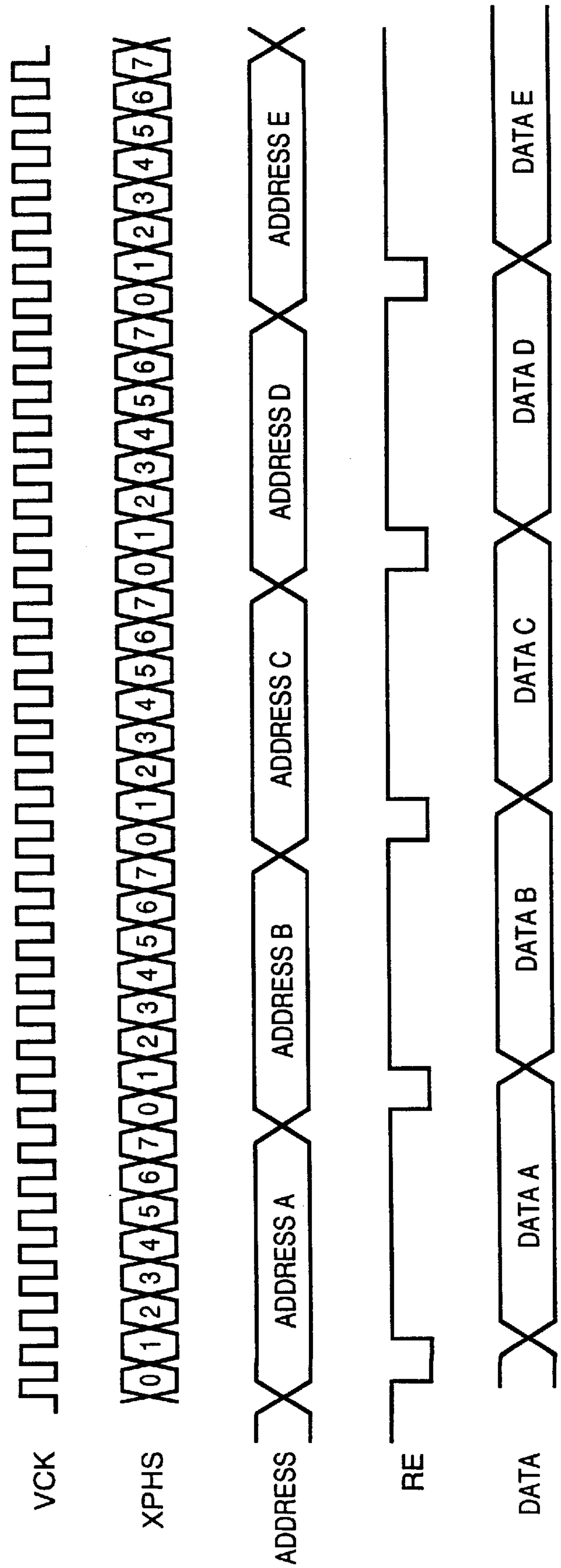

FIGS. 48 to 50 are views for explaining read/write control of the page memory 242.

Referring to FIG. 48, when variable-length JPEG data is supplied from the JPEG-I/F 241 in the order of A, B, C, D, . . . , one address (in the case of a DRAM, a combination of row and column addresses) and a signal WE are generated with respect to data for one scan. More specifically, when JPEG data is input for one scan, the JPEG data is temporarily written at successive addresses A, B, C, D, . . . , on the page memory 242 in units of blocks each consisting of 8×8 pixels. More specifically, JPEG data is asynchronously written in the page memory 242.

After transfer of JPEG data is completed, e.g., after JPEG data for one still image is input to the page memory 242, the JPEG data is read out in synchronism with the image formation timing, as shown in FIG. 50. More specifically, one address and a signal RE are generated in units of 8×8 pixel blocks, and JPEG data is read out in accordance with these signals. Each pixel block is decoded to 8×8 pixel image data by the JPEG expansion unit 243, and the decoded image data is supplied to the bus selector 232.

When an interface comprising the decoder shown in FIG. 8 is prepared in the color copying machine 1109 or 1119 in addition to the JPEG-I/F, the copying machine can receive MPEG data and can print out a desired frame. Upon reception of MPEG data, if predictively coded frame data is received, it can be decoded to intra data, and can be stored in the memory.

State Transitions of Image Processing Apparatus

Figure 52:
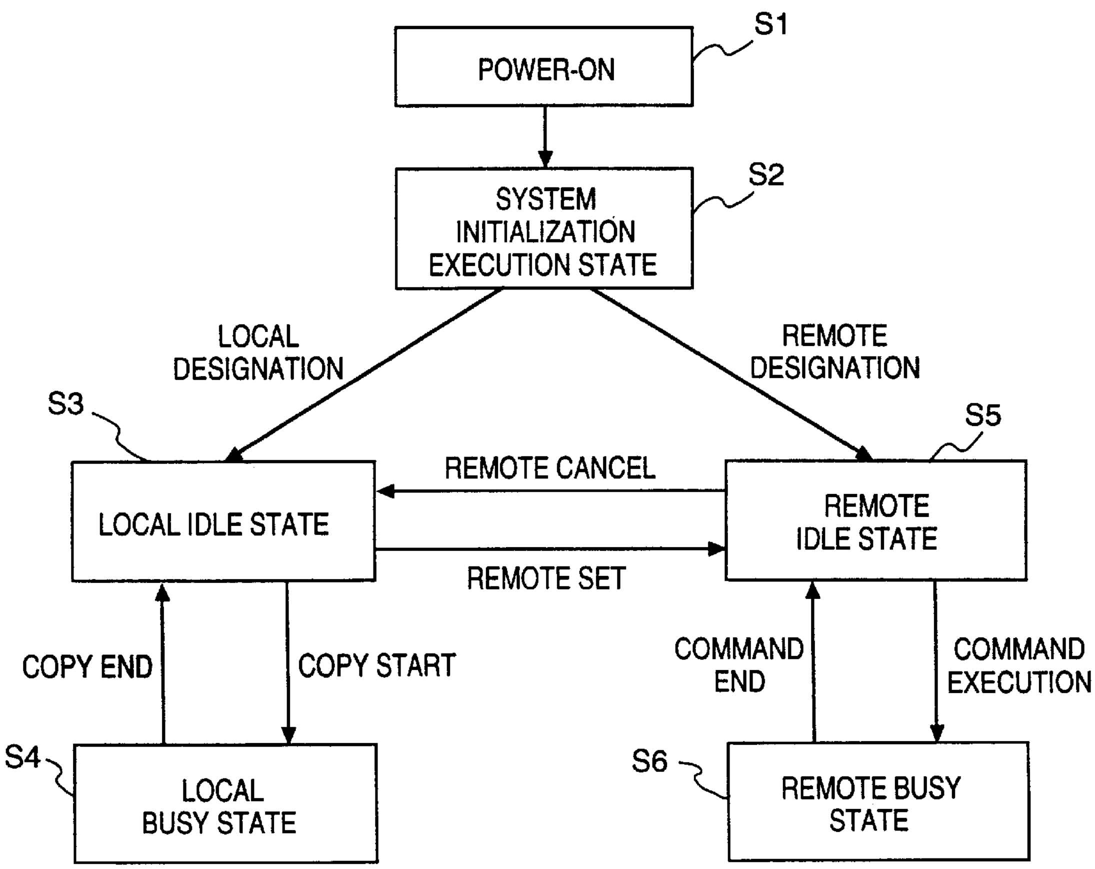
FIG. 52 is a view for explaining state transitions of the image processing apparatus shown in FIG. 47.

FIG. 52 is a view for explaining the state transitions of the image processing apparatus shown in FIG. 47, which are executed by the control unit 250 of the image processing apparatus.

Referring to FIG. 52, when the power supply is turned on in state S1, the control transits to state S2, i.e., a system initialization state, and initialization of the system including the image processing apparatus is executed.

When the remote key 2406 on the operation unit is OFF, or when the remote mode is canceled in remote idle state S5 (to be described later), local designation is made, and the control transits to local idle state S3. In this state, if the start key 2403 is depressed, the control transits to local busy state S4, and a copying operation is started. Upon completion of the copying operation, the control returns to local idle state S3, and waits for the next input.

On the other hand, when the remote key 2406 is ON or when the remote mode is set in local idle state S3, remote designation is made, and the control transits to remote idle state S5. In this state, when a command is input from the host machine (e.g., the personal computer 1115), the control transits to remote busy state S6, and for example, JPEG data or RGB data supplied to the JPEG-I/F 241 or the external I/F 231 is processed in accordance with the received command. Upon completion of the processing of the command, the control returns to remote idle state S6 and waits for the next input.

In local busy state S4 including a state during transitions, an input to the JPEG-I/F 241 or the external I/F 231 is inhibited, and a command input from the host machine or the like is invalidated. Similarly, in remote busy state S6 including a state during transitions, copying operations are inhibited, and an input from the copy start key 2403 or the like is invalidated.

As described above, according to this embodiment, when image data which is synchronously input and is obtained by reading an original image, and image data which is asynchronously input from the ATM network for ATM-transferring image data coded by various methods such as JPEG, MPEG, and the like or from the LAN using Ethernet for transferring data in a mode other than ATM, are output using a single image processing apparatus (e.g., a color copying machine for outputting an image at a constant speed), variable-length coded data is temporarily stored in the memory, and an image is output after the transfer timing or frequency is converted. In this manner, both synchronously input image data and image data asynchronously input from a network can be output at a constant high speed. Even when variable-length coded image data is input to the above-mentioned image processing apparatus comprising a plurality of image forming units, the formation timings of the respective colors can be synchronized.

Furthermore, since the compression or non-compression processing system is selectively used in correspondence with each input image data, a compressed image can be prevented from being expanded and compressed/expanded again, and deterioration of image quality can be avoided.

SECOND EMBODIMENT

An image processing apparatus according to the second embodiment of the present invention will be described below.

Note that the same reference numerals in the second embodiment denote the same parts as in the first embodiment, and a detailed description thereof will be omitted.

In the first embodiment, JPEG data is temporarily stored in the page memory 242, and in this case, a large-capacity page memory 242 is required. Thus, in the second embodiment, the memory unit 211 also provides a transfer rate conversion function of the page memory 242.

More specifically, JPEG data is compressed in units of 8×8 pixel blocks. After these blocks are sequentially decoded, the decoded image data in units of pixels for at least eight lines corresponding to the block width are held, and are read out in response to sufficiently fast image clocks, thereby developing the data to image data in units of pixels.

Figure 51:
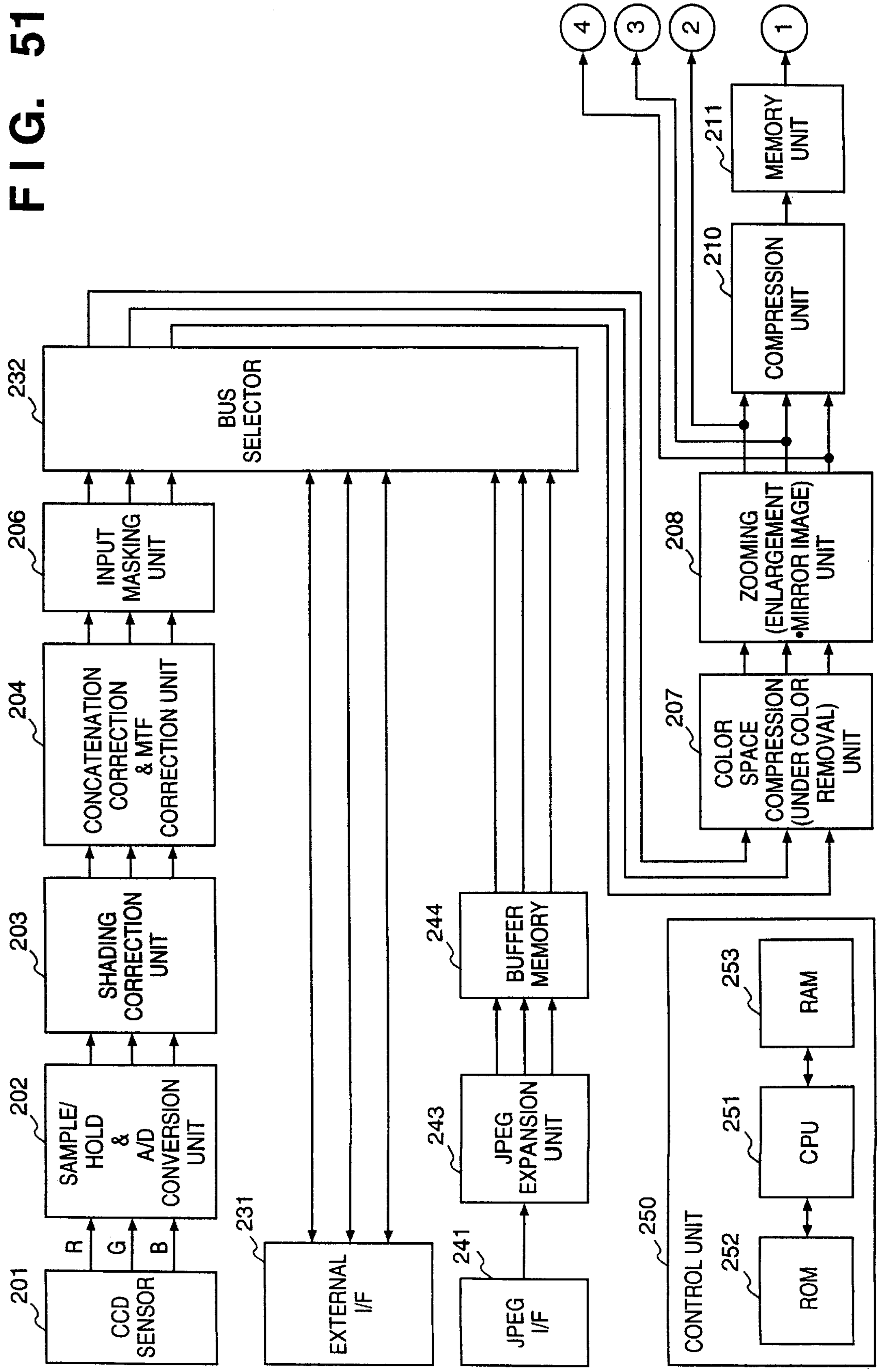
FIG. 51 is a block diagram showing the arrangement of a JPEG data processing unit according to the second embodiment.

FIG. 51 is a block diagram showing the arrangement of the JPEG data processing unit of the second embodiment. A buffer memory 244 for holding image data for at least eight lines, which are output from the JPEG expansion unit 243, is prepared, and image data are read out from the buffer 244 in response to sufficiently fast image clocks. Image data are then switched by the bus selector 232, and both image data obtained by reading an original image and image data obtained by expanding the received JPEG data are commonly subjected to the above-mentioned compression processing by the compression unit 210 via the color space compression unit 207 and the zooming unit 208. The compressed data are stored in the memory unit 211. The reason why image compression is performed is to reduce a very large memory size since the image processing apparatus comprising a plurality of image forming units requires memories for matching the phases of respective colors. After all the image data are compressed and stored, the data are read out from the memory unit 211 in correspondence with the speed of the printer section 103. Thereafter, the same procedure as in the first embodiment is performed, and a detailed description thereof will be omitted.

THIRD EMBODIMENT

An image processing apparatus according to the third embodiment of the present invention will be described below.

Note that the same reference numerals in the third embodiment denote the same parts as in the first embodiment, and a detailed description thereof will be omitted.

Figure 53:
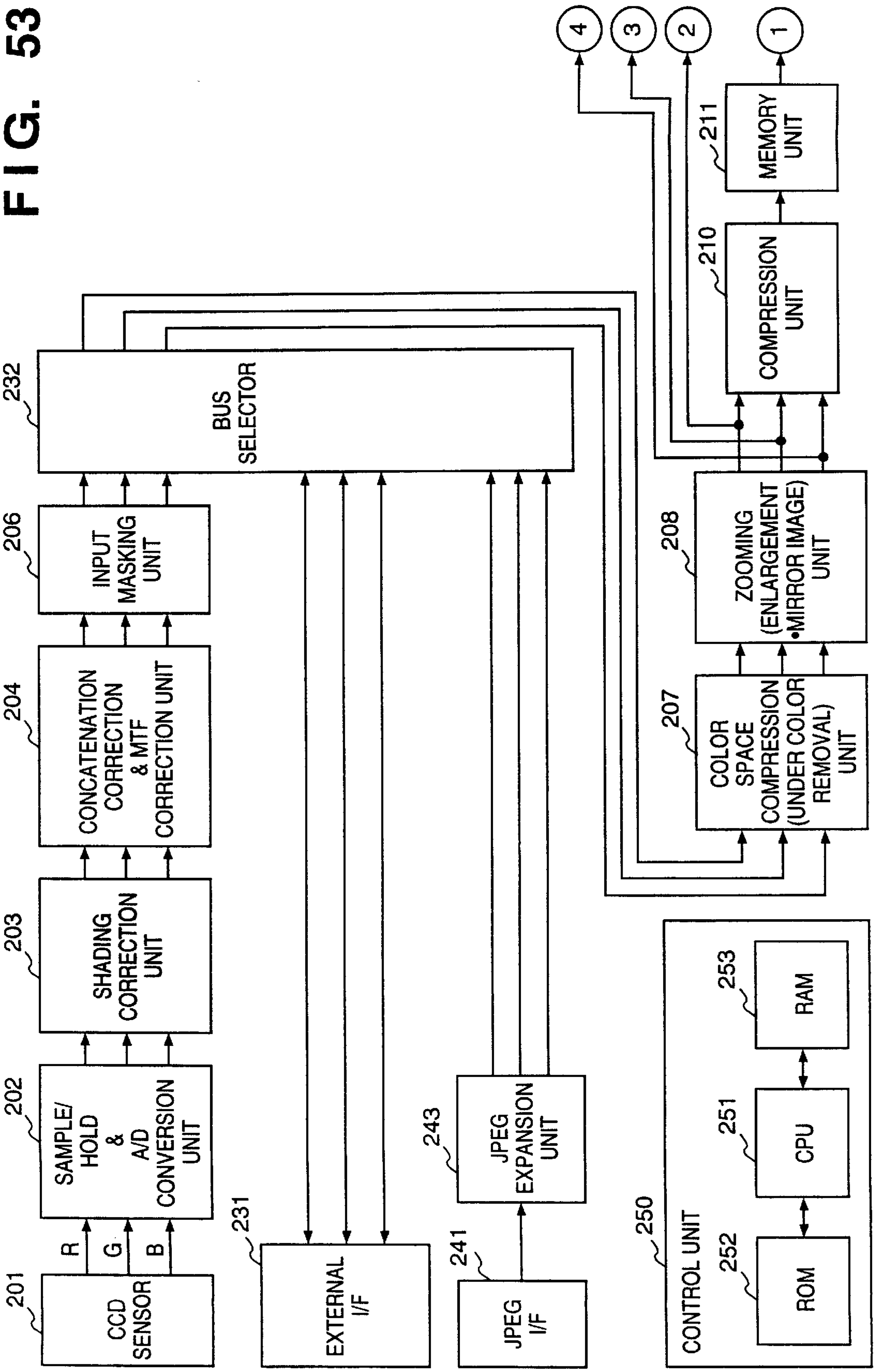
FIG. 53 is a block diagram showing the arrangement of a JPEG data processing unit according to the third embodiment.

FIG. 53 is a block diagram showing the arrangement of the image processing apparatus according to the third embodiment.

In the first embodiment, JPEG data is temporarily stored in the page memory 242, and in this case, a large-capacity page memory 242 is required. Thus, in the third embodiment, when the non-compression memory 220 is mounted, it is utilized in transfer rate conversion.

More specifically, JPEG data is compressed in units of 8×8 pixel blocks. After these blocks are sequentially decoded, the decoded image data in units of pixels for at least eight lines corresponding to the block width are held, and are read out in response to sufficiently fast image clocks, thereby developing the data to image data in units of pixels. Therefore, JPEG data output from the JPEG-I/F 241 are developed to data in units of pixels by the JPEG expansion unit 243, and are temporarily stored in the non-compression memory 220 via the bus selector 232, . . . , zooming unit 208, the bus selector 222, . . . , and the edge emphasis unit 217. After all the image data are stored, the image data are read out from the non-compression memory 220 in correspondence with the speed of the printer section 103.

As described above, the compression and non-compression systems are switched by the bus selector 222 and the selector 221. In this case, the select signal is generated based on the discrimination result of the control unit 250 on the basis of a command or a signal supplied in advance or simultaneously from the external I/F 231 or the JPEG-I/F 241 or a key input from the operation unit. In the switching operation, a mode signal MOD indicating that a DRAM module for the non-compression system (or one for the compression system) is attached is arranged, and the control unit 250 discriminates based on this signal MOD which DRAM module is attached. For example, when only a DRAM module having a 2-Mbit address space is connected, the control unit 250 stores image data in the memory unit 211 using the compression system; when a DRAM module having a 32-Mbit address space is connected, the control unit 250 stores image data in the non-compression memory 220 using the non-compression system. If this DRAM module is not connected, the control unit 250 does not permit an input from the JPEG-I/F 241, and ignores an input even though data is input from the JPEG-I/F 241.

As many apparently widely different embodiments of the present invention can be made without departing from the spirit and scope thereof, it is to be understood that the invention is not limited to the specific embodiments thereof except as defined in the appended claims.

What is claimed is:

1. A coding apparatus, which is connected to a network system, for coding image data, said apparatus comprising:

an inputter, arranged to input image data comprised of intensity component data and color component data from an external device through the network system;

a detector, arranged to detect an edge portion represented by the image data;

an encoder, arranged to encode each of the intensity component data and the color component data separately; and a controller, arranged to control a process of said encoder on a detecting result obtained by said detector, said controller controlling the process such that a compression ratio for the intensity component data at the edge portion is lower than a compression ratio at any other portion represented by the image data.

2. The apparatus according to claim 1, wherein said controller sets a data length of code to be different for the edge portion and for another portion represented by the image data.

3. The apparatus according to claim 1, wherein said controller controls an assignment of code lengths for the intensity component data and the color component data so as to set total code amounts, which respectively correspond to the edge and other portions, to predetermined values.

4. The apparatus according to claim 1, wherein code lengths for the intensity component data and the color component data are controlled by said controller to be based on a rule different for the edge portion and for another portion represented by the image data.

5. The apparatus according to claim 4, wherein a code length for the intensity component data in the edge portion is shorter than that in the other portion.

6. The apparatus according to claim 4, wherein a code length for the color component data in the edge portion is longer than that in the other portion.

7. A coding method for coding image data, said method comprising the steps of:

inputting image data comprised of intensity component data and color component data from an external device through a network system;

detecting an edge portion represented by the image data;

coding the intensity component data and the color component data separately; and controlling a process of said coding step based on a detecting result obtained in said detecting step, said controlling step controlling the process such that a compression ratio for the intensity component data at the edge portion is lower than a compression ratio at any other portion represented by the image data.

8. The method according to claim 7, wherein, in said controlling step, a data length of code is set to be different for the edge portion an for another portion represented by the image data.

9. The method according to claim 7, wherein in said controlling step, an assignment of code lengths for the intensity component data and the color component data are controlled so that total code amounts, which respectively correspond to the edge portion and to another portion represented by the image data, are set to predetermined values.

10. The method according to claim 7, wherein in said controlling step, code lengths for the intensity component data and the color component data are controlled based on a rule different for the edge portion and for another portion represented by the image data.

11. The method according to claim 10, wherein a code length for the color component data in the edge portion is shorter than that in the other portion.

12. The method according to claim 10, wherein a code length for the intensity color component data in the edge portion is longer than that in the other portion.

13. The apparatus according to claim 1, wherein said inputter comprises an image sensor, arranged to read an original image and to output the image data.

14. The apparatus according to claim 1, further comprising a decoder, arranged to decode the data encoded by said encoder.

15. The apparatus according to claim 14, further comprising an outputter, arranged to output the data decoded by said decoder.

16. The apparatus according to claim 15, wherein said outputter prints a color image based upon the data decoded by said decoder.

17. The apparatus according to claim 1, wherein said encoder comprises a quantizer, arranged to quantize the image data, and said controller controls a quantization step of the quantizer.

18. The apparatus according to claim 17, wherein said encoder comprises an orthogonal transform processor, arranged to orthogonally transformation in a block unit with a plurality of pixels.

19. A color copy machine, which is connected to a network system and which includes a coding apparatus, the coding apparatus comprising:

an inputter, arranged to input image data comprised of intensity component data color component data from an external device through the network system;

a detector, arranged to detect an edge portion represented by the image data;

an encoder, arranged to encode the intensity component data and the color component data separately; and a controller, arranged to control a process of said encoder based on a detection result obtained by said detector, said controller controlling the process such that a compression ratio for the intensity component data at the edge portion is lower than a compression ratio at any other portion represented by the image data.

20. The machine according to claim 19, wherein the coding apparatus further comprises a scanner, and wherein said inputter inputs the image data outputted by said scanner.

* * * * *

UNITED STATES PATENT AND TRADEMARK OFFICE

CERTIFICATE OF CORRECTION

PATENT NO. : 6,181,823 B1
DATED : January 30, 2001
INVENTOR(S) : Hiroyuki Takahashi It is certified that error appears in the above-identified patent and that said Letters Patent is hereby corrected as shown below:

Column 1,
Line 67, “difficult” should read -- difficult to --.

Column 2,
Line 2, “difficultly” should read -- difficulty --.

Column 3,
Line 40, “MPG” should read -- MPEG --; and
Line 42, “structure:” should read -- structure; --.

Column 28,
Line 1, “With” should read -- with --.

Column 35,
Line 38, “an” should read -- and --; and
Line 40, “wherein” should read -- wherein, --.

Column 36,
Line 26, “arranged to orthogonally transformation” should read -- arranged to perform orthogonal transformation --.

Signed and Sealed this

Twentieth Day of September, 2005

JON W. DUDAS
*Director of the United States Patent and Trademark Office*